(12) United States Patent
Hirao et al.

(10) Patent No.: US 8,369,028 B2
(45) Date of Patent: *Feb. 5, 2013

(54) IMAGING LENS, IMAGING DEVICE, PORTABLE TERMINAL, AND METHOD FOR MANUFACTURING IMAGING LENS

(75) Inventors: Yusuke Hirao, Sakai (JP); Keiji Matsusaka, Osaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 93 days.

This patent is subject to a terminal disclaimer.

(21) Appl. No.: 12/701,043

(22) Filed: Feb. 5, 2010

(65) Prior Publication Data

US 2010/0134903 A1  Jun. 3, 2010

Related U.S. Application Data

(63) Continuation of application No. 12/521,321, filed as application No. PCT/JP2008/052761 on Feb. 19, 2008, now Pat. No. 7,841,785.

(30) Foreign Application Priority Data

Feb. 19, 2007  (JP) ................................. 2007-038221
Sep. 4, 2007   (JP) ................................. 2007-229164

(51) Int. Cl.
    *G01B 3/08*  (2006.01)
(52) U.S. Cl. ........................................................ 359/741
(58) Field of Classification Search .................. 359/717, 359/716, 741, 794, 642, 738–740
    See application file for complete search history.

(56) References Cited

U.S. PATENT DOCUMENTS

| 2006/0262416 A1 | 11/2006 | Lee |
| 2006/0285229 A1 | 12/2006 | Ogawa ........................... 359/754 |
| 2008/0088949 A1 | 4/2008 | Oh et al. ........................ 359/717 |
| 2008/0130143 A1* | 6/2008 | Oh et al. ........................ 359/794 |
| 2009/0050946 A1 | 2/2009 | Duparre |

FOREIGN PATENT DOCUMENTS

| DE | 102004036469 | 2/2006 |
| EP | 2 037 304 A1 | 3/2009 |
| JP | 2006-91638 A | 4/2006 |
| JP | 2006-98504 A | 4/2006 |
| JP | 2006-323365 A | 11/2006 |
| JP | 2006-349948 A | 12/2006 |
| JP | 2007-126636 A | 5/2007 |
| JP | 3929479 B1 | 6/2007 |
| JP | 3946245 B1 | 7/2007 |
| WO | WO 2004-027880 | 4/2004 |
| WO | WO 2008-011003 | 1/2008 |
| WO | WO 2008/102773 A1 | 8/2008 |

OTHER PUBLICATIONS

Extended European Search Report dated Feb. 6, 2012 in corresponding European Patent application No. EP 08 72 0748.

* cited by examiner

*Primary Examiner* — Alicia M Harrington
(74) *Attorney, Agent, or Firm* — Cozen O'Connor

(57) ABSTRACT

An imaging lens (LN) includes at least one lens block (BK), and an aperture stop (ape). The lens block (BK) includes parallel flat lens substrates (LS) formed of different materials, and a lens (L). In the imaging lens (LN), a first lens block (BK1) positioned closest to an object includes a first lens substrate (LS1) and a lens (L[LS1*o*], and a prescribed conditional expression is satisfied.

5 Claims, 40 Drawing Sheets

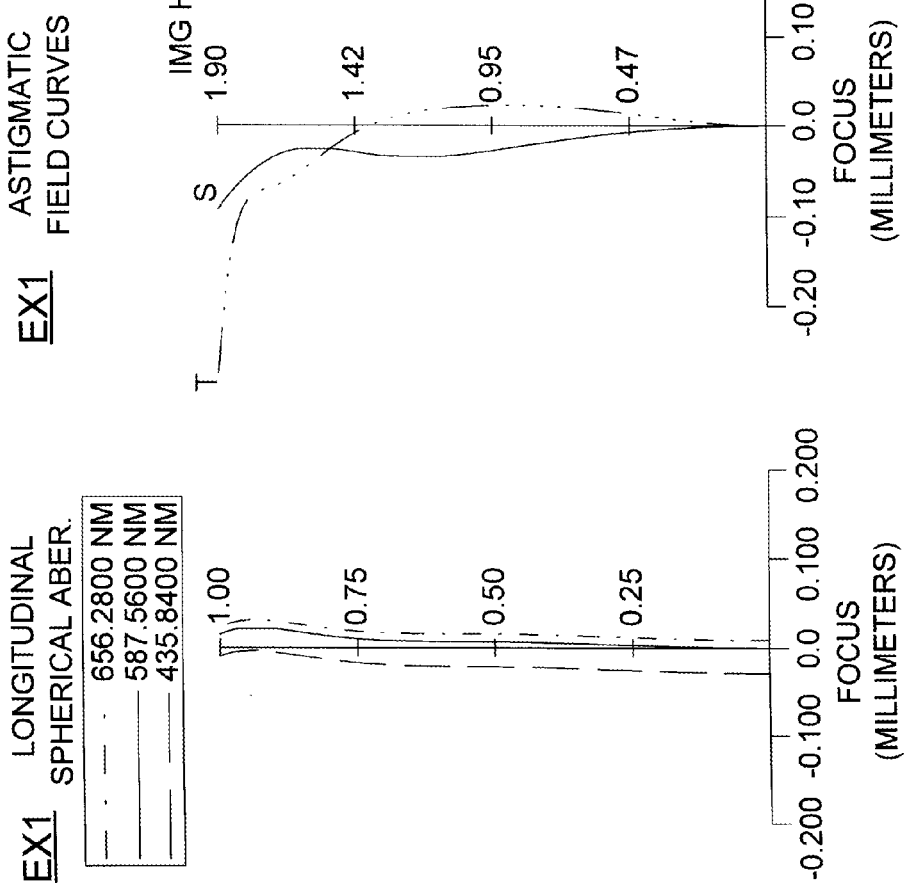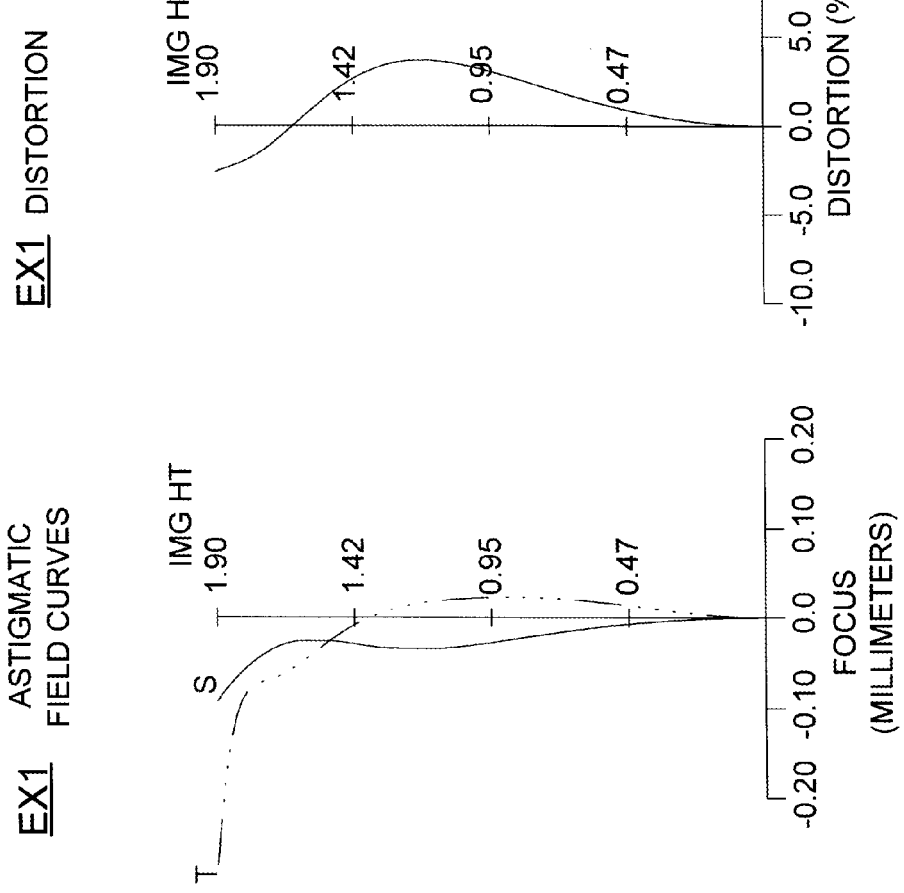

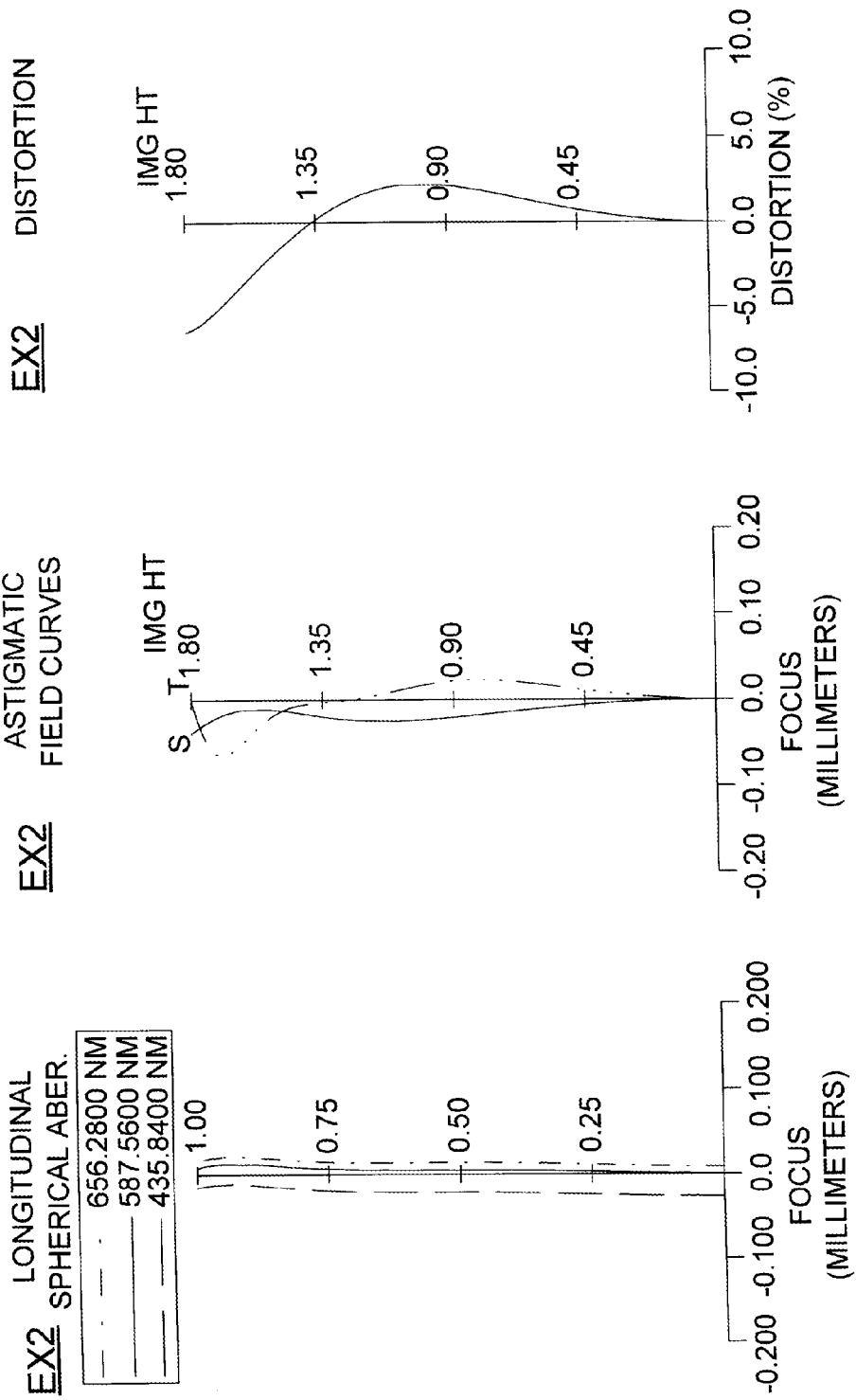

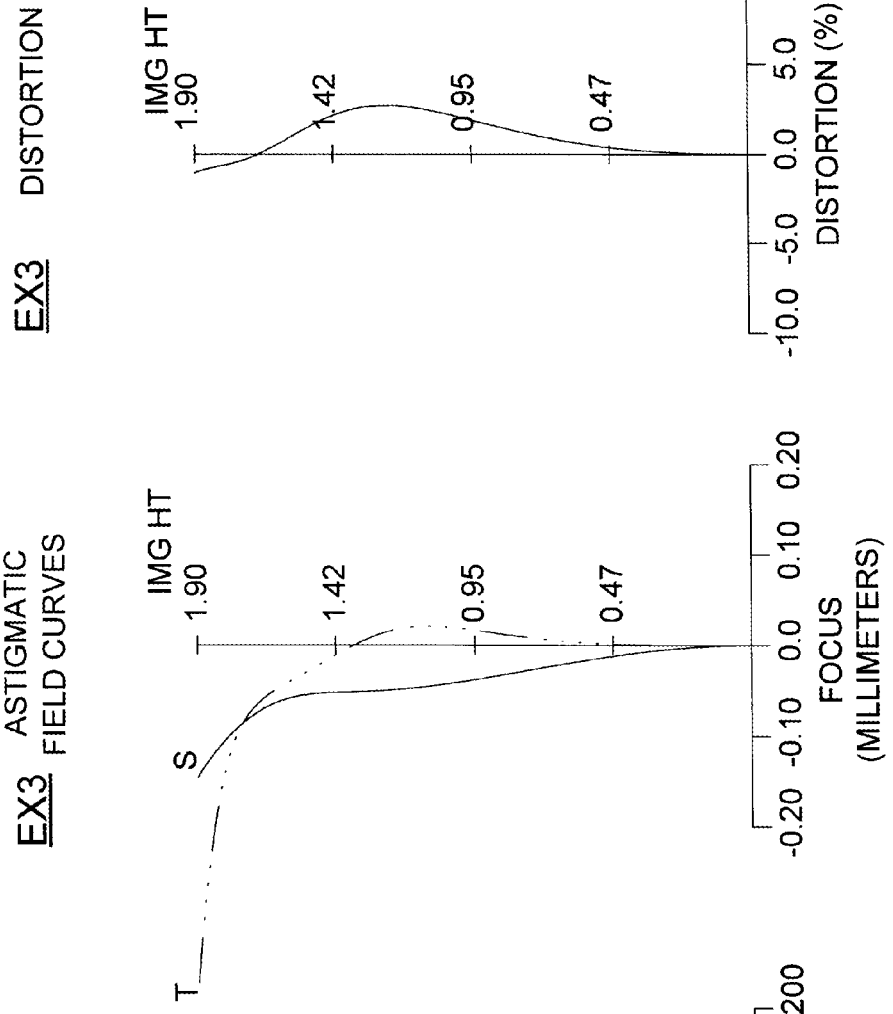

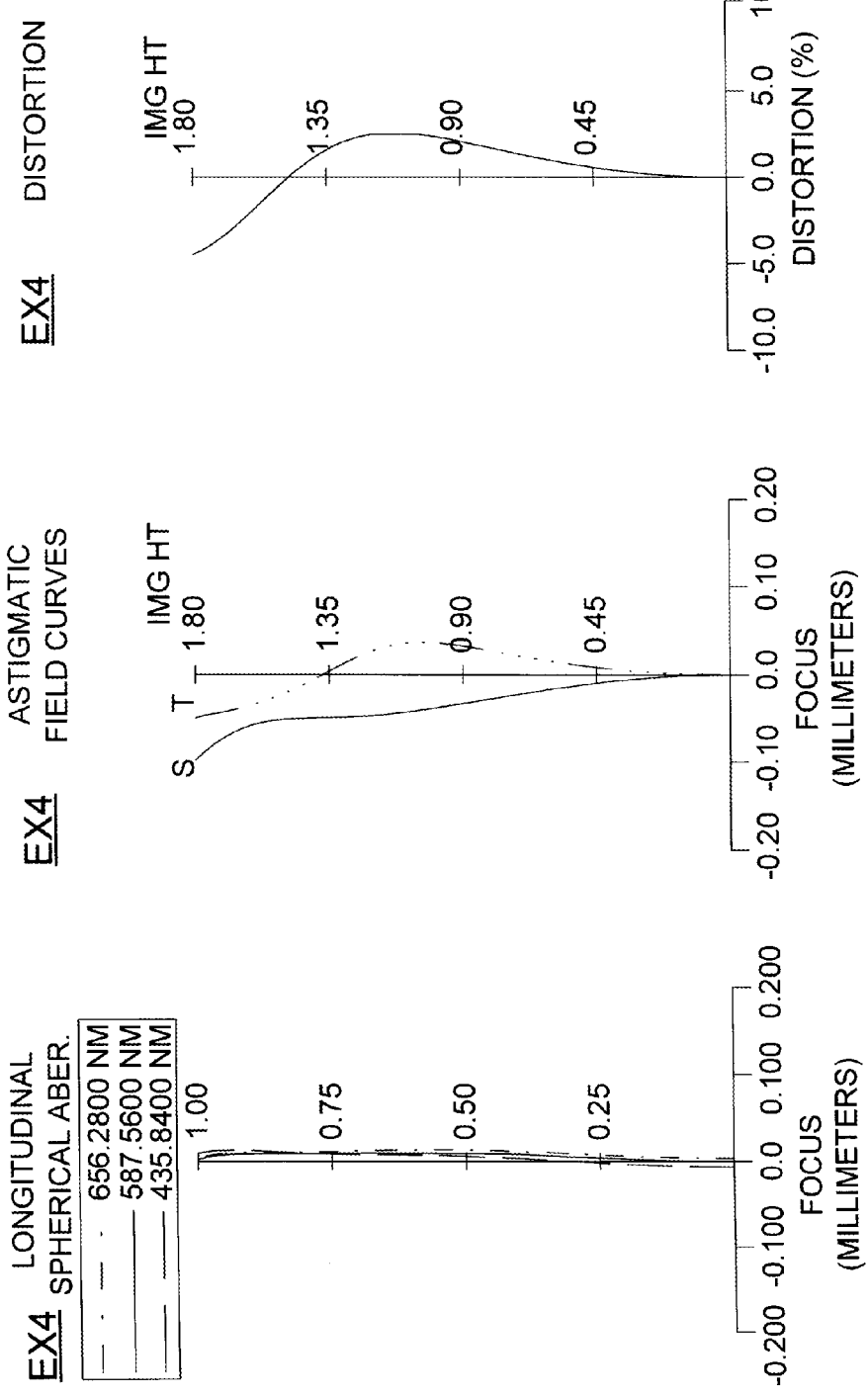

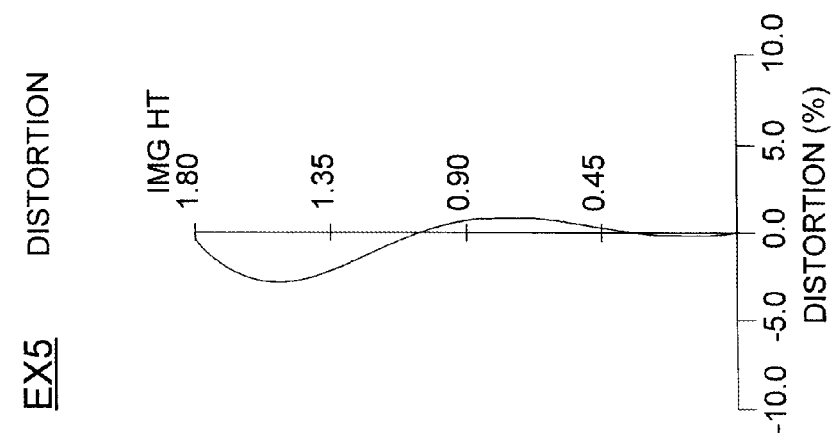
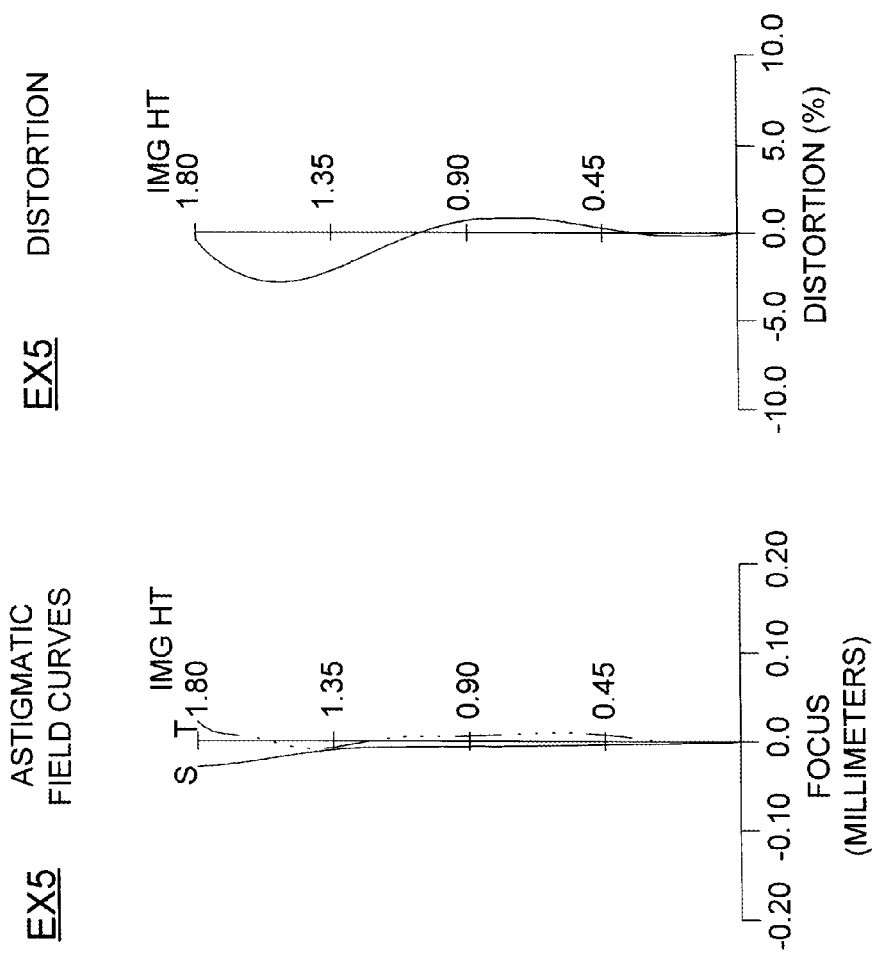
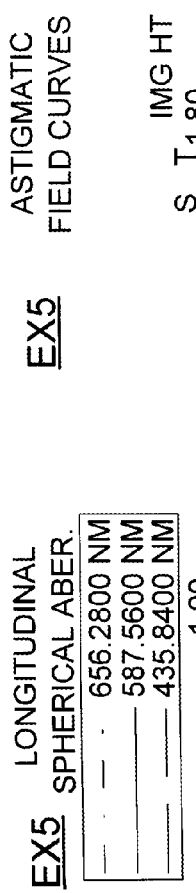

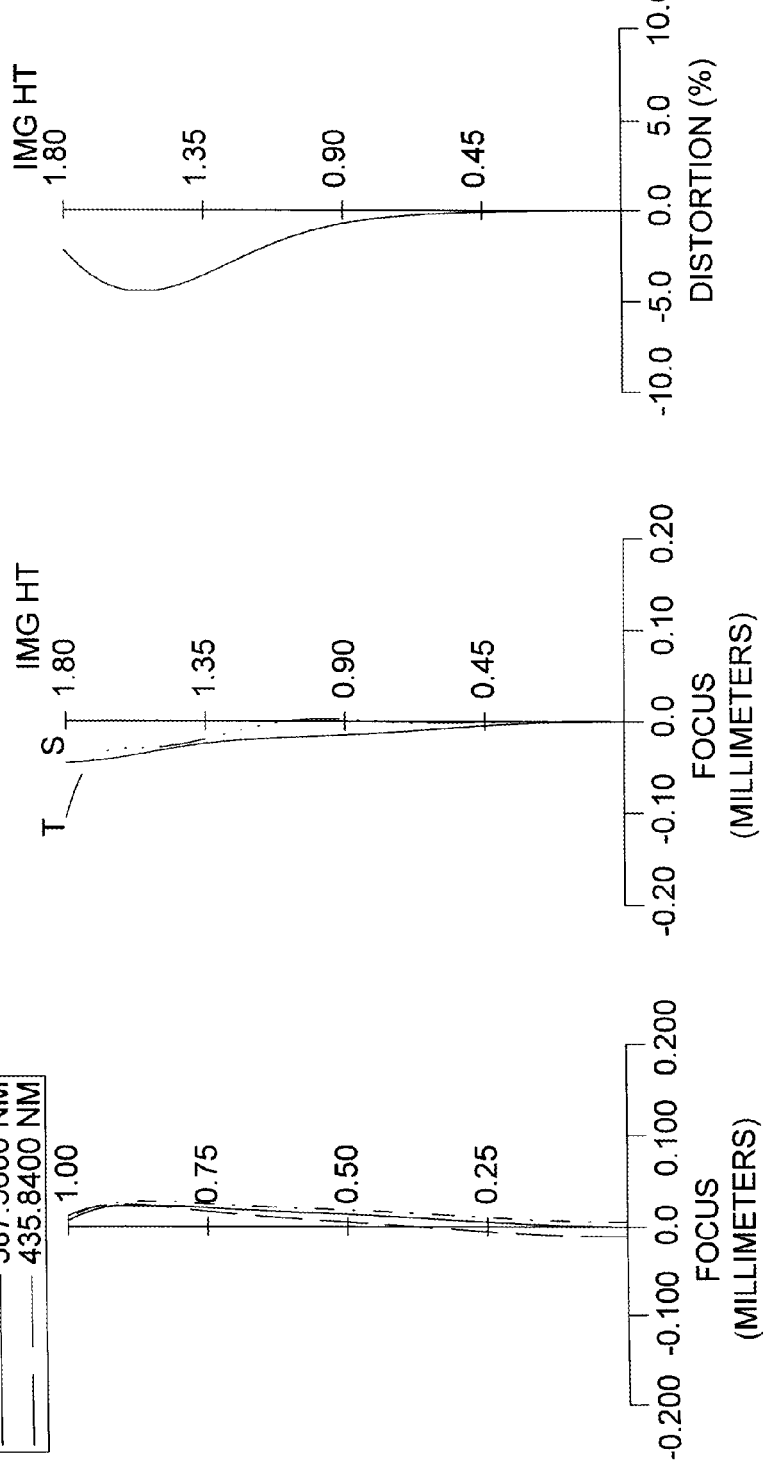

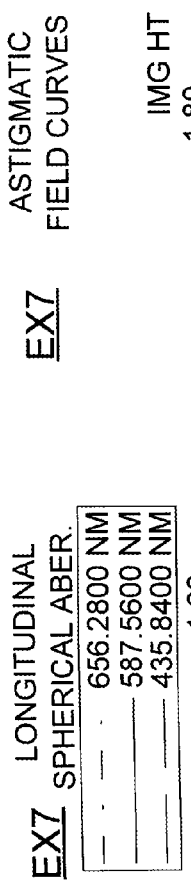
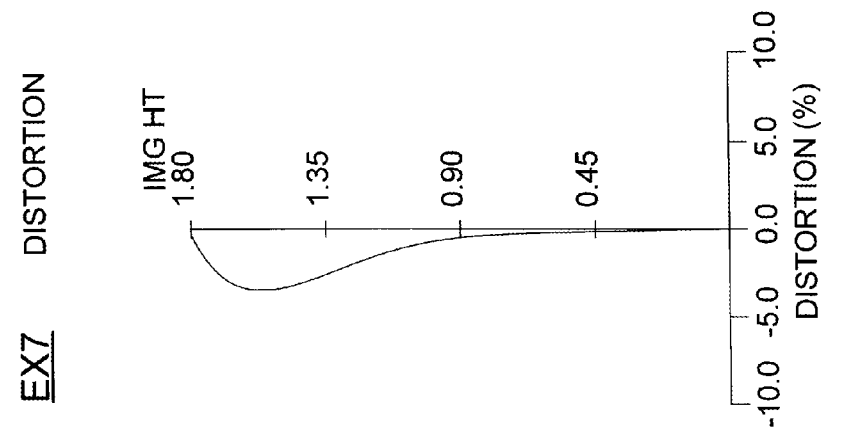
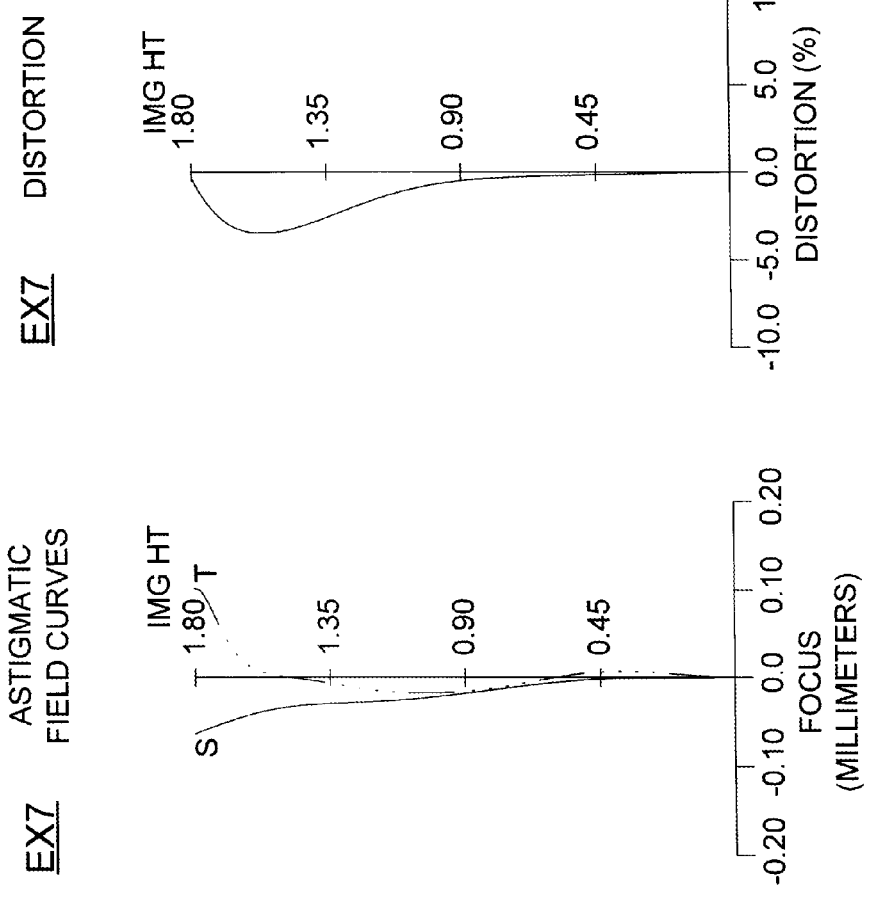

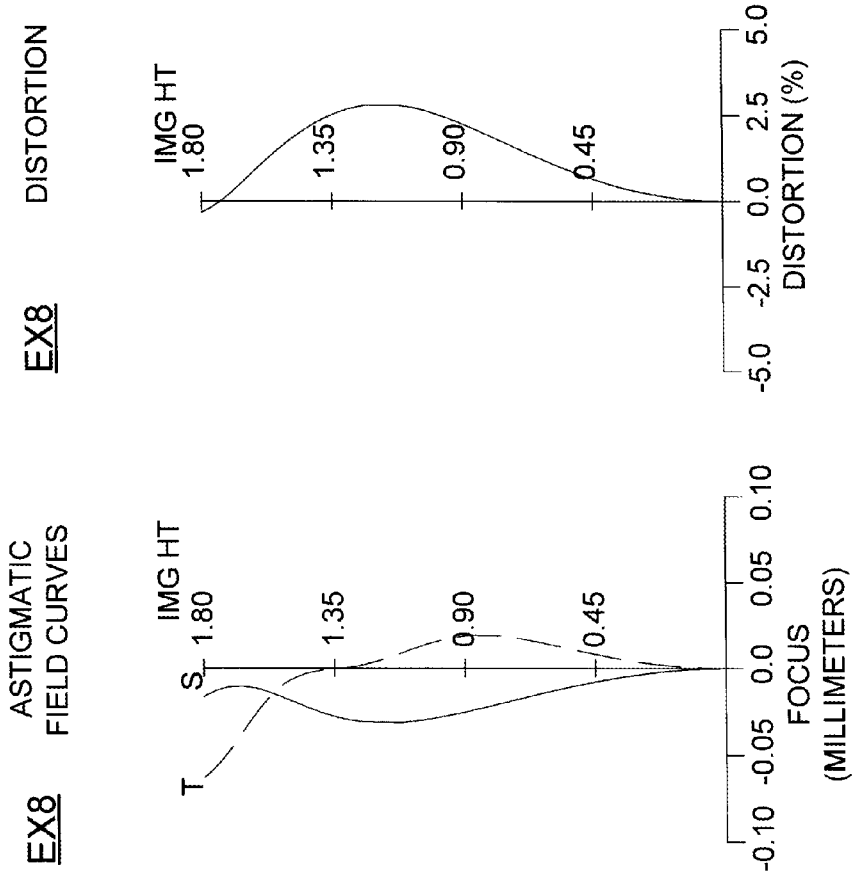

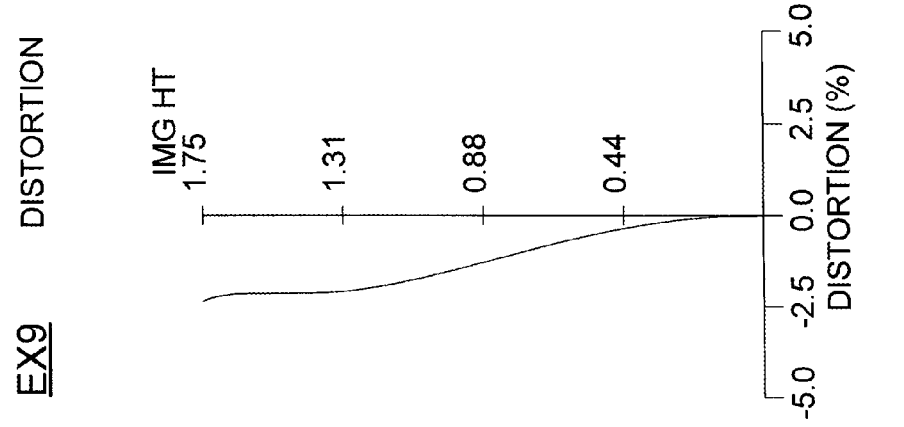
FIG.28C DISTORTION EX9
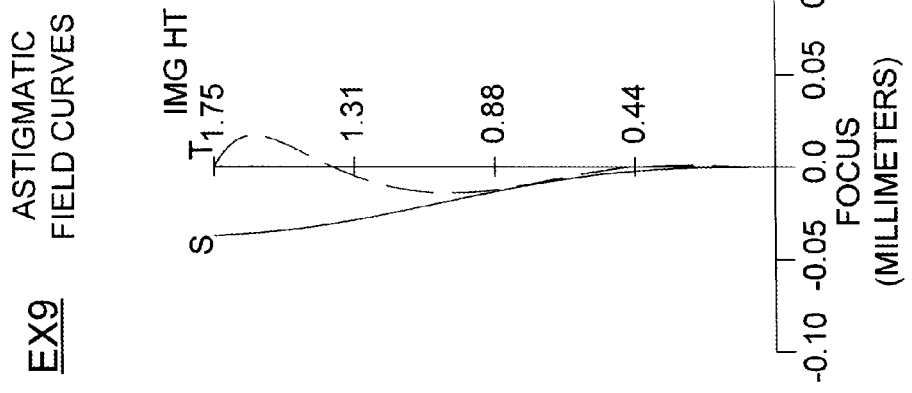
FIG.28B ASTIGMATIC FIELD CURVES EX9
FIG.28A LONGITUDINAL SPHERICAL ABER. EX9

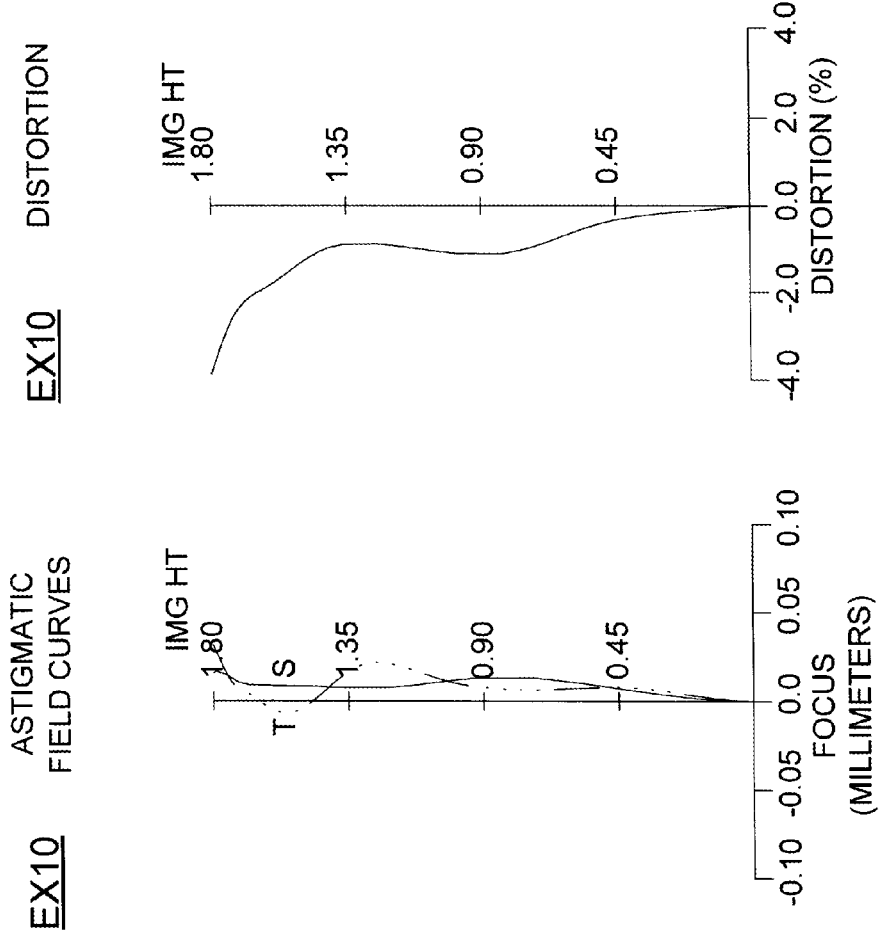

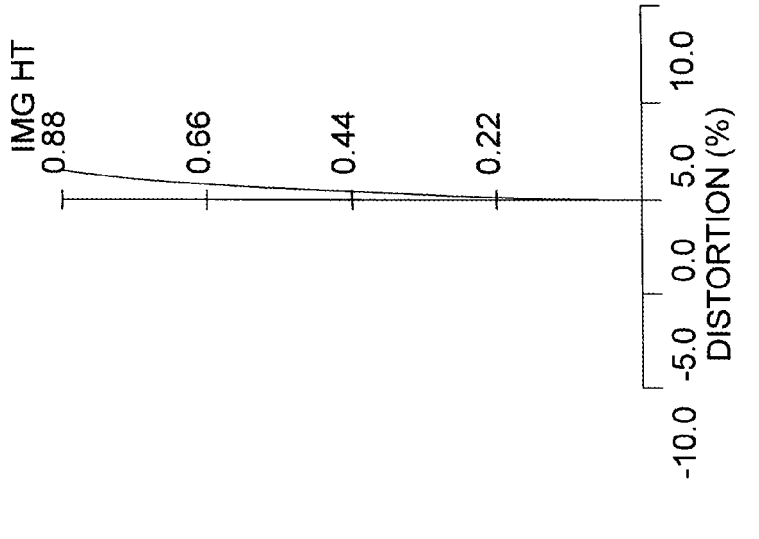
FIG.30C  DISTORTION
EX11
FIG.30B  ASTIGMATIC FIELD CURVES
EX11
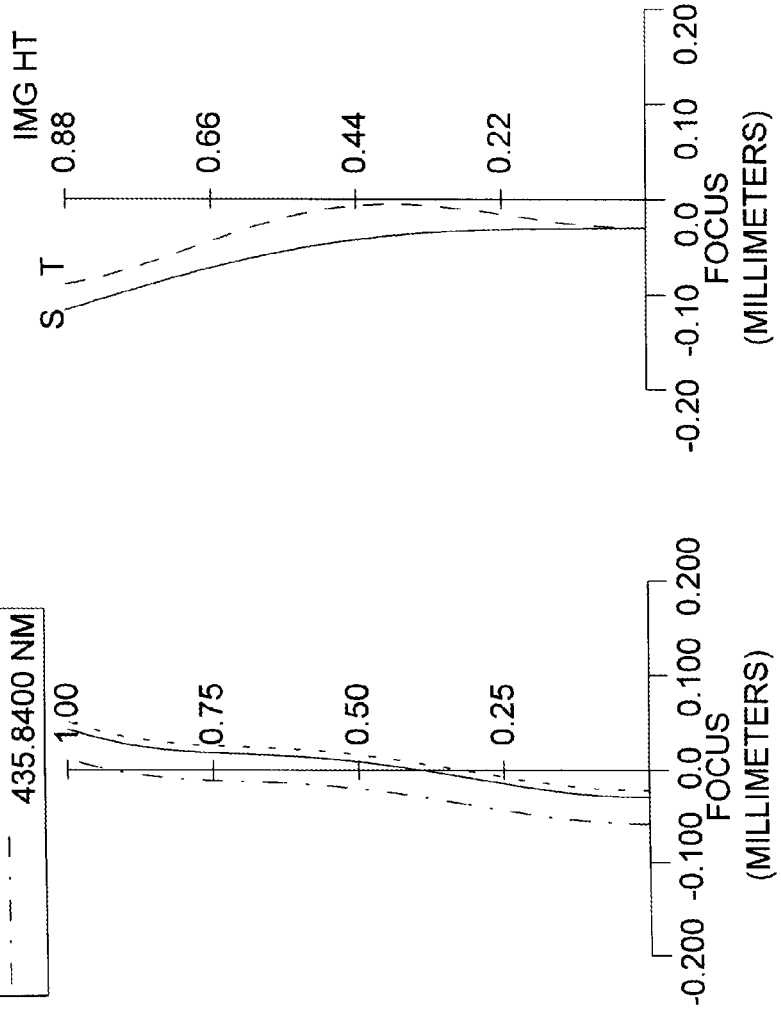
FIG.30A  LONGITUDINAL SPHERICAL ABER.
EX11
- - - - 656.2800 NM
—— 587.5600 NM
— · — 435.8400 NM

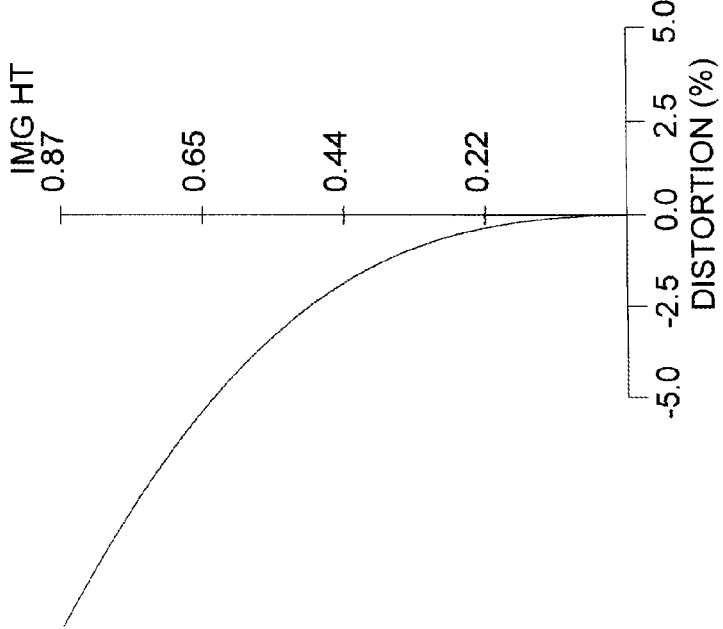

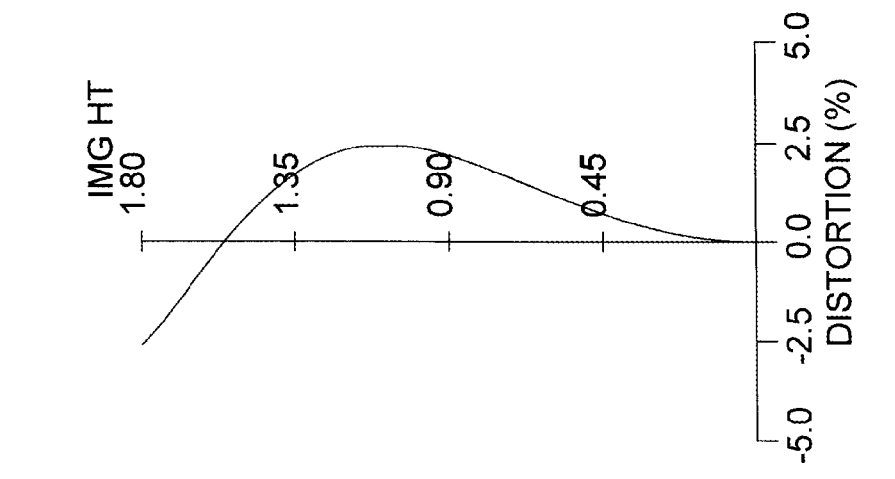
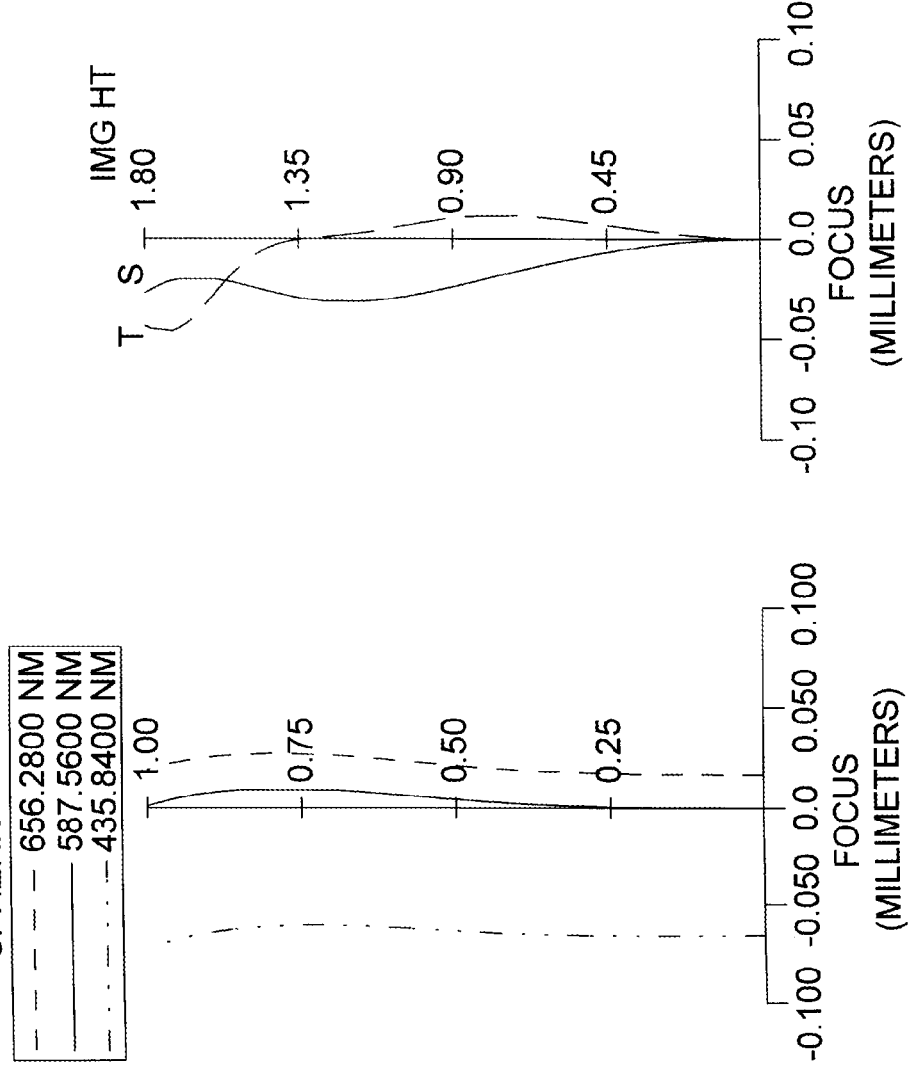

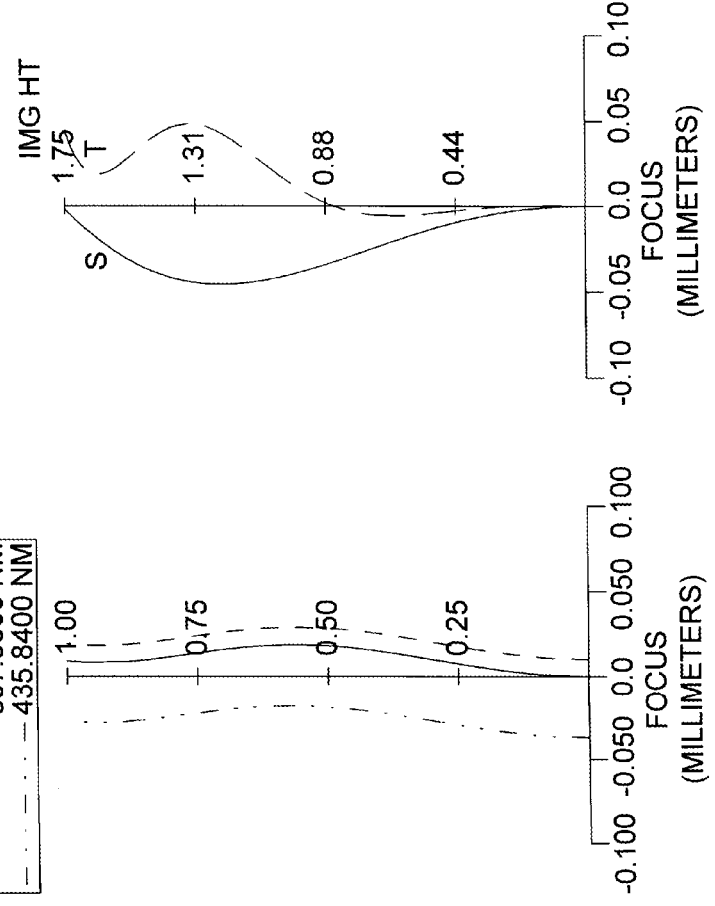
FIG.33A EX14 LONGITUDINAL SPHERICAL ABER.
FIG.33B EX14 ASTIGMATIC FIELD CURVES
FIG.33C EX14 DISTORTION

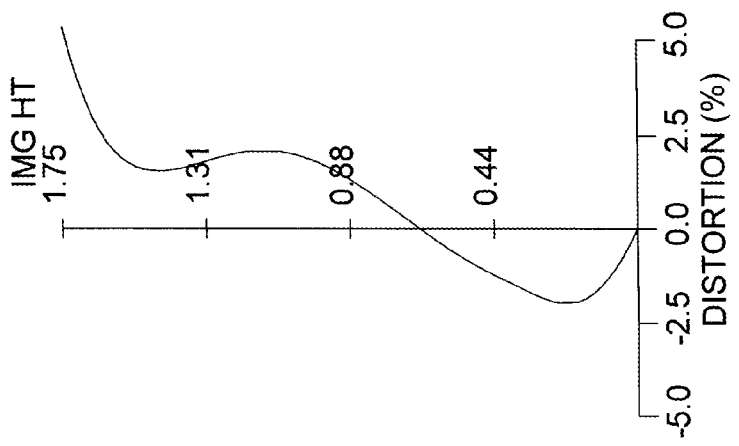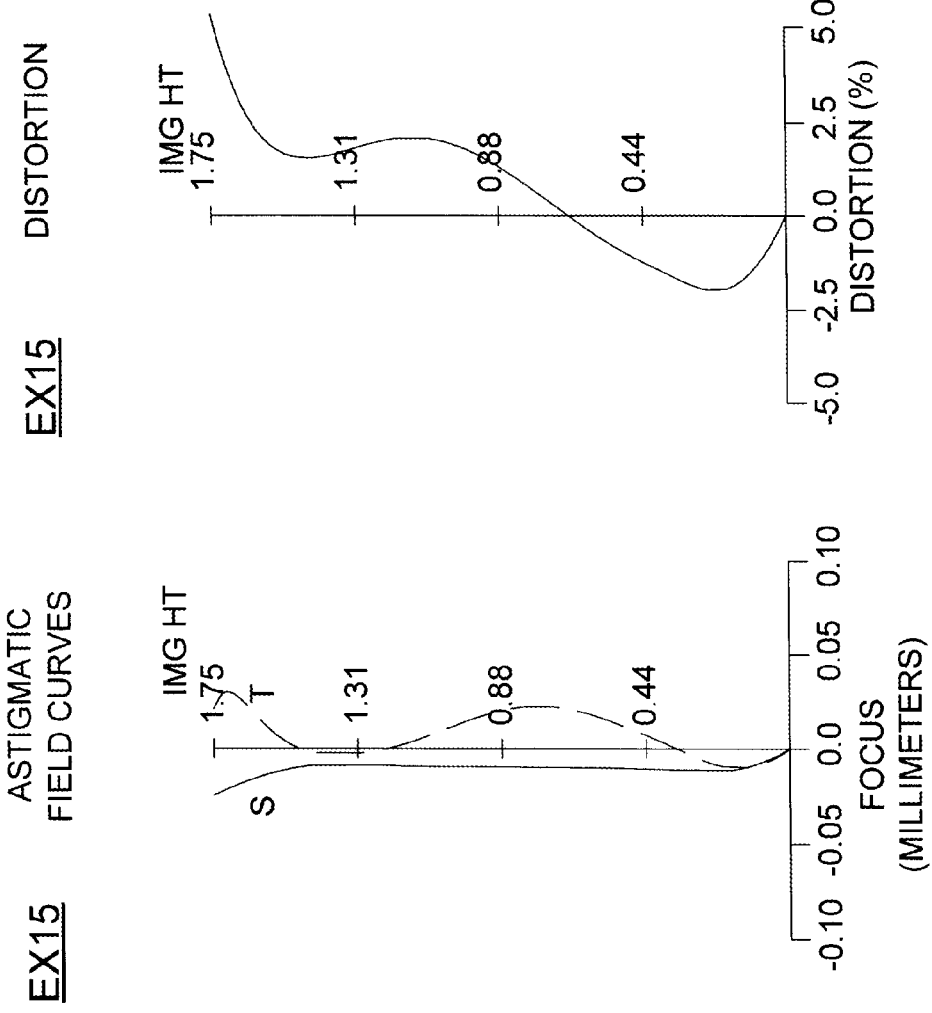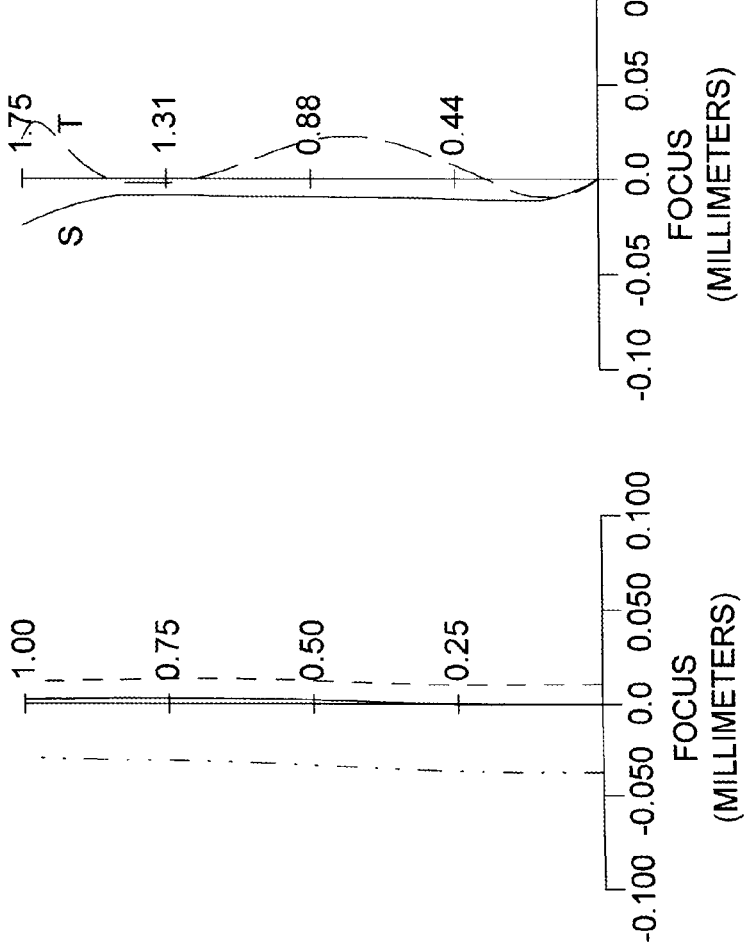

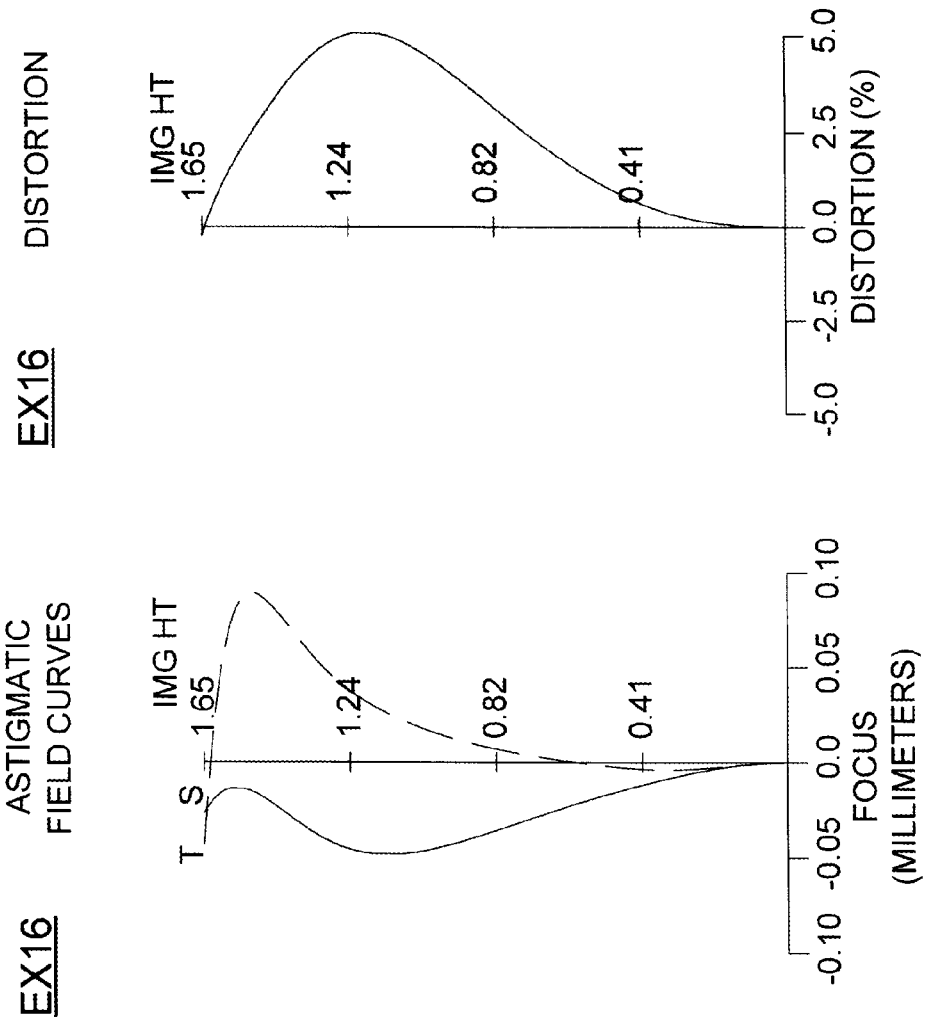
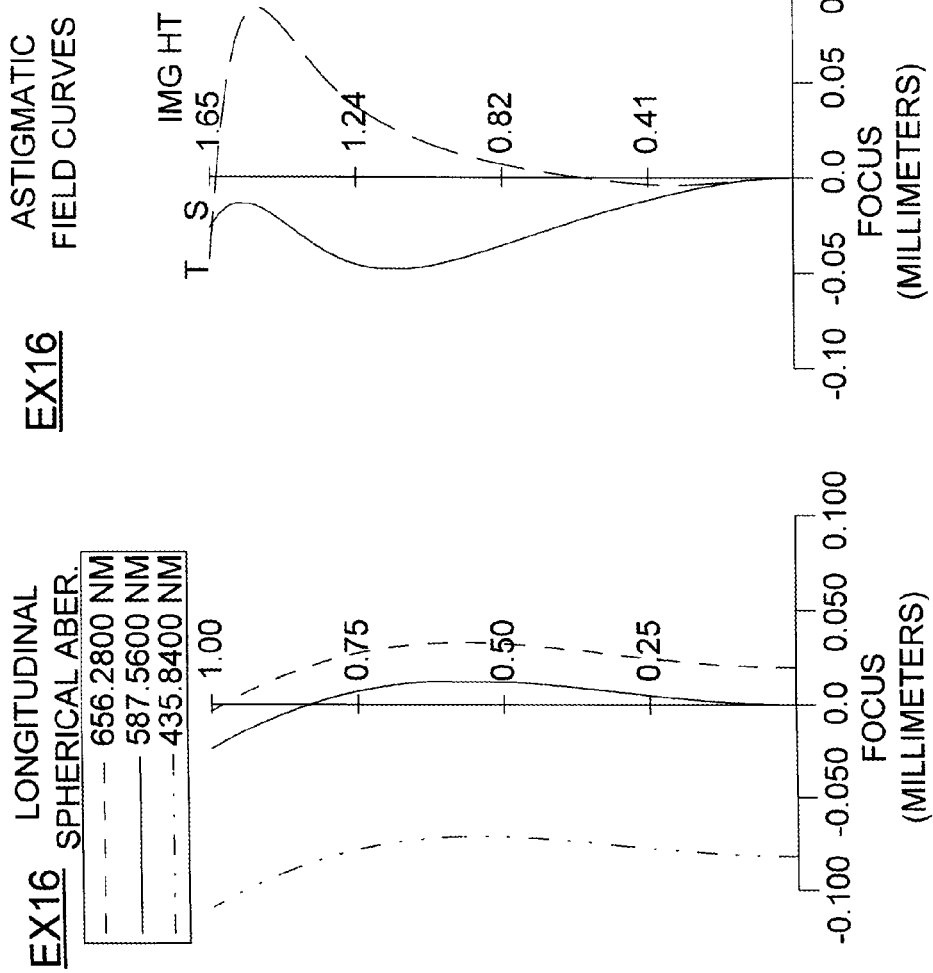

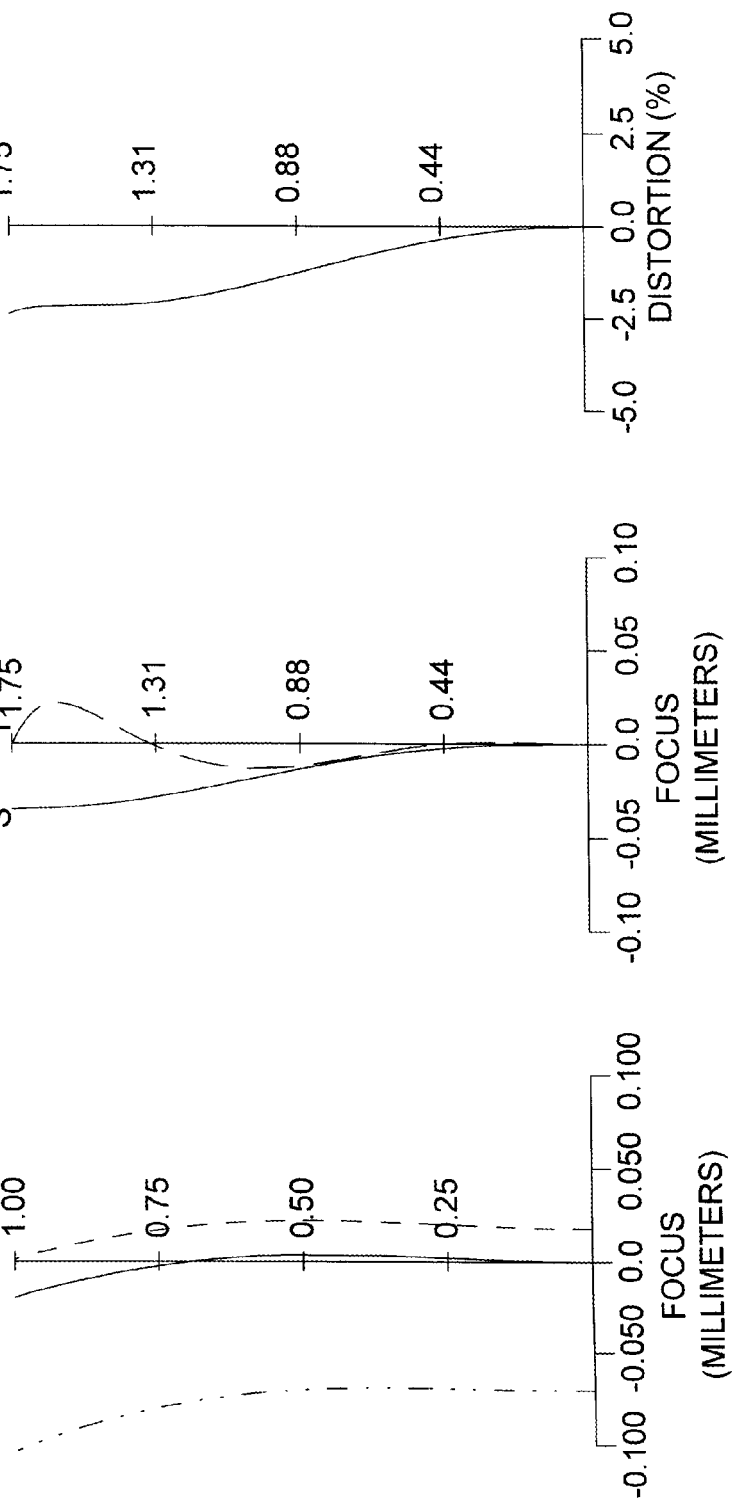
FIG. 36C DISTORTION EX17
FIG. 36B ASTIGMATIC FIELD CURVES EX17
FIG. 36A LONGITUDINAL SPHERICAL ABER. EX17

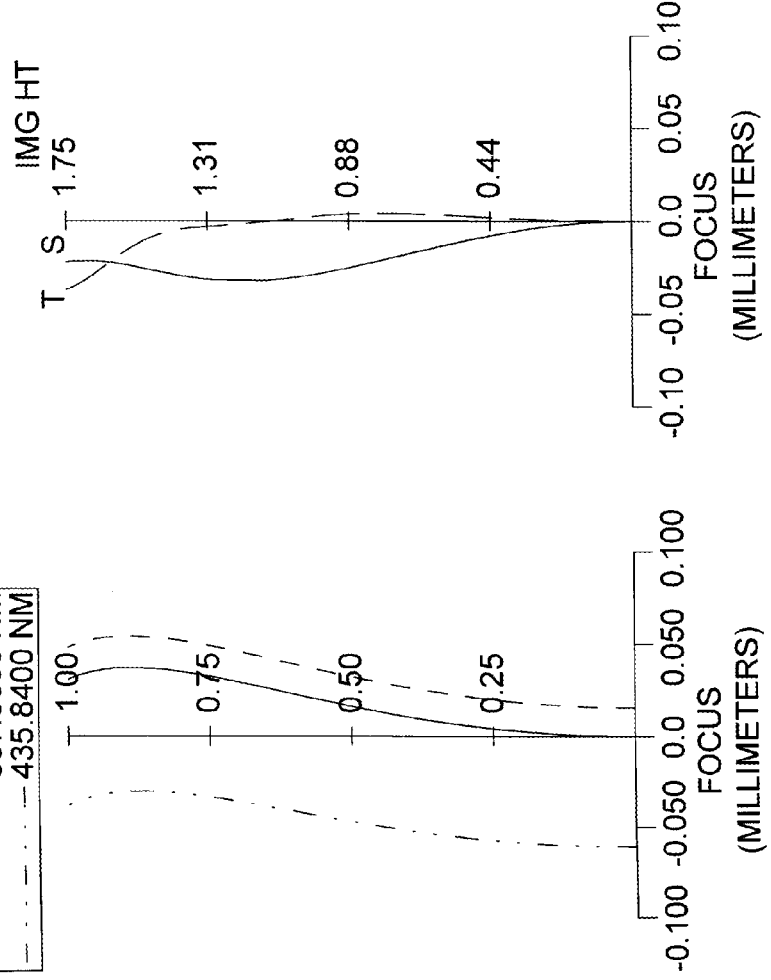
FIG.37A LONGITUDINAL SPHERICAL ABER. EX18
FIG.37B ASTIGMATIC FIELD CURVES EX18
FIG.37C DISTORTION EX18

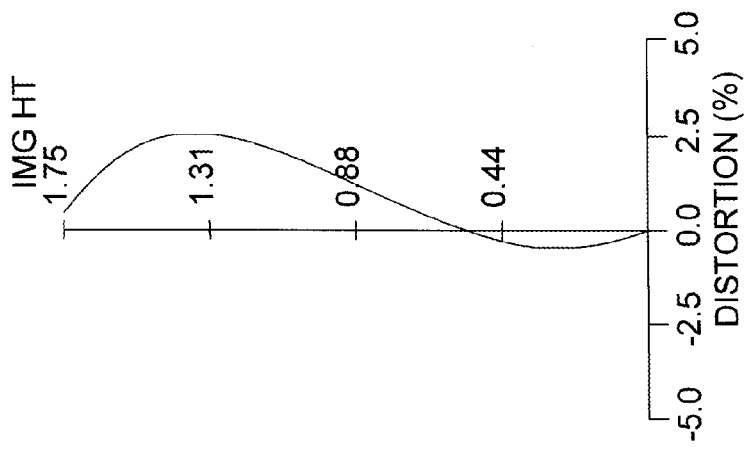
FIG.38C CEX DISTORTION
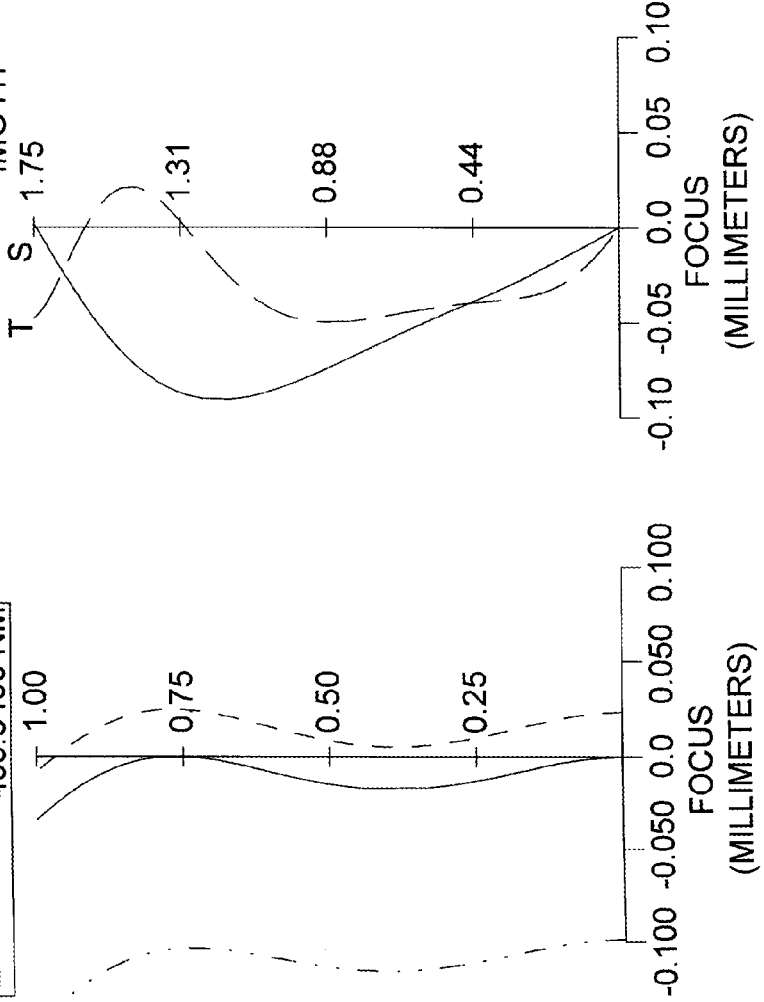
FIG.38B CEX ASTIGMATIC FIELD CURVES
FIG.38A CEX LONGITUDINAL SPHERICAL ABER.

IMAGING LENS, IMAGING DEVICE, PORTABLE TERMINAL, AND METHOD FOR MANUFACTURING IMAGING LENS

RELATED APPLICATIONS

This is a continuation of application Ser. No. 12/521,321, filed on Jun. 26, 2009, now U.S. Pat. No. 7,841,785, which was a U.S. National Phase Application under 35 U.S.C. §371 of International Application No. PCT/JP2008/052761, filed on Feb. 19, 2008, which claims priority from Japanese Patent Application Nos. 2007-038221 filed on Feb. 19, 2007, and 2007-229164 filed on Sep. 4, 2007.

TECHNICAL FIELD

The present invention relates to an imaging lens, an imaging device, a portable terminal, and a method for manufacturing an imaging lens.

BACKGROUND ART

These days, compact, slim imaging devices are incorporated in compact, slim electronic appliances called portable terminals (for example, cellular phones, PDAs (personal digital assistants), etc.). Between such a portable terminal and, for example, an electronic appliance at a remote location, information such as sound information and image information is transferred bidirectionally.

Image sensors used in imaging devices are, for example, solid-state image sensors such as CCD (charge-coupled device) image sensors and CMOS (complementary metal-oxide semiconductor) image sensors. Nowadays, as imaging lenses for forming a subject image on those image sensors, lenses made of resin are used that can be mass-produced inexpensively and that thus contribute to cost reduction.

As such imaging lenses, in particular as imaging lenses used in imaging devices (so-called camera modules) incorporated in portable terminals, there are widely known those comprising three plastic lenses and those comprising one glass lens and two plastic lenses. Inconveniently, however, these imaging lenses do not promise easy compatibility between further size reduction and higher mass-producibility due to technical limitations.

As one measure to overcome this inconvenience, Patent Document 1 listed below deals with the replica method. The replica method is a method for forming a large number of lenses (lens elements) on a single lens flat plate (wafer). And Patent Document 1 discloses an imaging lens comprising a cemented compound lens (lens block) formed by the replica method. Incidentally, in a cemented compound lens in an imaging lens, a diffractive surface and a refractive surface are formed simultaneously on a lens flat plate, so that with those surfaces the imaging lens corrects chromatic aberration.

On the other hand, Patent Document 2 listed below discloses a cemented compound lens comprising a lens flat plate, an object-side lens with respect to the lens flat plate, and an image-side lens with respect to the lens flat plate. In this cemented compound lens, from the viewpoint of aberration correction, the lens flat plate, the object-side lens, and the image-side lens are given indices of refraction, and also Abbe numbers, that do not differ much from one another.

Patent Document 1: JP-A-2006-323365
Patent Document 2: JP-B-3929479

DISCLOSURE OF THE INVENTION

Problems to be Solved by the Invention

Inconveniently, however, in the imaging lens disclosed in Patent Document 1, astigmatism increases toward periphery. Moreover, an aperture stop is formed on the object-side surface of the lens flat plate in the first cemented compound lens disposed at the most object-side position, and thus the optical performance of the imaging lens greatly depends on the lens surfaces located close to the aperture stop on either side of it. Consequently, the imaging lens is highly sensitive to manufacturing errors.

These inconveniences with the imaging lens of Patent Document 1 are encountered with the imaging lens of Patent Document 2 as well. For example, converting the various values standardized with respect to this imaging lens into practical values reveals astigmatism that increases toward periphery. Moreover, in the imaging lens disclosed in Patent Document 2, an aperture stop is disposed on the object side of the first cemented compound lens, and thus this imaging lens is more sensitive to manufacturing errors than the imaging lens disclosed in Patent Document 1.

The present invention has been made in view of the foregoing, and an object of the present invention is to provide an imaging lens etc. that help
- reduce the optical total length relative to the image height without inclusion of a diffractive surface or the like;
- achieve satisfactory aberration correction;
- restrain the sensitivity to manufacturing errors; and
- reduce costs.

Means for Solving the Problem

An imaging lens includes at least one lens block having: a lens substrate that is a plane-parallel plate; and a lens that is contiguous with at least one of the object-side and image-side substrate surfaces of the lens substrate and that exerts a positive or negative optical power. The imaging lens also includes an aperture stop that restricts light amount.

The lens blocks included in this imaging lens are given numbers, namely first to fourth, according to their place in order as counted from the object side to the image side. The lens substrates included in these lens blocks are given numbers, namely first to fourth, likewise. The lenses L in the lens blocks are each referred to as the lens L on the object side (o) or image side (i) of a given lens substrate LS (one of the first to fourth lens substrates LS1 to LS4), specifically the lens L[LS1$o$], the lens L[Ls1$m$], the lens L[LS2$o$], the lens L[Ls2$m$], the lens L[LS3$o$], the lens L[Ls3$m$], the lens L[LS4$o$], and the lens L[Ls4$m$].

In the imaging lens constructed as described above, a lens block includes a lens formed out of a material different from that out of which a lens substrate is formed, and a first lens block is located at the most object-side position. This first lens block includes a first lens substrate, and a lens L[LS1$o$] is contiguous with the object-side substrate surface of the first lens substrate. Furthermore, in this imaging lens, conditional formula (A1) below is fulfilled:

$$0 \leq DT[LS1o\text{-}ape]/d[LS1] \leq 1 \qquad (A1)$$

where
  DT[LS1$o$-ape] represents the distance from the object-side substrate surface of the first lens substrate to an aperture stop surface; and
  d[LS1] represents the thickness of the first lens substrate along the optical axis.

In the imaging lens, preferably, the aperture stop is formed on the object-side substrate surface of the first lens substrate.

In the imaging lens, preferably, the aperture stop is a light-shielding film, and is formed on the object-side or image-side substrate surface of the first lens substrate; moreover, conditional formula (A2) below is fulfilled:

$$d[ape] < 25 \quad (A2)$$

where
  d[ape] represents the thickness of the aperture stop in the optical axis direction (in the unit of μm).

In the imaging lens, preferably, the object-side lens surface of the lens L[LS1o] is convex to the object side.

In the imaging lens, preferably, in the first lens block, a lens L[LS1m] is contiguous with the image-side substrate surface of the first lens substrate, and the image-side lens surface of the lens L[LS1m] is concave to the image side.

In the imaging lens, preferably, conditional formulae (A3) and (A4) are fulfilled:

$$1.4 < f[all]/Y' < 1.9 \quad (A3)$$

$$0.18 \leq (d[L[LS1o]] + DT[LS1o-ape])/r[L[LS1o]o] \leq 1.2 \quad (A4)$$

where
  f[all] represents the focal length of the entire imaging lens;
  Y' represents the maximum image height.
  d[L[LS1o]] represents the thickness of the lens L[LS1o] along the optical axis;
  DT[LS1o–ape] represents the distance from the object-side substrate surface of the first lens substrate to the aperture stop surface; and
  r[L[LS1o]o] represents the paraxial radius of curvature of the object-side lens surface of the lens L[LS1o].

In the imaging lens, preferably, conditional formula (A5) is fulfilled:

$$0.03 \leq d[LS1]/TL \leq 0.33 \quad (A5)$$

where
  d[LS1] represents the thickness of the first lens substrate along the optical axis; and
  TL represents the distance from the most object-side surface in the imaging lens LN to the imaging surface along the optical axis.

In the imaging lens, preferably, a lens substrate is formed by cementing together two flat-plate-shaped glass pieces, and the aperture stop is located at the cemented surface between the flat-plate-shaped glass pieces.

In the imaging lens, preferably, in the first lens block, a lens L[LS1m] is contiguous with the image-side substrate surface of the first lens substrate, and conditional formula (A6) is fulfilled:

$$Cs[L[LS1o]o]/Cs[L[LS1m]m] \leq 1.3 \quad (A6)$$

where
  Cs[L[LS1o]o] represents the effective diameter on the object-side lens surface of the lens L[LS1o]; and
  Cs[L[LS1m]m] represents the effective diameter on the image-side lens surface of the lens L[LS1m].

In the imaging lens, preferably, in the first lens block, a lens L[LS1m] is contiguous with the image-side substrate surface of the first lens substrate, and conditional formula (A7) is fulfilled:

$$-13 \leq HY[L[LS1m]m]/HY[L[LS1o]o] \leq -0.08 \quad (A7)$$

where
  HY[L[LS1m]m] represents the distance between the optical axis and the principal ray with the maximum image height which passes through the image-side lens surface of the lens L[LS1m]; and
  HY[L[LS1o]o] represents the distance between the optical axis and the principal ray with the maximum image height which passes through the object-side lens surface of the lens L[LS1o].

In the imaging lens, preferably, a second lens block is located to the image side of the first lens block, and the second lens block includes a second lens substrate; moreover, a lens L[LS2o] is contiguous with the object-side substrate surface of the second lens substrate, and a lens L[LS2m] is contiguous with the image-side substrate surface of the second lens substrate.

Particularly preferably, the object-side lens surface of the lens L[LS2o] is aspherical, being convex at the vertex thereof and concave in a part thereof where it intersects the principal ray with the maximum image height, and the image-side lens surface of the lens L[LS2o] is planar; the object-side lens surface of the lens L[LS2m] is planar; furthermore, the object-side substrate surface of the second lens substrate is contiguous with the image-side lens surface of the lens L[LS2o], and the image-side substrate surface of the second lens substrate is contiguous with the object-side lens surface of the lens L[LS2m].

When the imaging lens includes a lens L[LS2o], a second lens substrate, and a lens L[LS2m], preferably, the object-side lens surface of the lens L[LS2o] is concave to an object side, and the image-side lens surface of the lens L[LS2o] is planar; the object-side lens surface of the lens L[LS2m] is planar; furthermore, the object-side substrate surface of the second lens substrate is contiguous with the image-side lens surface of the lens L[LS2o], and the image-side substrate surface of the second lens substrate is contiguous with the object-side lens surface of the lens L[LS2m].

In the imaging lens, preferably, a second lens block is located to the image side of the first lens block, and a third lens block is located to the image side of the second lens block; the third lens block includes a third lens substrate; a lens L[LS3o] is contiguous with the object-side substrate surface of the third lens substrate, and a lens L[LS3m] is contiguous with the image-side substrate surface of the third lens substrate.

Particularly preferably, the object-side lens surface of the lens L[LS3o] is concave to the object side, and the image-side lens surface of the lens L[LS3o] is planar; the object-side lens surface of the lens L[LS3m] is planar; furthermore, the object-side substrate surface of the third lens substrate is contiguous with the image-side lens surface of the lens L[LS3o], and the image-side substrate surface of the third lens substrate is contiguous with the object-side lens surface of the lens L[LS3m].

When the imaging lens includes a lens L[LS3o], a third lens substrate, and a lens L[LS3m], preferably, at least one of the object-side lens surface of the lens L[LS3o] and the image-side lens surface of the lens L[LS3m] is aspherical, and both the image-side lens surface of the lens L[LS3o] and the object-side lens surface of the lens L[LS3m] are planar; furthermore, the object-side substrate surface of the third lens substrate is contiguous with the image-side lens surface of the lens L[LS3o], and the image-side substrate surface of the third lens substrate is contiguous with the object-side lens surface of the lens L[LS3m].

In the imaging lens, preferably, a lens surface of a lens that makes contact with air is aspherical.

In the imaging lens, preferably, a lens and a lens substrate have different indices of refraction.

In the imaging lens, preferably, a lens is formed of resin.

Preferably, the resin out of which a lens is formed has inorganic fine particles with a particle diameter of 30 nm or less dispersed therein.

Preferably, the resin is a hardening resin.

In the imaging lens, preferably, a lens contiguous with the object-side or image-side substrate surface of a lens substrate is bonded directly to the lens substrate.

Also covered by the present invention is an imaging device including: an imaging lens as described above; and an image sensor sensing the light passing through the imaging lens. Also covered by the present invention is a portable terminal including such an imaging device.

A preferable method of manufacturing an imaging lens as described above includes, let a unit including a plurality of lens blocks arranged in an array be called a lens block unit: a joining step of arranging a spacer at least at part of the peripheral edge of the lens blocks and joining the plurality of lens block units together; and a cutting step of cutting the joined-together lens block units along the spacer.

Advantages of the Invention

According to the present invention, an imaging lens includes at least one lens block. Moreover, in this imaging lens, an aperture stop is located suitably to secure telecentricity and simultaneously offer satisfactory aberration correction performance. In addition, the satisfactory aberration correction performance makes the manufacture of the imaging lens easy, with the result that the imaging lens is manufactured inexpensively.

BRIEF DESCRIPTION OF DRAWINGS

FIG. 20A is a spherical aberration diagram of the imaging lens of Example 1.
FIG. 20B is an astigmatism diagram of the imaging lens of Example 1.
FIG. 20C is a distortion diagram of the imaging lens of Example 1.
FIG. 21A is a spherical aberration diagram of the imaging lens of Example 2.
FIG. 21B is an astigmatism diagram of the imaging lens of Example 2.
FIG. 21C is a distortion diagram of the imaging lens of Example 2.
FIG. 22A is a spherical aberration diagram of the imaging lens of Example 3.
FIG. 22B is an astigmatism diagram of the imaging lens of Example 3.
FIG. 22C is a distortion diagram of the imaging lens of Example 3.
FIG. 23A is a spherical aberration diagram of the imaging lens of Example 4.
FIG. 23B is an astigmatism diagram of the imaging lens of Example 4.
FIG. 23C is a distortion diagram of the imaging lens of Example 4.
FIG. 24A is a spherical aberration diagram of the imaging lens of Example 5.
FIG. 24B is an astigmatism diagram of the imaging lens of Example 5.
FIG. 24C is a distortion diagram of the imaging lens of Example 5.
FIG. 25A is a spherical aberration diagram of the imaging lens of Example 6.
FIG. 25B is an astigmatism diagram of the imaging lens of Example 6.
FIG. 25C is a distortion diagram of the imaging lens of Example 6.
FIG. 26A is a spherical aberration diagram of the imaging lens of Example 7.
FIG. 26B is an astigmatism diagram of the imaging lens of Example 7.
FIG. 26C is a distortion diagram of the imaging lens of Example 7.
FIG. 27A is a spherical aberration diagram of the imaging lens of Example 8.
FIG. 27B is an astigmatism diagram of the imaging lens of Example 8.
FIG. 27C is a distortion diagram of the imaging lens of Example 8.
FIG. 28A is a spherical aberration diagram of the imaging lens of Example 9.
FIG. 28B is an astigmatism diagram of the imaging lens of Example 9.
FIG. 28C is a distortion diagram of the imaging lens of Example 9.
FIG. 29A is a spherical aberration diagram of the imaging lens of Example 10.
FIG. 29B is an astigmatism diagram of the imaging lens of Example 10.
FIG. 29C is a distortion diagram of the imaging lens of Example 10.
FIG. 30A is a spherical aberration diagram of the imaging lens of Example 11.
FIG. 30B is an astigmatism diagram of the imaging lens of Example 11.

FIG. 30C is a distortion diagram of the imaging lens of Example 11.

FIG. 31A is a spherical aberration diagram of the imaging lens of Example 12.

FIG. 31B is an astigmatism diagram of the imaging lens of Example 12.

FIG. 31C is a distortion diagram of the imaging lens of Example 12.

FIG. 32A is a spherical aberration diagram of the imaging lens of Example 13.

FIG. 32B is an astigmatism diagram of the imaging lens of Example 13.

FIG. 32C is a distortion diagram of the imaging lens of Example 13.

FIG. 33A is a spherical aberration diagram of the imaging lens of Example 14.

FIG. 33B is an astigmatism diagram of the imaging lens of Example 14.

FIG. 33C is a distortion diagram of the imaging lens of Example 14.

FIG. 34A is a spherical aberration diagram of the imaging lens of Example 15.

FIG. 34B is an astigmatism diagram of the imaging lens of Example 15.

FIG. 34C is a distortion diagram of the imaging lens of Example 15.

FIG. 35A is a spherical aberration diagram of the imaging lens of Example 16.

FIG. 35B is an astigmatism diagram of the imaging lens of Example 16.

FIG. 35C is a distortion diagram of the imaging lens of Example 16.

FIG. 36A is a spherical aberration diagram of the imaging lens of Example 17.

FIG. 36B is an astigmatism diagram of the imaging lens of Example 17.

FIG. 36C is a distortion diagram of the imaging lens of Example 17

FIG. 37A is a spherical aberration diagram of the imaging lens of Example 18.

FIG. 37B is an astigmatism diagram of the imaging lens of Example 18.

FIG. 37C is a distortion diagram of the imaging lens of Example 18.

FIG. 38A is a spherical aberration diagram of the imaging lens of the comparison example.

FIG. 38B is an astigmatism diagram of the imaging lens of the comparison example.

FIG. 38C is a distortion diagram of the imaging lens of the comparison example.

LIST OF REFERENCE SYMBOLS

BK Lens block
L Lens
LS Lens substrate
ape Aperture stop
s Lens surface or substrate surface
* Aspherical surface
PT Plane-parallel plate
LN Imaging lens
SR Image sensor
IM Image surface (optical image)
SS Sensing surface
AX Optical axis
LU Imaging device
CU Portable terminal
1 Signal processor
2 Controller
3 Memory
4 Operated portion
5 Display portion

BEST MODE FOR CARRYING OUT THE INVENTION

[Embodiment 1]
[Imaging Device and Portable Terminal]

Typically, imaging lenses are suitably used in digital appliances (for example, portable terminals) equipped with an image capturing capability. This is because a digital appliance including a combination of an imaging lens, an image sensor, etc. functions as an imaging device that optically takes in an image of a subject and outputs it in the form of an electrical signal.

An imaging device is a main component (optical device) of a camera that shoots still and moving images of a subject, and includes, for example, from the object (i.e. subject) side thereof, an imaging lens that forms an optical image of an object and an image sensor that converts the optical image formed by the imaging lens into an electrical signal.

Examples of cameras include digital cameras, video cameras, monitoring cameras, vehicle-mounted cameras, and videophone cameras. Cameras may also be incorporated in, or externally fitted to, personal computers, portable terminals (for example, compact, portable information appliance terminals such as cellular phones and mobile computers), peripheral appliances (scanners, printers, etc.) for those, other digital appliances, etc.

As these examples suggest, incorporation of an imaging device is not limited to building of cameras; incorporation of an imaging device allows building of a variety of appliances equipped with camera capabilities, for example building of digital appliances equipped with an image capturing capability, such as camera phones.

Figure 39:
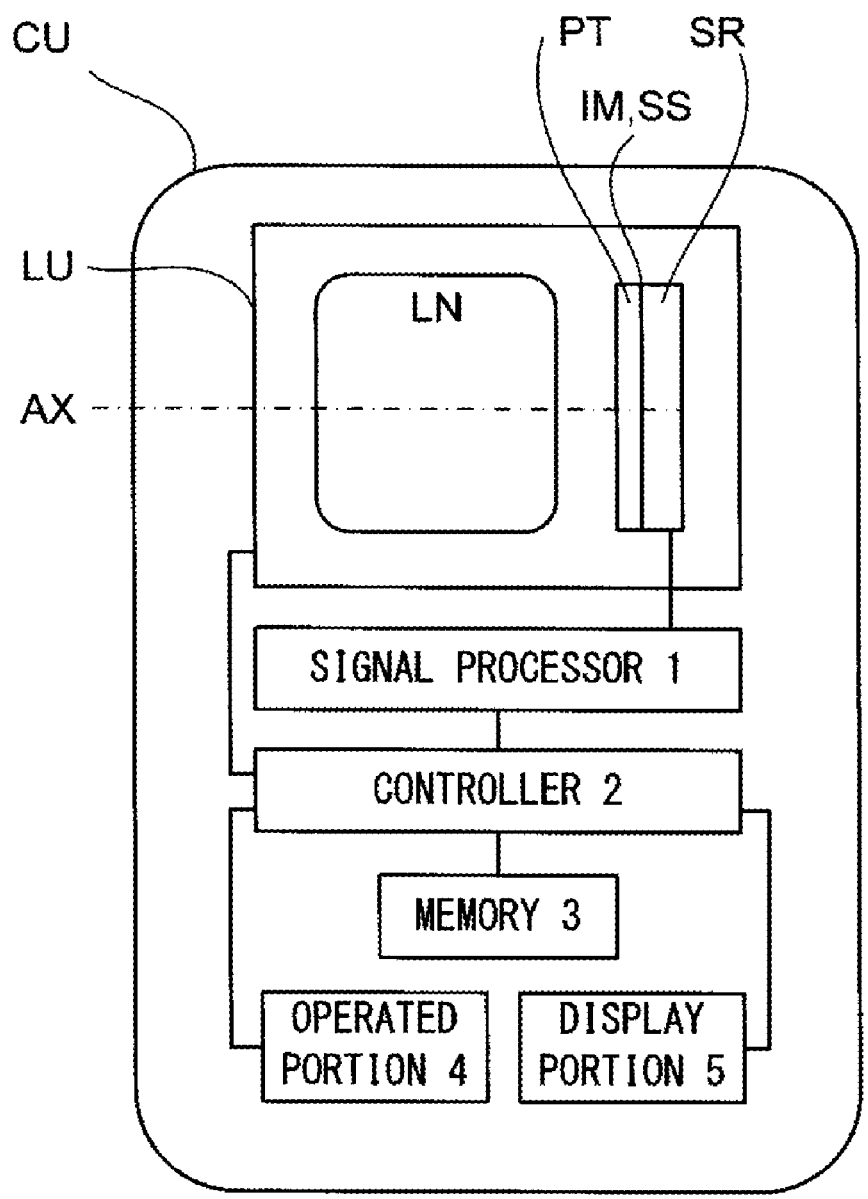
FIG. 39 is a block diagram of a portable terminal

FIG. 39 is a block diagram of a portable terminal CU as one example of a digital appliance equipped with an image capturing capability. The portable terminal CU shown in this figure incorporates an imaging device LU, which includes an imaging lens LN, a plane-parallel plate PT, and an image sensor SR.

The imaging lens LN forms, from the object (i.e. subject) side thereof, an optical image (image surface) IM of an object. More specifically, the imaging lens LN includes, for example, a lens block BK (which will be described in detail later), and forms the optical image IM on a sensing surface SS of the image sensor SR.

Here, the optical image IM to be formed by the imaging lens LN passes through, for example, an optical low-pass filter (in FIG. 39, the plane-parallel plate PT) having a predetermined cut-off frequency characteristic determined by the pixel pitch of the image sensor SR. While passing there the optical image IM has its spatial frequency characteristic adjusted so as to minimize the so-called aliasing noise occurring when it is converted into an electrical signal.

The adjustment of the spatial frequency characteristic here helps reduce color moiré. In cases where the performance expected around the resolution limit frequency is modest, however, no noise occurs even without use of an optical low-pass filter. Likewise, in cases where a user shoots or watches images by use of a display system (for example, the liquid crystal display of a cellular phone etc.) on which noise is less noticeable, there is no need for an optical low-pass filter.

The plane-parallel plate PT is one or more optical filters, such as an optical low-pass filter and an infrared cut filter, that are arranged as necessary (the plane-parallel plate PT may correspond to the cover glass or the like of the image sensor SR).

The image sensor SR converts the optical image IM formed on the sensing surface SS by the imaging lens LN into an electrical signal. Used here is, for example, an image sensor (solid-state image sensor), such as a CCD (charge-coupled device) image sensor or CMOS (complementary metal-oxide semiconductor) image sensor. The imaging lens LN is so located as to form the optical image IM of the subject on the sensing surface SS of the image sensor SR. Thus the optical image IM formed by the imaging lens LN is efficiently converted into an electrical signal by the image sensor SR.

When an imaging device LU like this is incorporated in a portable terminal CU equipped with an image capturing capability, the imaging device LU is typically arranged inside the body of the portable terminal CU. When the camera capabilities of the portable terminal CU are used, the imaging device LU is brought into a desired state. For example, an imaging device LU provided as a unit may be designed to be detachable from, or freely rotatable relative to, the main unit of a portable terminal CU.

The portable terminal CU includes, in addition to the imaging device LU, a signal processor 1, a controller 2, a memory 3, an operated portion 4, and a display portion 5.

The signal processor 1 subjects the signal generated by the image sensor SR to predetermined digital image processing and image compression processing as necessary. The so processed signal is then recorded, as a digital video signal, to the memory 3 (a semiconductor memory, optical disk, or the like), and/or is transferred to an external device across a cable or after being converted into an infrared signal.

The controller 2 is a microcomputer, and governs, in a concentrated fashion, functional control for shooting and playing back images etc., more specifically for controlling a lens movement mechanism for focusing etc. For example, the controller 2 controls the imaging device LU to shoot at least either a still or moving image of the subject.

The memory 3 stores, for example, the signal generated by the image sensor SR and then processed by the signal processor 1.

The operated portion 4 includes operated members such as operation buttons (for example, a shutter-release button) and an operation dial (for example, an operation mode dial), and transmits the information entered by an operator to the controller 2.

The display portion 5 includes a display such as a liquid crystal monitor, and displays images by use of the image signal resulting from the conversion by the image sensor SR, or by use of image information recorded in the memory 3.

[Imaging Lens]

Figure 1:
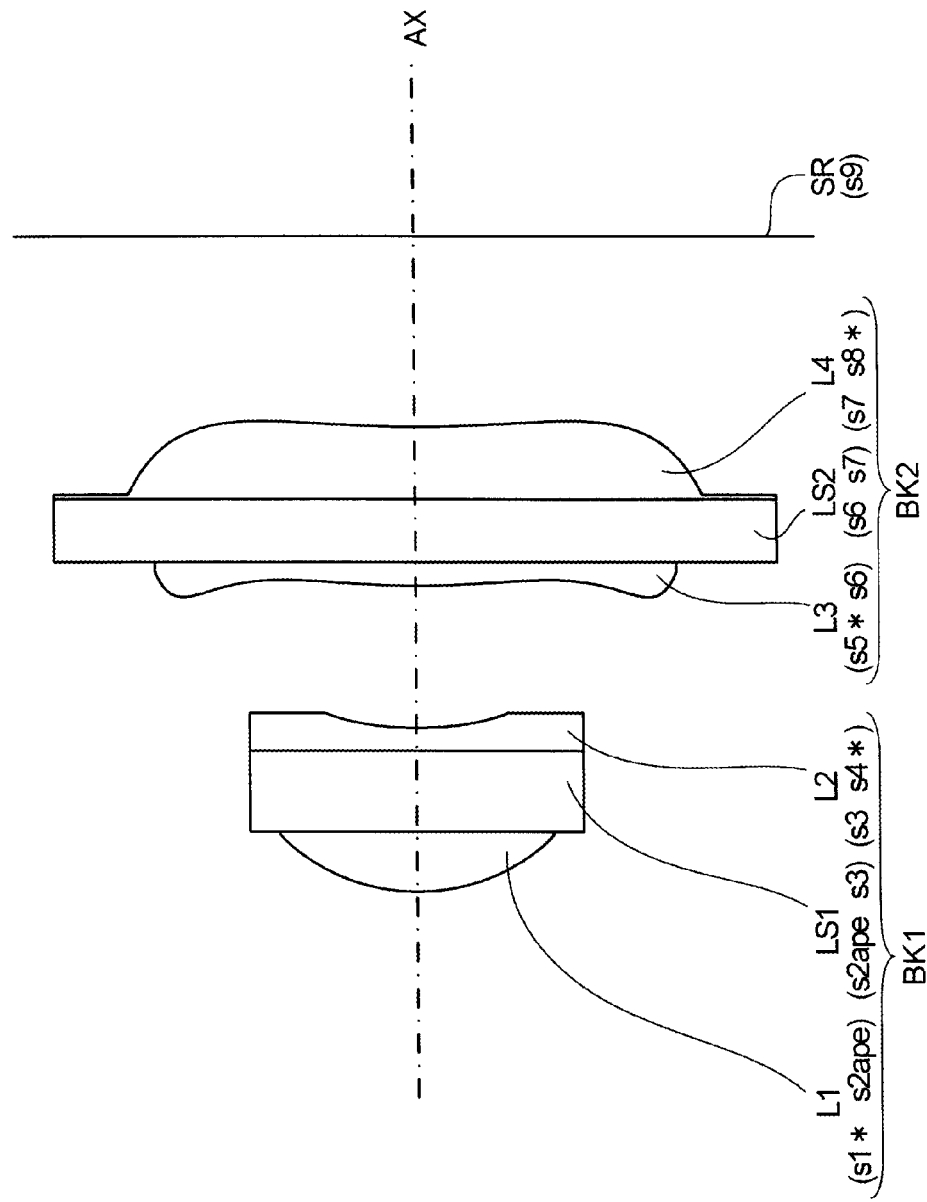
FIG. 1 is an optical sectional view of the imaging lens of Example 1.
Figure 2:
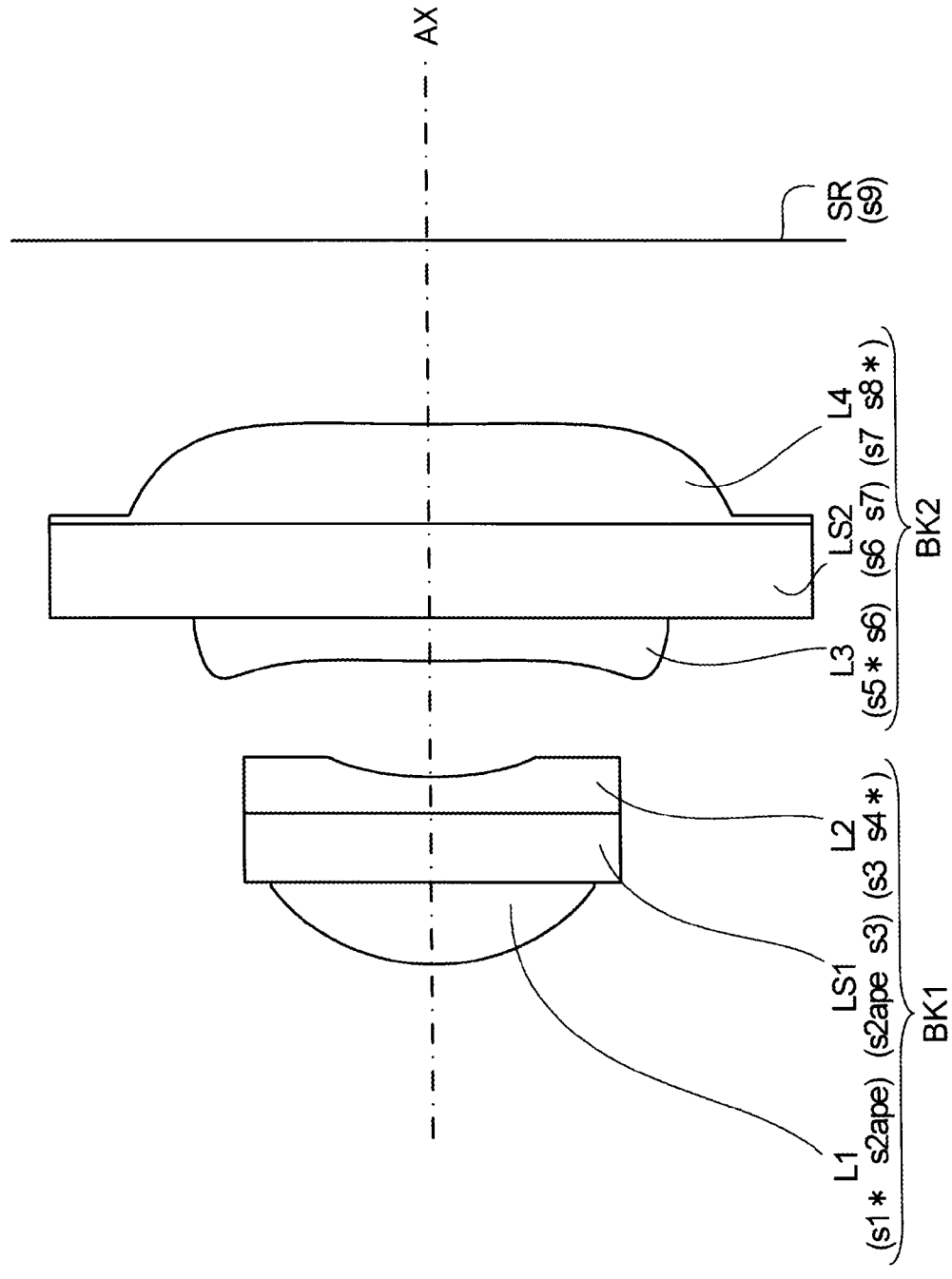
FIG. 2 is an optical sectional view of the imaging lens of Example 2.
Figure 3:
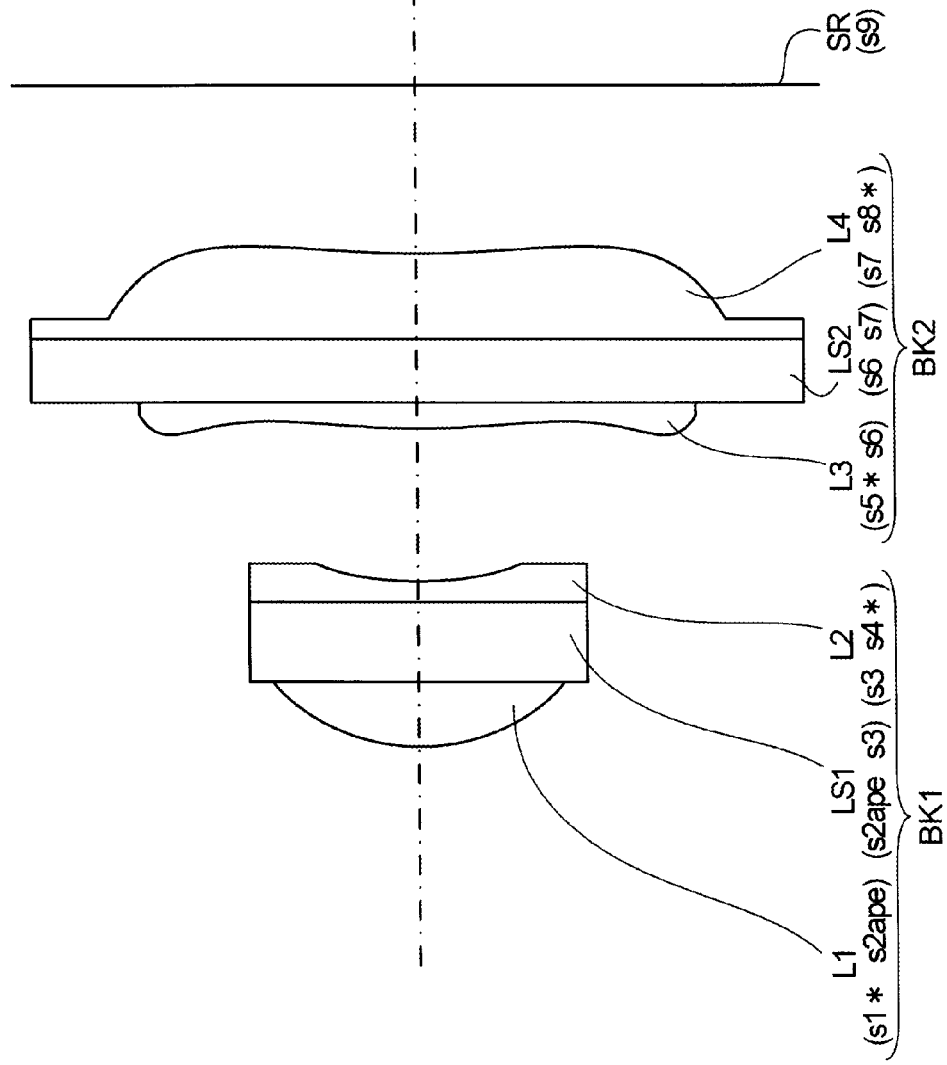
FIG. 3 is an optical sectional view of the imaging lens of Example 3.
Figure 4:
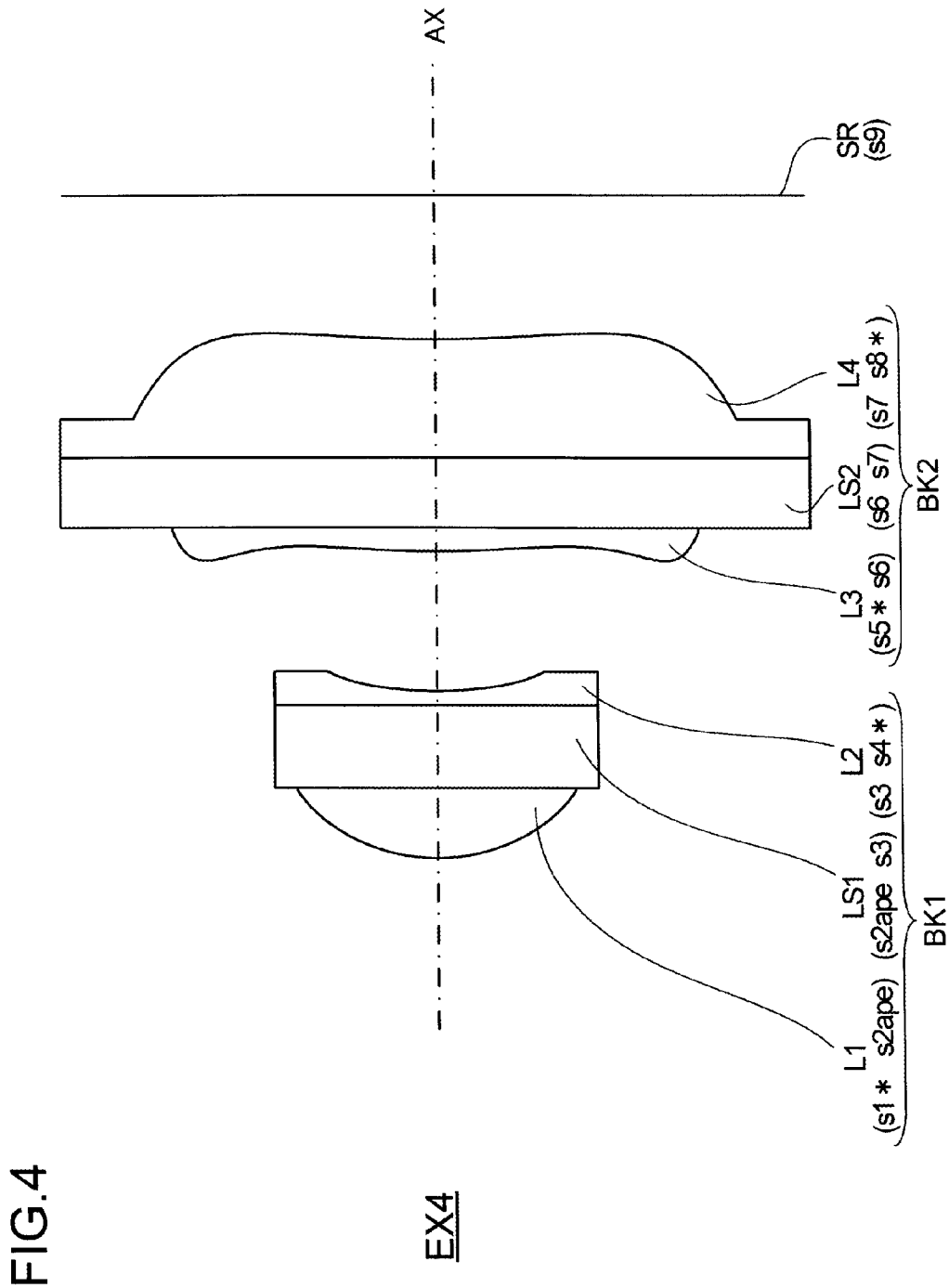
FIG. 4 is an optical sectional view of the imaging lens of Example 4.
Figure 5:
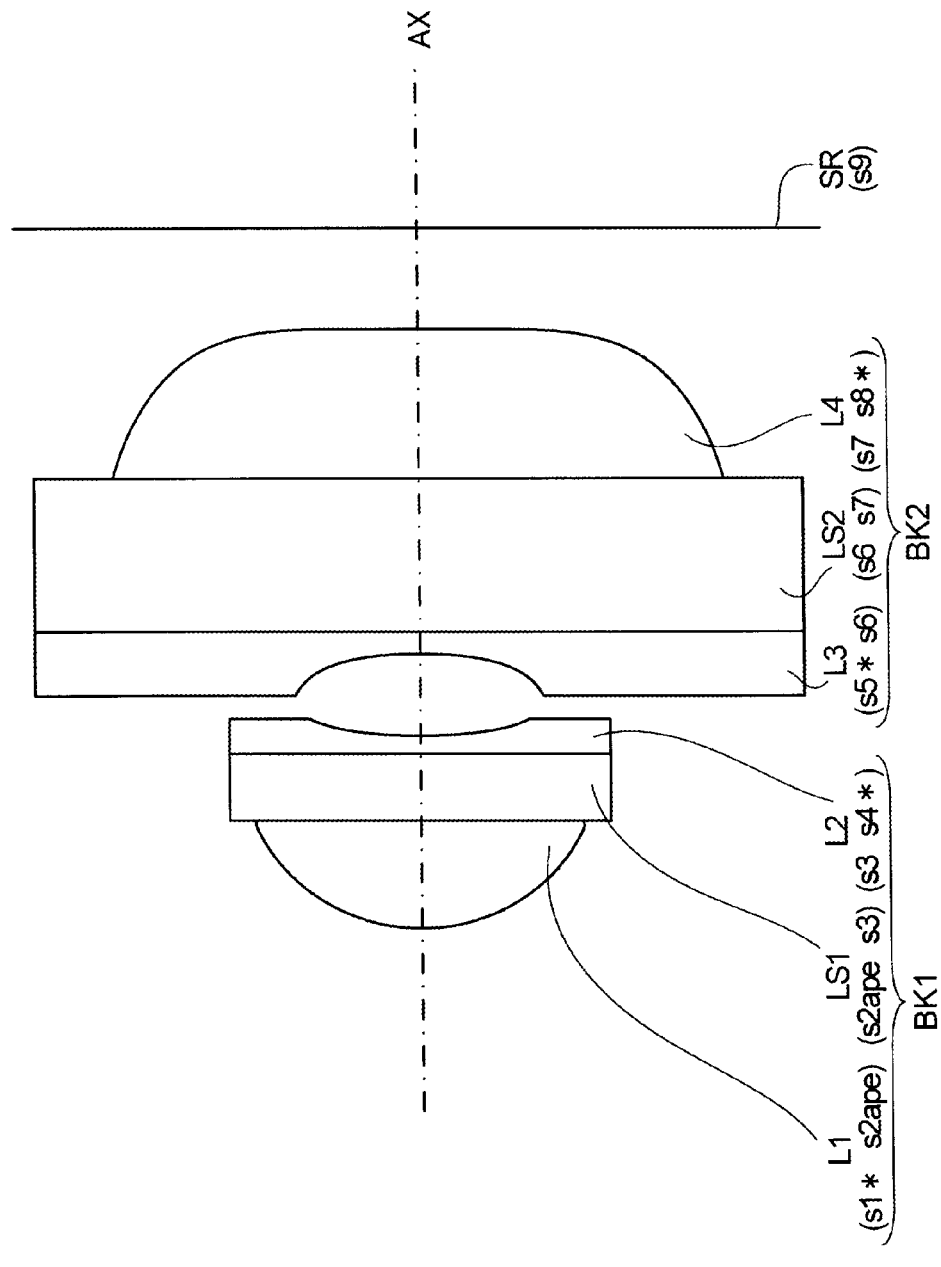
FIG. 5 is an optical sectional view of the imaging lens of Example 5.
Figure 6:
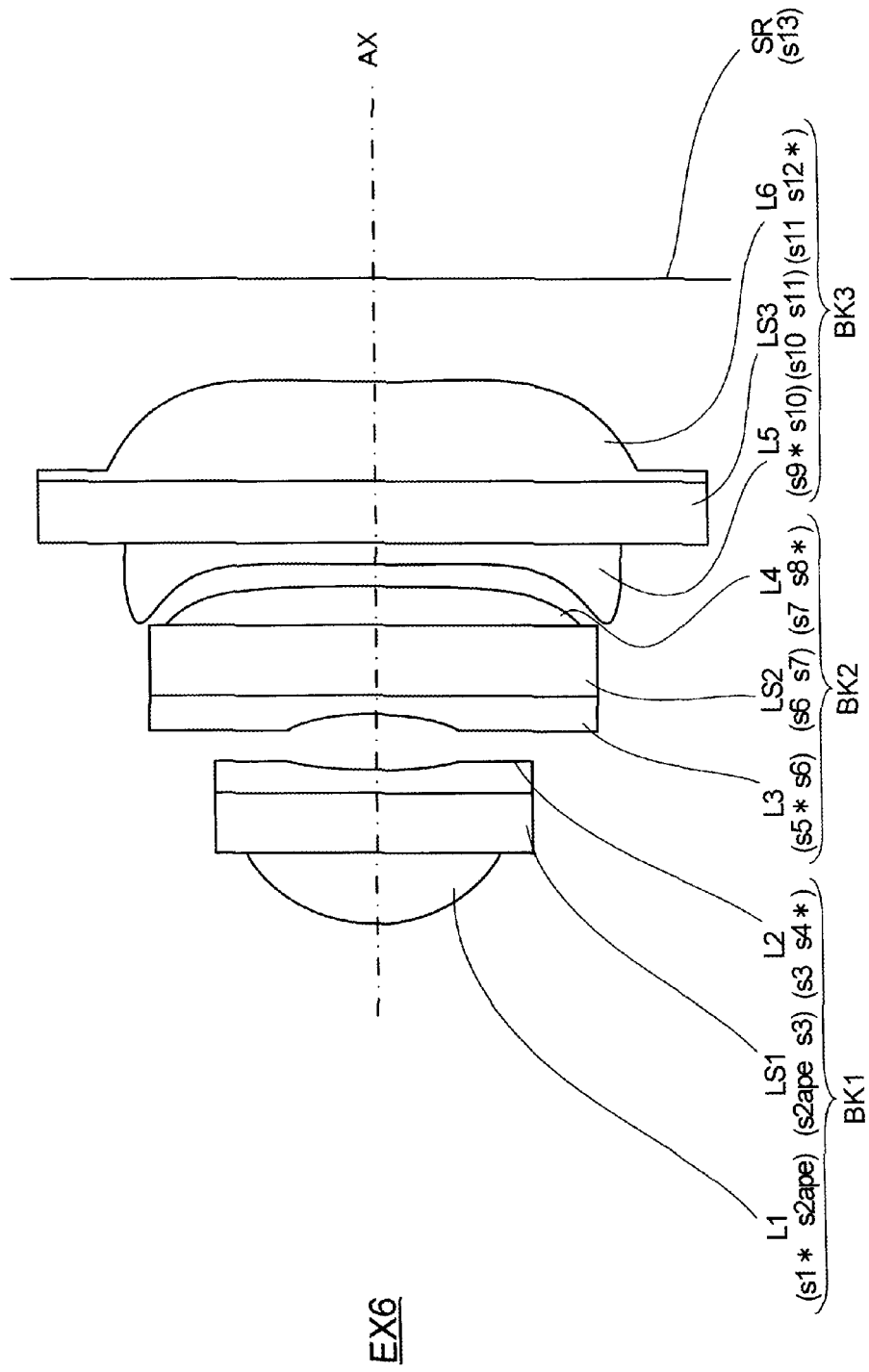
FIG. 6 is an optical sectional view of the imaging lens of Example 6.
Figure 7:
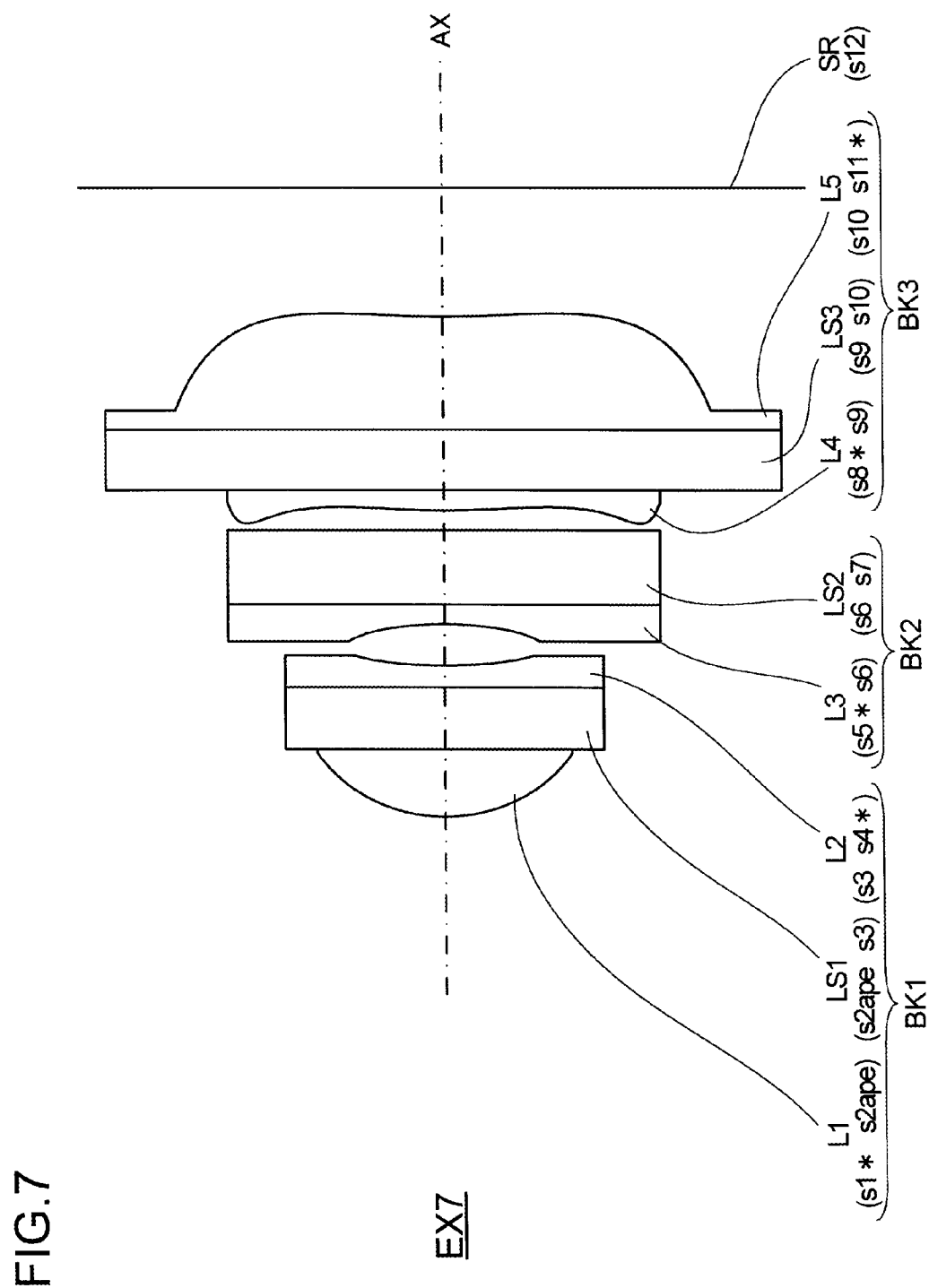
FIG. 7 is an optical sectional view of the imaging lens of Example 7.
Figure 8:
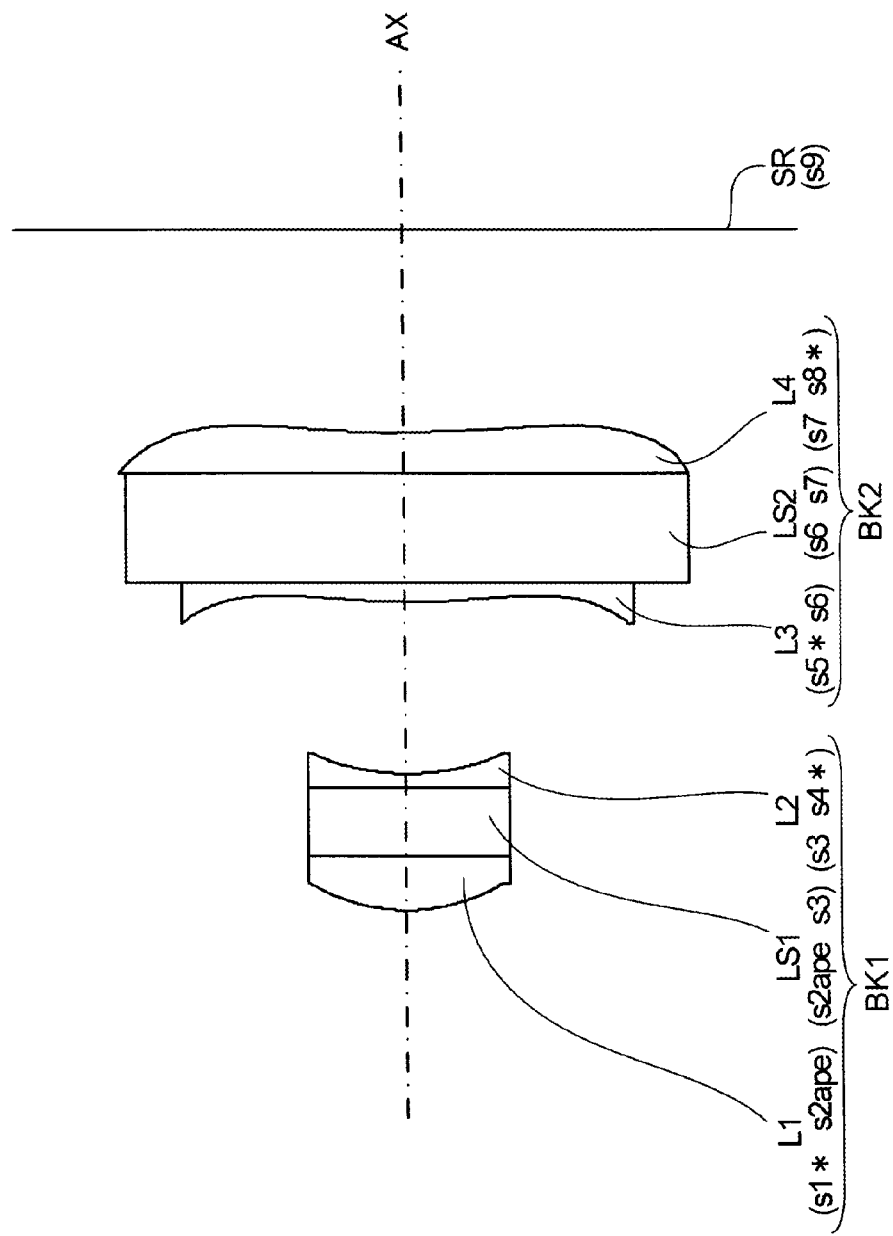
FIG. 8 is an optical sectional view of the imaging lens of Example 8.
Figure 9:
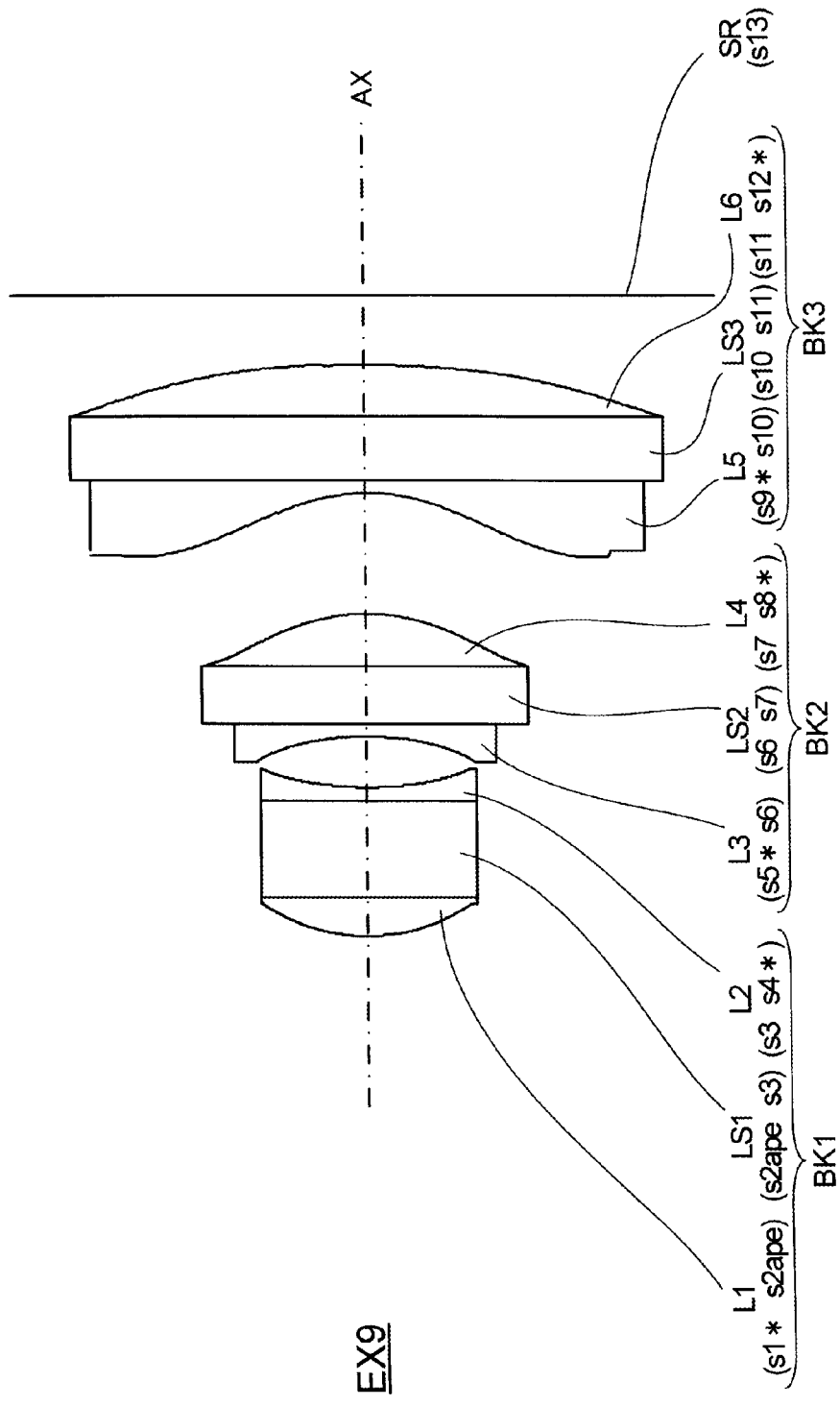
FIG. 9 is an optical sectional view of the imaging lens of Example 9.
Figure 10:
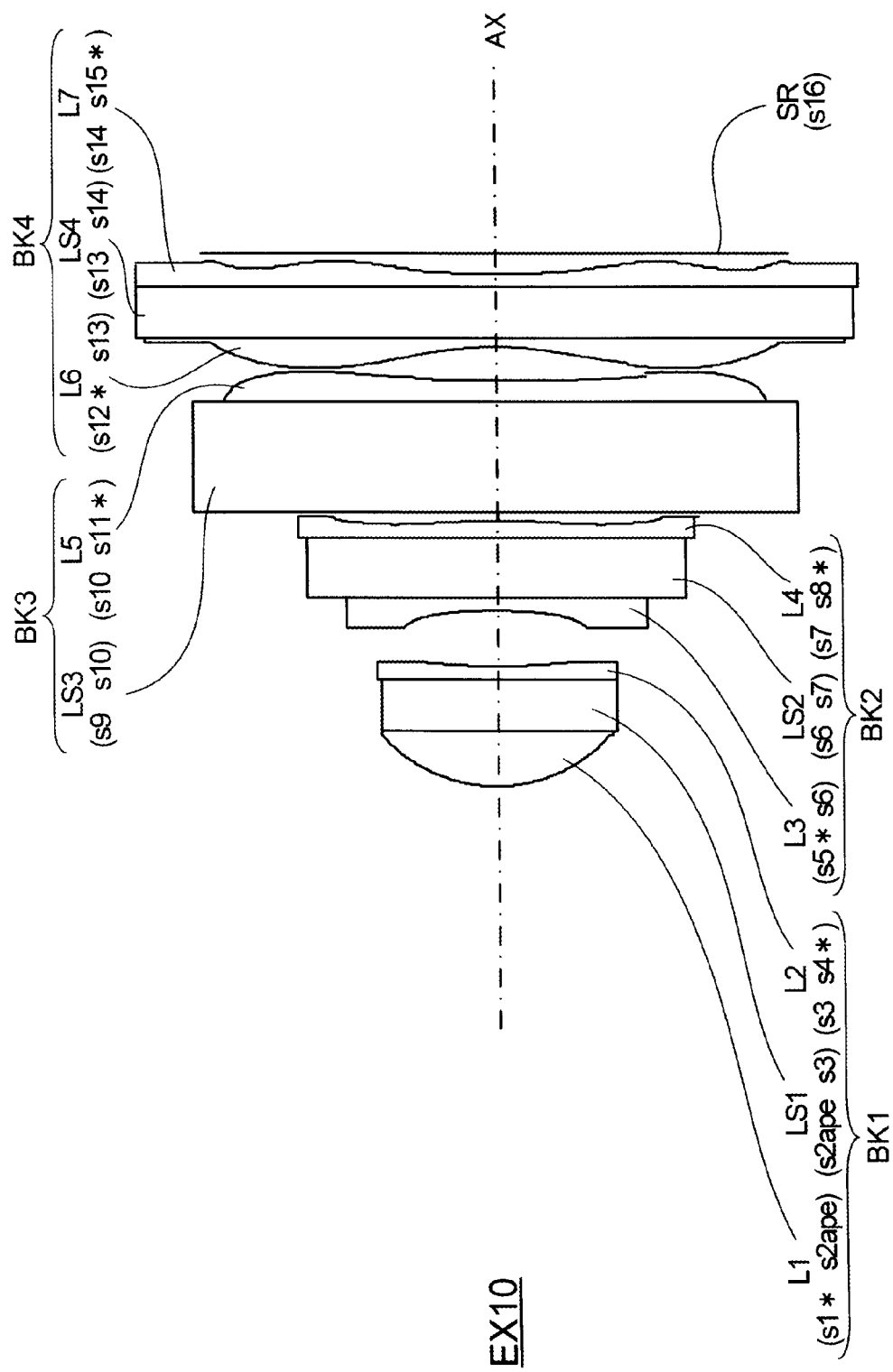
FIG. 10 is an optical sectional view of the imaging lens of Example 10.
Figure 11:
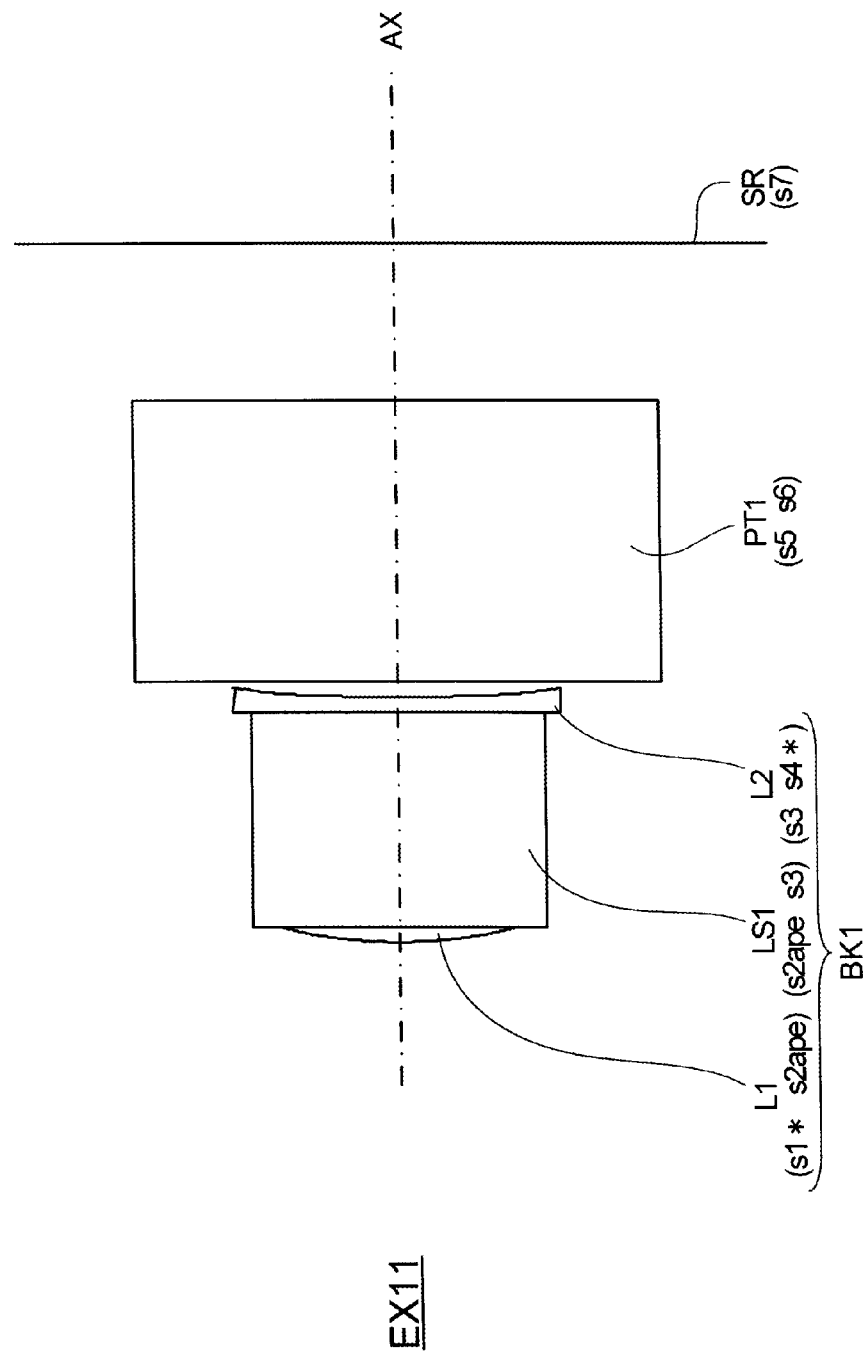
FIG. 11 is an optical sectional view of the imaging lens of Example 11.
Figure 12:
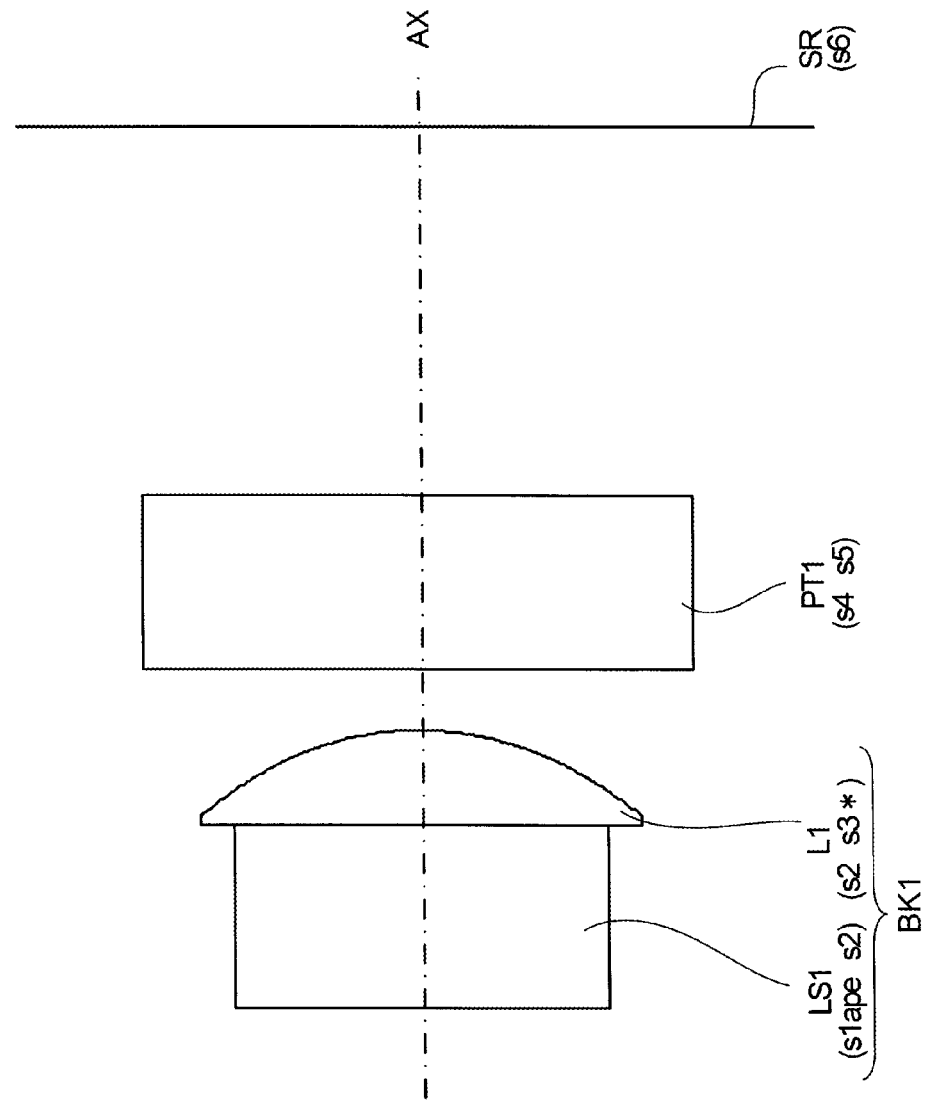
FIG. 12 is an optical sectional view of the imaging lens of Example 12.
Figure 13:
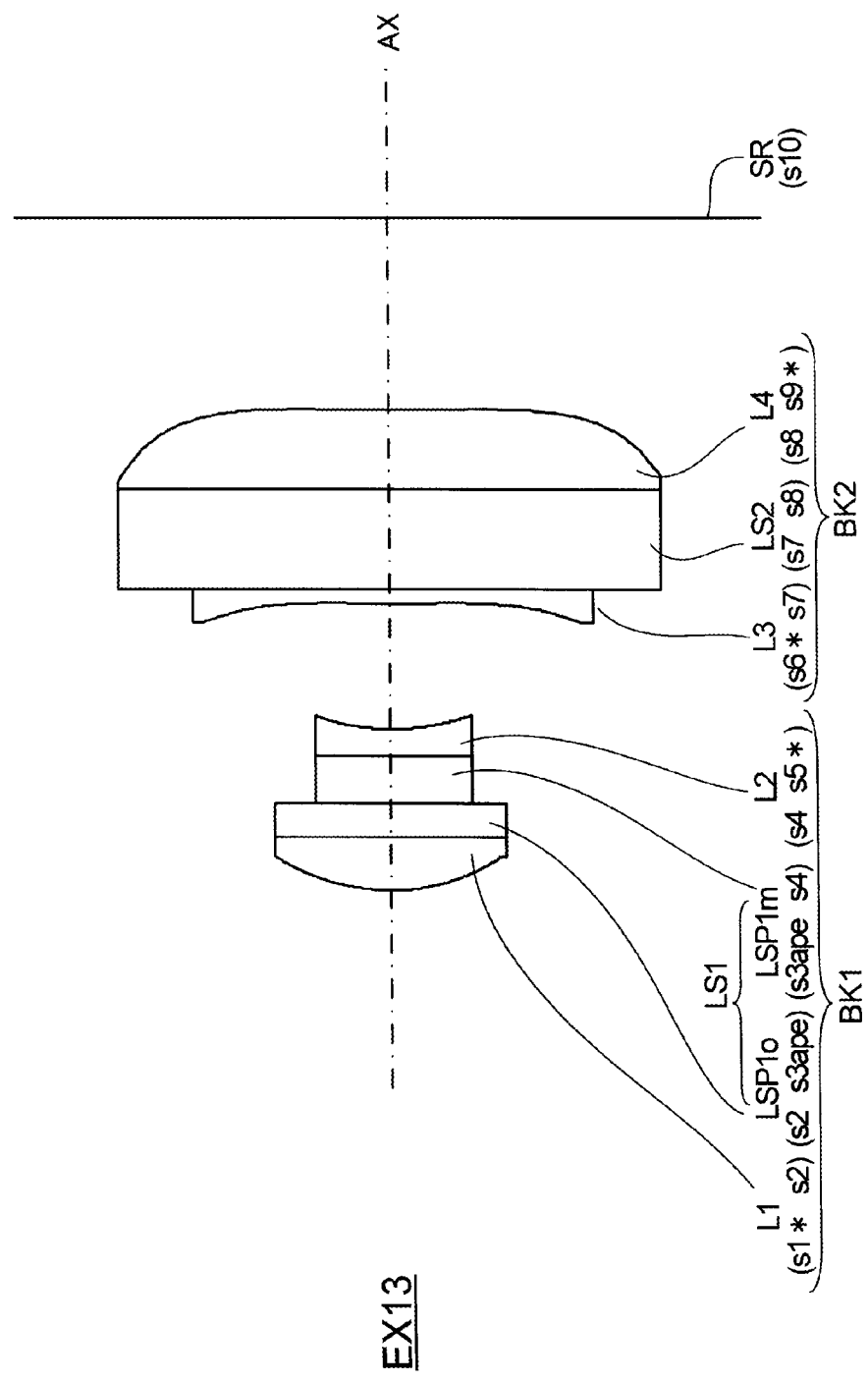
FIG. 13 is an optical sectional view of the imaging lens of Example 13.
Figure 14:
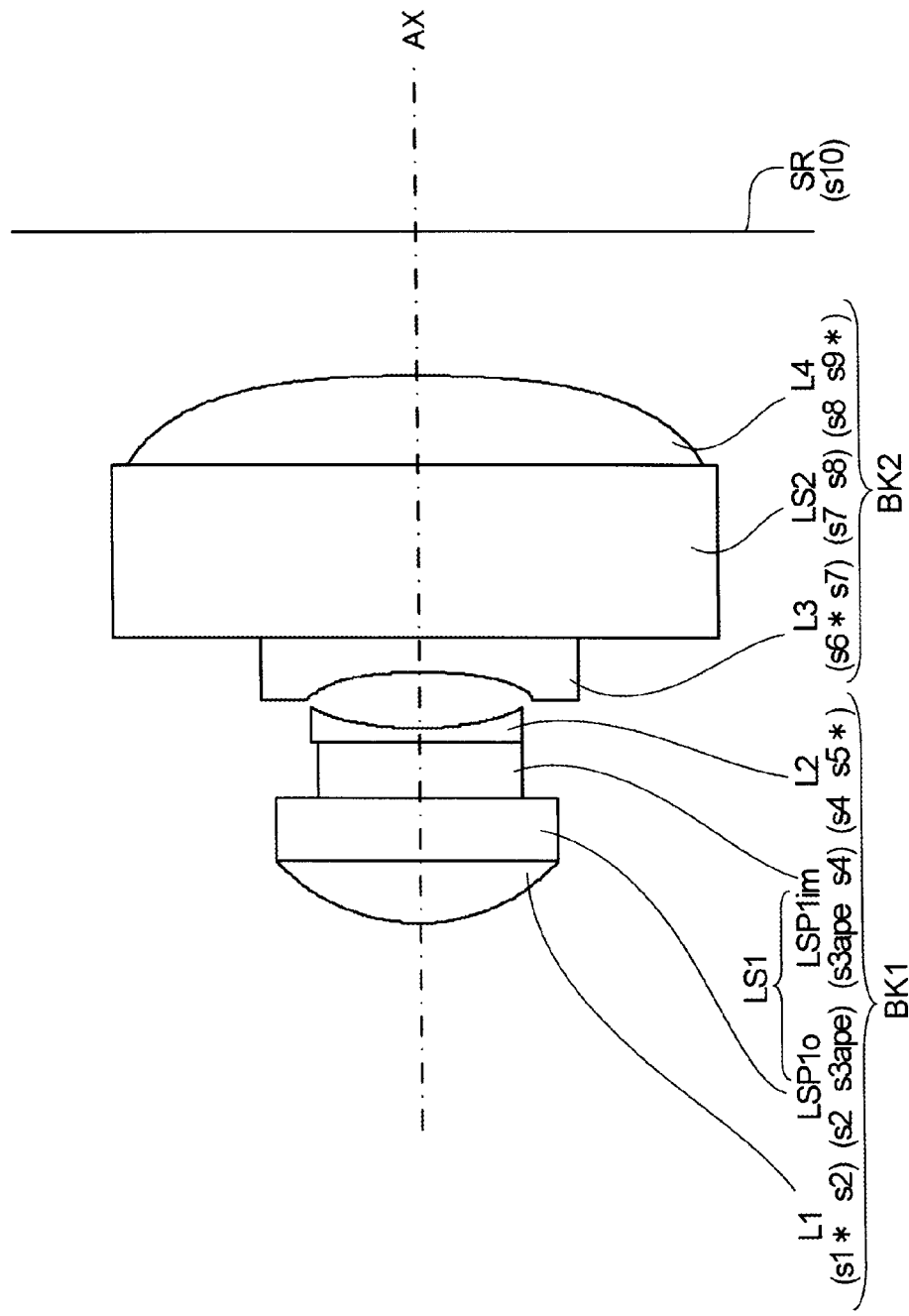
FIG. 14 is an optical sectional view of the imaging lens of Example 14.
Figure 15:
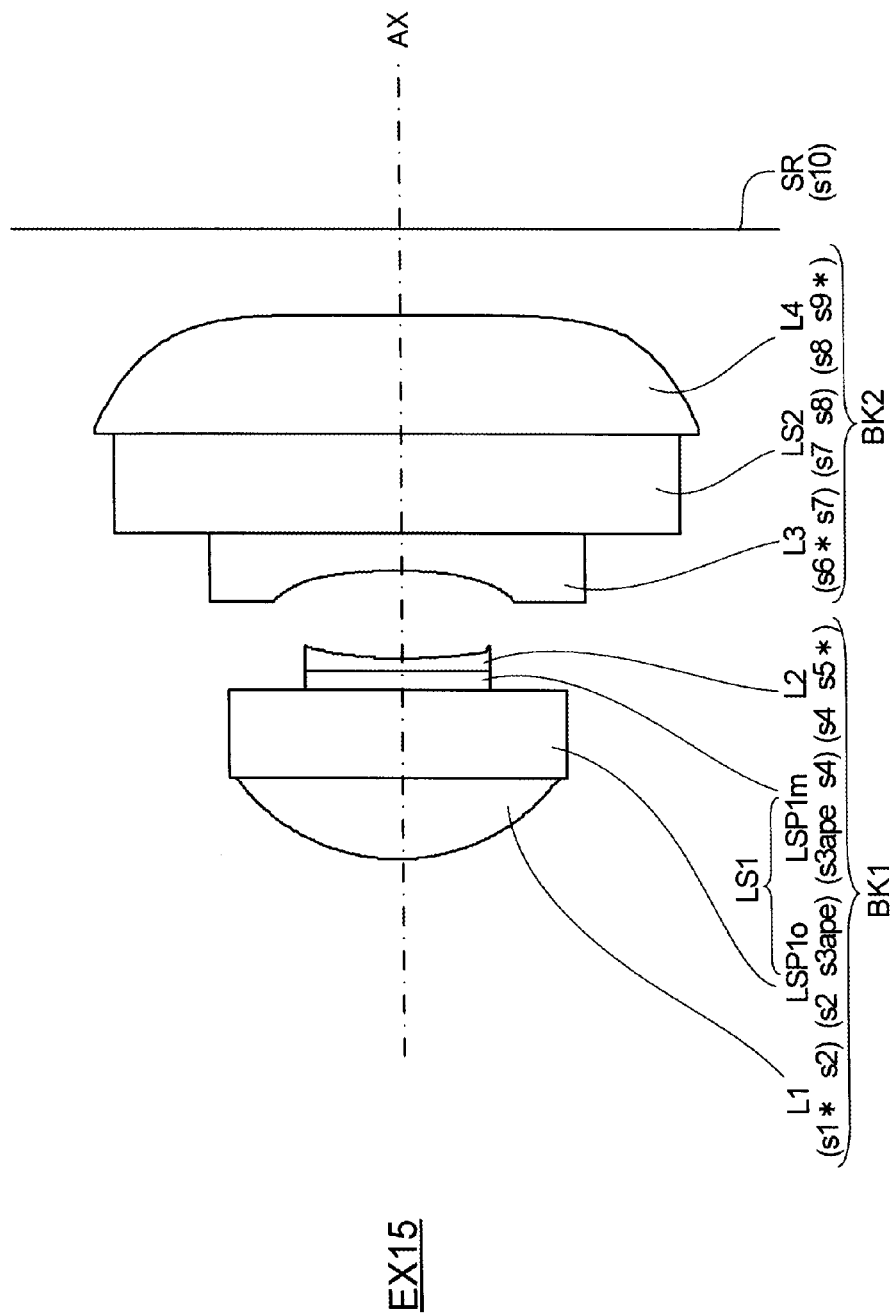
FIG. 15 is an optical sectional view of the imaging lens of Example 15.
Figure 16:
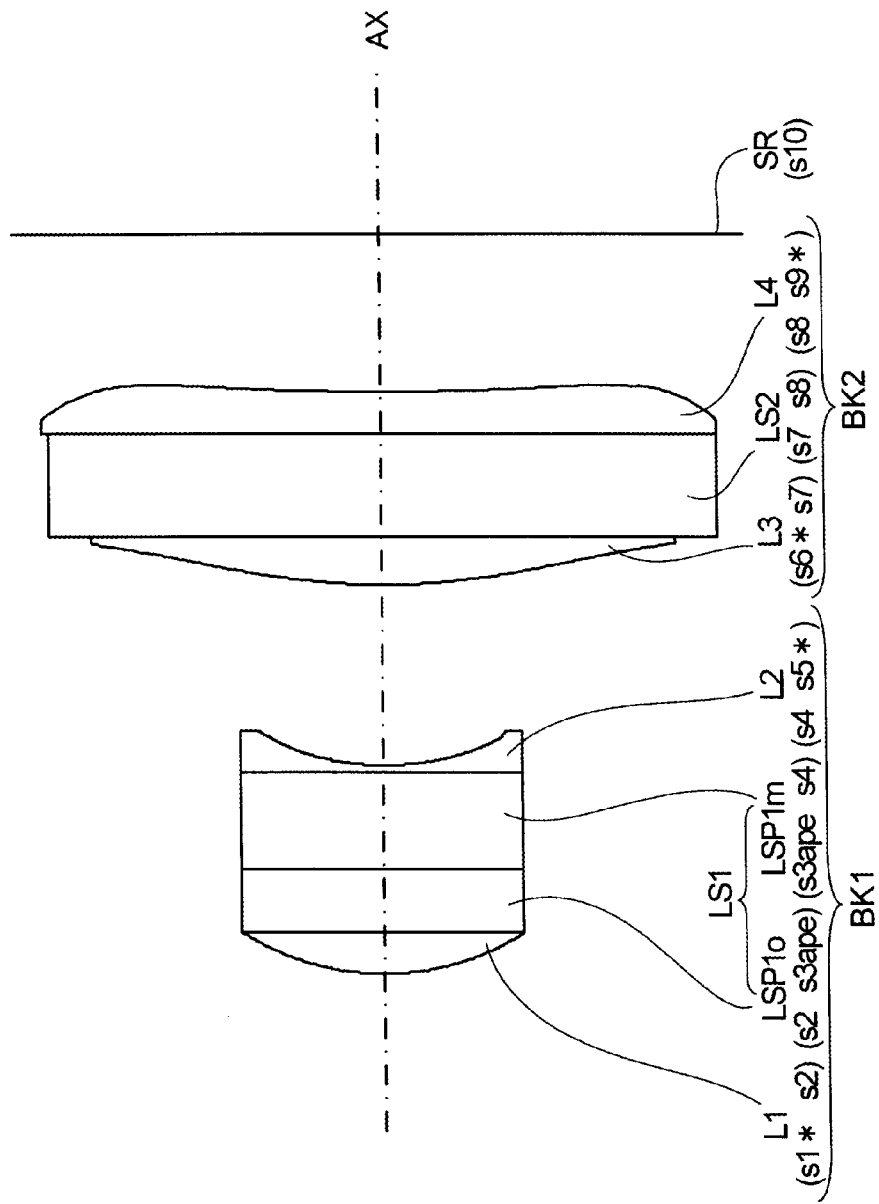
FIG. 16 is an optical sectional view of the imaging lens of Example 16.
Figure 17:
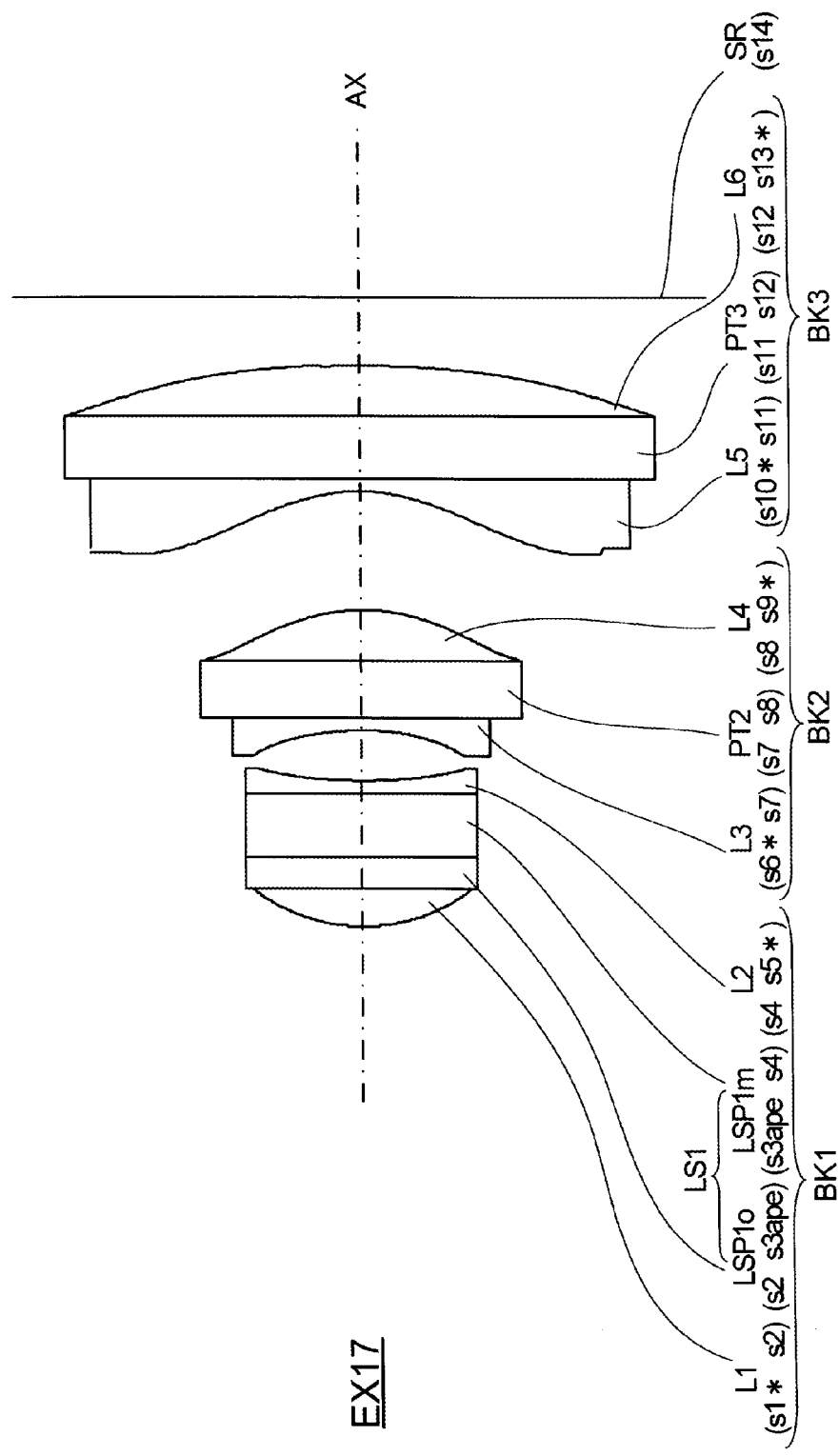
FIG. 17 is an optical sectional view of the imaging lens of Example 17.
Figure 18:
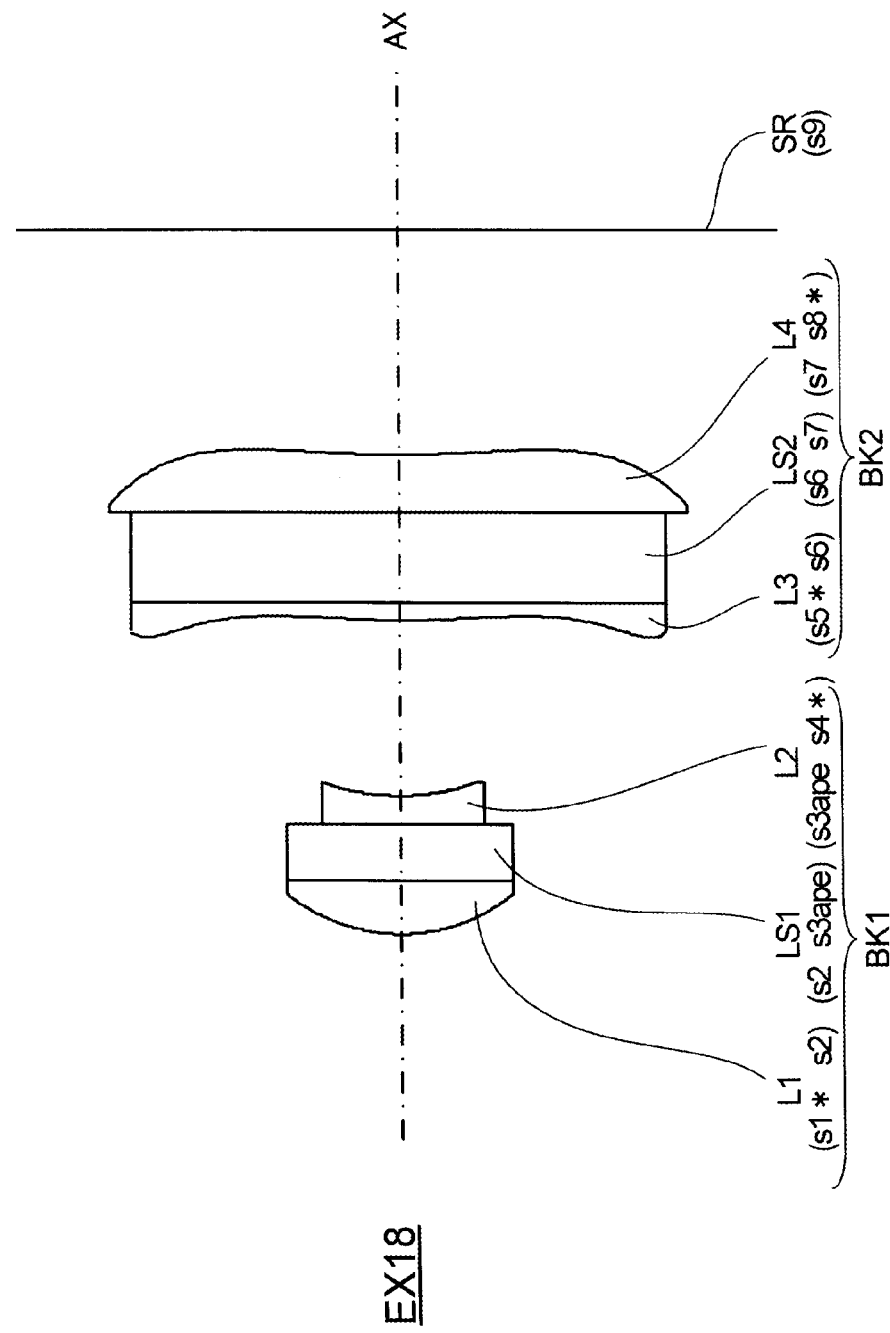
FIG. 18 is an optical sectional view of the imaging lens of Example 18.
Figure 19:
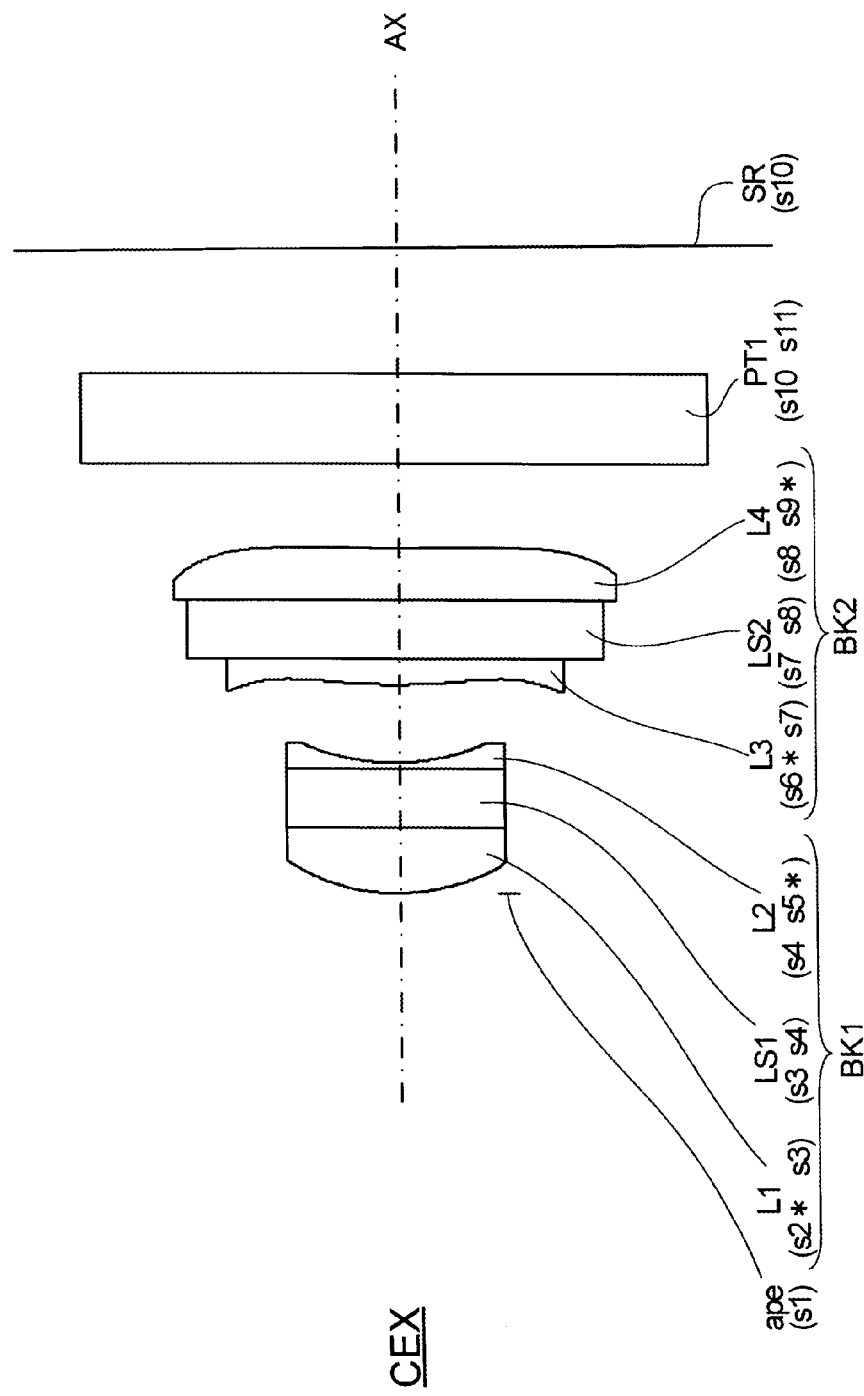
FIG. 19 is an optical sectional view of the imaging lens of a comparison example.

Now, the imaging lens LN will be described in detail. The imaging lens LN includes a lens block BK having a plurality of optical elements that are contiguous with one another (see FIG. 1, which will be described later). This lens block (cemented compound lens) BK has a lens L contiguous with at least one of two opposite (object-side and image-side) substrate surfaces of a lens substrate LS (and the lens L exerts a positive or negative optical power).

Here, "contiguous with" denotes that the relevant substrate surface of the lens substrate LS and the lens L is directly bonded together, or is indirectly bonded together with another member in between.

The lens substrate LS may be formed by cementing together separate lens substrate pieces LSP and LSP (see FIGS. 40A to 40C, which will be described later). Specifically, a first lens substrate piece LSP contiguous with a first lens L and a second lens substrate piece LSP contiguous with a second lens L may be bonded together, at the lens substrate pieces LSP and LSP themselves, to form the lens block BK. (Thus the lens block BK has the first lens L, the first lens substrate piece LSP, the second lens substrate piece LSP, and the second lens L arranged in this order).

[Manufacturing Method of the Imaging Lens]

Figure 40A:
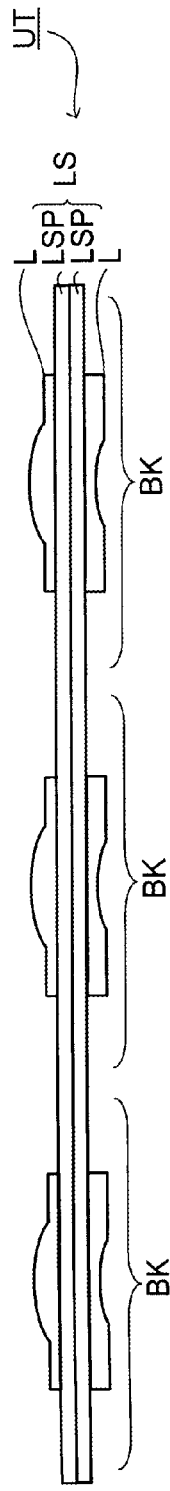
FIG. 40A is a sectional view of a lens block unit.

A lens block unit UT, like the one shown in a sectional view in FIG. 40A, including a plurality of lens blocks BK arranged in an array allows simultaneous fabrication of a large number of lenses L, and is manufactured inexpensively by the reflow method or by the replica method (a lens block unit UT may include one lens block BK, or may include a plurality of lens blocks BK).

According to the reflow method, a film of low-softening-point glass is formed on a glass substrate by CVD (chemical vapor deposition). The low-softening-point glass film so formed is then subjected to microprocessing by lithography and dry etching. It is then heated, so that the low-softening-point glass film melts into the shape of lenses. Thus, by the reflow method, a large number of lenses are fabricated simultaneously on a glass substrate.

On the other hand, according to the replica method, a hardening resin is molded into the shape of lenses by use of a mold and is transferred onto a lens wafer. Thus, by the replica method, a large number of lenses are fabricated simultaneously on a lens wafer.

Then, from lens block units UT manufactured by a method like those described above, the imaging lens LN is manufactured. An example of the manufacturing process of the imaging lens LN is shown in a schematic cross-sectional view in FIG. 40B.

A first lens block unit UT1 is composed of a first lens substrate LS1 in the form of a plane-parallel plate, a plurality of first lenses L1 bonded to one surface of the first lens substrate LS1, and a plurality of second lenses L2 bonded to the other surface of the first lens substrate LS1. (The first lens substrate LS1 is, as described previously, composed of a first lens substrate piece LSP (plane-parallel plate) and a second lens substrate piece LSP bonded together.)

A second lens block unit UT2 is composed of a second lens substrate LS2 in the form of a plane-parallel plate, a plurality of third lenses L3 bonded to one surface of the second lens substrate LS2, and a plurality of fourth lenses L4 bonded to the other surface of the second lens substrate LS2. (The second lens substrate LS2 is, as described previously, composed of a first lens substrate piece LSP and a second lens substrate piece LSP bonded together.)

A spacer member (spacer) B1 in the shape of a lattice is interposed between the first lens block unit UT1 and the second lens block unit UT2 (specifically, between the first lens substrate LS1 and the second lens substrate LS2) to keep constant the interval between the two lens block units UT1 and UT2. Another spacer member B1 is interposed between a substrate 2 and the second lens block unit 2 to keep constant the interval between the substrate 2 and the lens block unit UT2 (thus the spacer members B1 can be said to form a two-tier lattice). The lenses L are located in the eyes of the lattice of the spacer members B1.

The substrate B2 is a sensor chip package of a wafer scale including a microlens array, or a plane-parallel plate (corresponding to the plane-parallel plate PT in FIG. 39) such as a sensor cover glass or IR-cut filter.

Owing to the spacer members B1 being interposed between the first lens block unit UT1 and the first lens block unit UT2 and between the second lens block unit UT2 and the second substrate B2, the lens substrates LS (the first lens substrate LS1 and the second lens substrate LS2) are sealed together to be integrated into a unit.

Figure 40B:
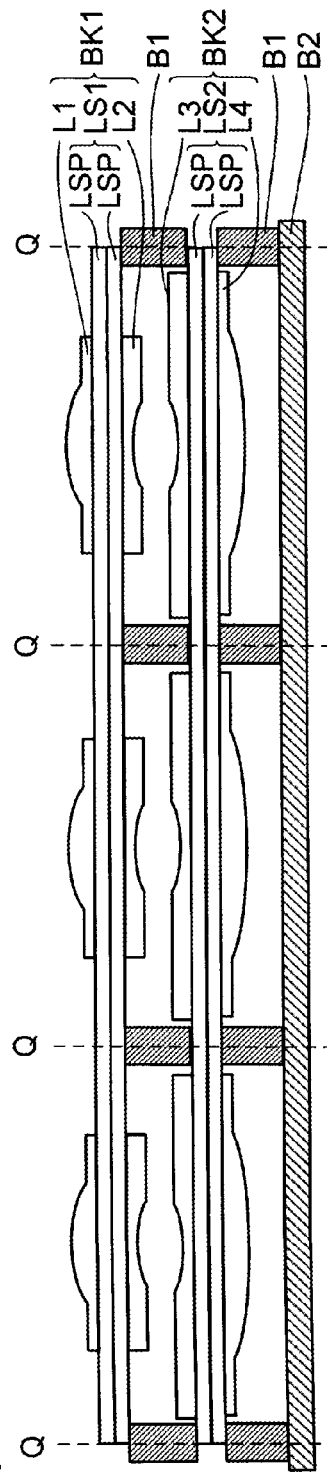
FIG. 40B is a sectional view showing a manufacturing process of an imaging lens.
Figure 40C:
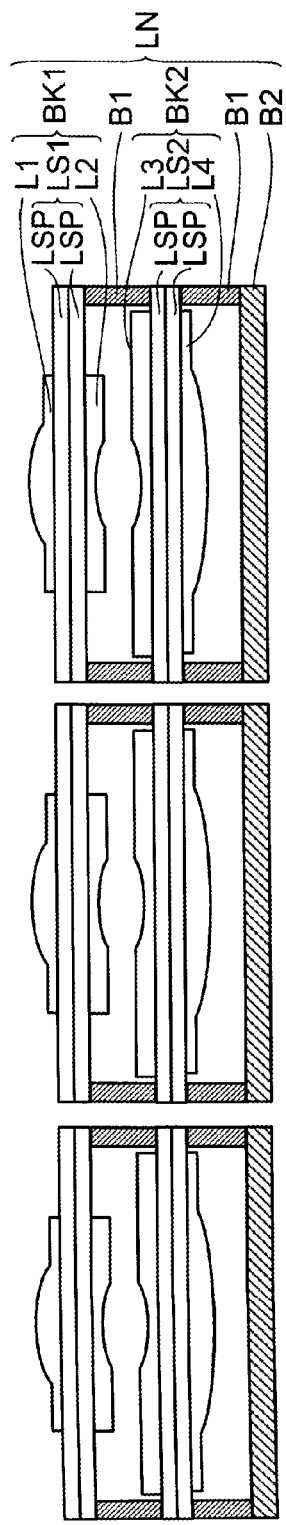
FIG. 40C is a sectional view of an imaging lens.

The first lens substrate LS1, the second lens substrate LS2, the spacer members B1, and the substrate 2 thus integrated into a unit are then cut along the lattice frame of the spacer members B1 (at the positions indicated by broken lines Q); this produces a plurality of imaging lenses LN of a two-element construction as shown in FIG. 40C.

Manufacturing the imaging lens LN by cutting apart a member having a plurality of lens blocks BK (a first lens block BK1 and a second lens block BK2) built into it as described above eliminates the need for lens interval adjustment and assembly with each individual imaging lens LN. This makes it possible to mass-produce the imaging lens LN.

In addition, the spacer members B1 have the shape of a lattice. They thus serve as a guide that helps cut apart the imaging lens LN from the member having a plurality of lens blocks BK built into it. The imaging lens LN can thus be cut apart easily, without much time and trouble, from the member having a plurality of lens blocks BK built into it. This makes it possible to mass-produce the imaging lens inexpensively.

In light of the foregoing, the manufacturing method of the imaging lens LN includes a joining step in which a spacer member B1 is arranged at least at part of the peripheral edge of lens blocks BK and a plurality of lens block units UT are joined together with the spacer members B1 in between, and a cutting step in which the lens block units UT now joined together are cut apart along the spacer members B1. A manufacturing method like this is suitable for mass-production of inexpensive lens system.

[Lens Construction of the Imaging Lens]

Next, the lens construction of the imaging lens LN in different practical examples, namely Examples (EX) 1 to 18, and in a comparison example (CEX) will be described with reference to optical sectional diagrams in FIGS. 1 to 18.

The symbols used to identify the relevant members in optical sectional diagrams etc. are as follows:

Li represents a lens L;
LSi represents a lens substrate LS (in all practical examples, the lens substrate LS is a plane-parallel plate);
BKi represents a lens block;
PTi represents a plane-parallel plate (use of this symbol is limited to a plane-parallel plate with which no lens L is contiguous);
si represents a lens surface or substrate surface;
i is a number suffixed as in "Li" to represent the place in order, among the members of the same kind, as counted from the object side to the image side;
* indicates an aspherical surface (a surface not adjoining a lens substrate LS but making contact with air is an aspherical surface);
ape represents an aperture stop; and
AX represents the optical axis.

A lens L suffixed with a number representing its place in order as counted from the object side to the image side may also be identified by an alternative expression. Specifically, with respect to a lens substrate LS (any of a first to a fourth lens substrate LS1 to LS4), a lens on the object side (o) thereof and a lens on the image side (i) thereof may alternatively be identified as a lens L[LS1o] and a lens L[LS1m], a lens L[LS2o] and a lens L[LS2m], a lens L[LS3o] and a lens L[LS3m], and a lens L[LS4o] and a lens L[LS4m], respectively.

Examples 1 to 4

In any of Examples 1 to 4, the imaging lens LN includes two lens blocks BK1 and BK2 disposed in this order from the object side to the image side, and also includes an aperture stop ape.

The first lens block BK1 disposed at the most object-side position includes a first lens substrate LS1. A first lens L1 (lens L[LS1o]) is contiguous with the object-side substrate surface of the first lens substrate LS1, and a second lens L2 (lens L[LS1m]) is contiguous with the image-side substrate surface of the first lens substrate LS1. Specifically, the first lens L1 and the second lens L2 are configured as noted below. The aperture stop ape is formed at the boundary surface between the first lens L1 and the first lens substrate LS1.

The 1st lens L1 is a plano-convex lens convex to the object side (its object-side lens surface being an aspherical surface); and The 2nd lens L2 is a plano-concave lens concave to the image side (its image-side lens surface being an aspherical surface).

The second lens block BK2 is located to the image side of the first lens block BK1, and includes a second lens substrate LS2. A third lens L3 (lens L[LS2o]) is contiguous with the object-side substrate surface of the second lens substrate LS2, and a fourth lens L4 (lens L[LS2m]) is contiguous with the image-side substrate surface of the second lens substrate LS2. Specifically, the third lens L3 and the fourth lens L4 are configured as noted below.

The 3rd lens L3 is a plano-convex lens convex to the object side (its object-side lens surface being an aspherical surface that is convex at its vertex and that is concave in its part where it intersects the principal ray with the maximum image height); and The 4th lens L4 is a plano-concave lens concave to the image side (its image-side lens surface being an aspherical surface).

Example 5

In Example 5, the imaging lens LN includes a first lens block BK1, a second lens block BK2, and an aperture stop ape.

In the first lens block BK1, a first lens L1 (lens L[LS1o]) contiguous with the object-side substrate surface of a first lens substrate LS1 and a second lens L2 (lens L[LS1m]) contiguous with the image-side substrate surface of the first lens substrate LS1 are configured as noted below. The aperture stop ape is formed at the boundary surface between the first lens L1 and the first lens substrate LS1.

The 1st lens L1 is a plano-convex lens convex to the object side (its object-side lens surface being an aspherical surface); and The 2nd lens L2 is a plano-concave lens concave to the image side (its image-side lens surface being an aspherical surface).

In the second lens block BK2, a third lens L3 (lens L[LS2o]) contiguous with the object-side substrate surface of a second lens substrate LS2 and a fourth lens L4 (lens L[LS2m]) contiguous with the image-side substrate surface of the second lens substrate LS2 are configured as noted below.

The 3rd lens L3 is a plano-concave lens concave to the object side (its object-side lens surface being an aspherical surface); and The 4th lens L4 is a plano-concave lens concave to the image side (its image-side lens surface being an aspherical surface).

Example 6

In Example 6, the imaging lens LN includes, in addition to a first lens block BK1 and a second lens block BK2, a third lens block BK3. The third lens block BK3 is located to the image side of the second lens block BK2. The imaging lens LN further includes an aperture stop ape.

In the first lens block BK1, a first lens L1 (lens L[LS1o]) contiguous with the object-side substrate surface of a first lens substrate LS1 and a second lens L2 (lens L[LS1m]) contiguous with the image-side substrate surface of the first lens substrate LS1 are configured as noted below. The aperture stop ape is formed at the boundary surface between the first lens L1 and the first lens substrate LS1.

The 1st lens L1 is a plano-convex lens convex to the object side (its object-side lens surface being an aspherical surface); and The 2nd lens L2 is a plano-concave lens concave to the image side (its image-side lens surface being an aspherical surface).

In the second lens block BK2, a third lens L3 (lens L[LS2o]) contiguous with the object-side substrate surface of a second lens substrate LS2 and a fourth lens L4 (lens L[LS2m]) contiguous with the image-side substrate surface of the second lens substrate LS2 are configured as noted below.

The 3rd lens L3 is a plano-concave lens concave to the object side (its object-side lens surface being an aspherical surface); and The 4th lens L4 is a plano-convex lens convex to the image side (its image-side lens surface being an aspherical surface).

The third lens block BK3 includes a third lens substrate LS3. A fifth lens L5 (lens L[LS3o]) is contiguous with the object-side substrate surface of the third lens substrate LS3, and a sixth lens L6 (lens L[LS3m]) is contiguous with the image-side substrate surface of the third lens substrate LS3. Specifically, the fifth lens L5 and the sixth lens L6 are configured as noted below.

The 5th lens L5 is a plano-convex lens convex to the object side (its object-side lens surface being an aspherical surface that is convex at its vertex and that is concave in its part where it intersects the principal ray with the maximum image height); and The 6th lens L6 is a plano-concave lens concave to the image side (its image-side lens surface being an aspherical surface).

Example 7

In Example 7, the imaging lens LN includes a first lens block BK1, a second lens block BK2, a third lens block BK3, and an aperture stop ape.

In the first lens block BK1, a first lens L1 (lens L[LS1o]) contiguous with the object-side substrate surface of a first lens substrate LS1 and a second lens L2 (lens L[LS1m]) contiguous with the image-side substrate surface of the first lens substrate LS1 are configured as noted below. The aperture stop ape is formed at the boundary surface between the first lens L1 and the first lens substrate LS1.

The 1st lens L1 is a plano-convex lens convex to the object side (its object-side lens surface being an aspherical surface); and The 2nd lens L2 is a plano-concave lens concave to the image side (its image-side lens surface being an aspherical surface).

The second lens block BK2 includes a second lens substrate LS2, and, only with the object-side substrate surface of the second lens substrate LS2, a lens L (namely a third lens L3 (lens L[LS2o]) is contiguous. Specifically, the third lens L3 is configured as noted below.

The 3rd lens L3 is a plano-concave lens concave to the object side (its object-side lens surface being an aspherical surface).

In the third lens block BK3, a fourth lens L4 (lens L[LS3o]) contiguous with the object-side substrate surface of a third lens substrate LS3 and a fifth lens L5 (lens L[LS3m]) contiguous with the image-side substrate surface of the third lens substrate LS1 are configured as noted below.

The 4th lens L4 is a plano-convex lens convex to the object side (its object-side lens surface being an aspherical surface that is convex at its vertex and that is concave in its part where it intersects the principal ray with the maximum image height); and The 5th lens L5 is a plano-concave lens concave to the image side (its image-side lens surface being an aspherical surface).

Example 8

In Example 8, the imaging lens LN includes a first lens block BK1, a second lens block BK2, and an aperture stop ape.

In the first lens block BK1, a first lens L1 (lens L[LS1o]) contiguous with the object-side substrate surface of a first lens substrate LS1 and a second lens L2 (lens L[LS1m]) contiguous with the image-side substrate surface of the first lens substrate LS1 are configured as noted below. The aperture stop ape is formed at the boundary surface between the first lens L1 and the first lens substrate LS1.

The 1st lens L1 is a plano-convex lens convex to the object side (its object-side lens surface being an aspherical surface); and The 2nd lens L2 is a plano-concave lens concave to the image side (its image-side lens surface being an aspherical surface).

In the second lens block BK2, a third lens L3 (lens L[LS2o]) contiguous with the object-side substrate surface of a second lens substrate LS2 and a fourth lens L4 (lens L[LS2m]) contiguous with the image-side substrate surface of the second lens substrate LS2 are configured as noted below.

The 3rd lens L3 is a plano-convex lens convex to the object side (its object-side lens surface being an aspherical surface that is convex at its vertex and that is concave in its part where it intersects the principal ray with the maximum image height); and The 4th lens L4 is a plano-concave lens concave to the image side (its image-side lens surface being an aspherical surface).

Example 9

In Example 9, the imaging lens LN includes a first lens block BK1, a second lens block BK2, a third lens block BK3, and an aperture stop ape.

In the first lens block BK1, a first lens L1 (lens L[LS1o]) contiguous with the object-side substrate surface of a first lens substrate LS1 and a second lens L2 (lens L[LS1m]) contiguous with the image-side substrate surface of the first lens substrate LS1 are configured as noted below. The aperture stop ape is formed at the boundary surface between the first lens L1 and the first lens substrate LS1.

The 1st lens L1 is a plano-convex lens convex to the object side (its object-side lens surface being an aspherical surface); and
  The 2nd lens L2 is a plano-concave lens concave to the image side (its image-side lens surface being an aspherical surface).

In the second lens block BK2, a third lens L3 (lens L[LS2o]) contiguous with the object-side substrate surface of a second lens substrate LS2 and a fourth lens L4 (lens L[LS2m]) contiguous with the image-side substrate surface of the second lens substrate LS2 are configured as noted below.

The 3rd lens L3 is a plano-concave lens concave to the object side (its object-side lens surface being an aspherical surface); and
  The 4th lens L4 is a plano-convex lens convex to the image side (its image-side lens surface being an aspherical surface).

In the third lens block BK1, a fifth lens L5 (lens L[LS3o]) contiguous with the object-side substrate surface of a third lens substrate LS3 and a sixth lens L6 (lens L[LS3m]) contiguous with the image-side substrate surface of the third lens substrate LS3 are configured as noted below.

The 5th lens L6 is a plano-concave lens concave to the object side (its object-side lens surface being an aspherical surface); and
  The 6th lens L6 is a plano-convex lens convex to the image side (its image-side lens surface being an aspherical surface).

Example 10

In Example 10, the imaging lens LN includes, in addition to a first to a third lens block BK1 to BK3, a fourth lens block BK4. The fourth lens block BK4 is located to the image side of the third lens block BK3. The imaging lens LN further includes an aperture stop ape.

In the first lens block BK1, a first lens L1 (lens L[LS1o]) contiguous with the object-side substrate surface of a first lens substrate LS1 and a second lens L2 (lens L[LS1m]) contiguous with the image-side substrate surface of the first lens substrate LS1 are configured as noted below. The aperture stop ape is formed at the boundary surface between the first lens L1 and the first lens substrate LS1.

The 1st lens L1 is a plano-convex lens convex to the object side (its object-side lens surface being an aspherical surface); and
  The 2nd lens L2 is a plano-concave lens concave to the image side (its image-side lens surface being an aspherical surface).

In the second lens block BK2, a third lens L3 (lens L[LS2o]) contiguous with the object-side substrate surface of a second lens substrate LS2 and a fourth lens L4 (lens L[LS2m]) contiguous with the image-side substrate surface of the second lens substrate LS2 are configured as noted below.

The 3rd lens L3 is a plano-concave lens concave to the object side (its object-side lens surface being an aspherical surface); and
  The 4th lens L4 is a plano-convex lens convex to the image side (its image-side lens surface being an aspherical surface that is convex at its vertex and that is concave in its part where it intersects the principal ray with the maximum image height).

The third lens block BK3 includes a third lens substrate LS3, and, only with the image-side substrate surface of the third lens substrate LS3, a lens L (a fifth lens L5 (lens L[LS3o]) is contiguous. Specifically, the fifth lens L5 is configured as noted below.

The 5th lens L5 is a plano-convex lens convex to the image side (its image-side lens surface being an aspherical surface).

The fourth lens block BK4 includes a fourth lens substrate LS4. A sixth lens L6 (lens L[LS4o]) is contiguous with the object-side substrate surface of the fourth lens substrate LS4, and a seventh lens L7 (lens L[LS4m]) is contiguous with the image-side substrate surface of the fourth lens substrate LS4. Specifically, the sixth lens L6 and the seventh lens L7 are configured as noted below.

The 6th lens L6 is a plano-concave lens concave to the object side (its object-side lens surface being an aspherical surface that is concave at its vertex and that is convex in its part where it intersects the principal ray with the maximum image height); and
  The 7th lens L7 is a plano-concave lens concave to the image side (its image-side lens surface being an aspherical surface that is concave at its vertex and that is convex in its part where it intersects the principal ray with the maximum image height).

Example 11

In Example 11, the imaging lens LN includes a first lens block BK1, and includes a plane-parallel plate PT1 located to the image side of the first lens block BK1 (needles to say, it also includes an aperture stop ape). That is, here, the imaging lens LN includes the first lens block BK1 alone as a lens block BK (an optical device having an optical power).

In the first lens block BK1, a first lens L1 (lens L[LS1o]) contiguous with the object-side substrate surface of a first lens substrate LS1 and a second lens L2 (lens L[LS1m]) contiguous with the image-side substrate surface of the first lens substrate LS1 are configured as noted below. The aperture stop ape is formed at the boundary surface between the first lens L1 and the first lens substrate LS1.

The 1st lens L1 is a plano-convex lens convex to the object side (its object-side lens surface being an aspherical surface); and
  The 2nd lens L2 is a plano-concave lens concave to the image side (its image-side lens surface being an aspherical surface).

Example 12

In Example 12, the imaging lens LN includes a first lens block BK1, and includes a plane-parallel plate PT1 located to the image side of the first lens block BK1 (needles to say, it also includes an aperture stop ape). That is, here, the imaging lens LN includes the first lens block BK1 alone as a lens block BK.

The first lens block BK1 includes a first lens substrate LS1, and, only with the image-side substrate surface of the first lens substrate LS1, a lens L (a first lens L1 (lens L[LS1m]) is contiguous. Specifically, the first lens L1 is configured as noted below. The aperture stop ape is formed on the object-side substrate surface of the first lens substrate LS1.

The 1st lens L1 is a plano-convex lens convex to the image side (its image-side lens surface being an aspherical surface).

Example 13

In Example 13, the imaging lens LN includes a first lens block BK1, a second lens block BK2, and an aperture stop ape. What is particular about this imaging lens LN, as distinct from the imaging lenses LN of Examples 1 to 12, is that it includes a lens substrate LS in which lens substrate pieces LSP and LSP are contiguous with each other.

The first lens block BK1 includes a first lens substrate LS1. The first lens substrate LS1 is formed by joining together (such as by cementing together) a lens substrate piece LSP1o located on the object side and a lens substrate piece LSP1m located on the image side. Even with such a first lens substrate LS1, both its, object-side and image-side, substrate surfaces (the object-side substrate surface of the lens substrate piece LSP1o and the image-side substrate surface of the lens substrate piece LSP1m) are planar. Thus, the first lens substrate LS1 is a plane-parallel plate.

A first lens L1 (lens L[LS1o]) is contiguous with the object-side substrate surface of the first lens substrate LS1, and a second lens L2 (lens L[LS1m]) is contiguous with the image-side substrate surface of the first lens substrate LS1. Specifically, the first lens L1 and the second lens L2 are configured as noted below. The aperture stop ape is formed at the boundary surface between the lens substrate pieces LSP1o LSP1m in the first lens substrate LS1.

The 1st lens L1 is a plano-convex lens convex to the object side (its object-side lens surface being an aspherical surface); and The 2nd lens L2 is a plano-concave lens concave to the image side (its image-side lens surface being an aspherical surface).

In the second lens block BK2, a third lens L3 (lens L[LS2o]) contiguous with the object-side substrate surface of a second lens substrate LS2 and a fourth lens L4 (lens L[LS2m]) contiguous with the image-side substrate surface of the second lens substrate LS2 are configured as noted below.

The 3rd lens L3 is a plano-convex lens convex to the object side (its object-side lens surface being an aspherical surface that is convex at its vertex and that is concave in its part where it intersects the principal ray with the maximum image height); and The 4th lens L4 is a plano-concave lens concave to the image side (its image-side lens surface being an aspherical surface).

Example 14

In Example 14, the imaging lens LN includes a first lens substrate LS1 in which lens substrate pieces LSP1o and LSP1m are contiguous with each other. The imaging lens LN further includes a first lens block BK1, a second lens block BK2, and an aperture stop ape.

In the first lens block BK1, a first lens L1 (lens L[LS1o]) contiguous with the object-side substrate surface of the first lens substrate LS1 and a second lens L2 (lens L[LS1m]) contiguous with the image-side substrate surface of the first lens substrate LS1 are configured as noted below. The aperture stop ape is formed at the boundary surface between the lens substrate pieces LSP1o LSP1m in the first lens substrate LS1.

The 1st lens L1 is a plano-convex lens convex to the object side (its object-side lens surface being an aspherical surface); and The 2nd lens L2 is a plano-concave lens concave to the image side (its image-side lens surface being an aspherical surface).

In the second lens block BK2, a third lens L3 (lens L[LS2o]) contiguous with the object-side substrate surface of a second lens substrate LS2 and a fourth lens L4 (lens L[LS2m]) contiguous with the image-side substrate surface of the second lens substrate LS2 are configured as noted below.

The 3rd lens L3 is a plano-concave lens concave to the object side (its object-side lens surface being an aspherical surface); and The 4th lens L4 is a plano-convex lens convex to the image side (its image-side lens surface being an aspherical surface).

Example 15

In Example 15, the imaging lens LN includes a first lens substrate LS1 in which lens substrate pieces LSP1o and LSP1m are contiguous with each other. The imaging lens LN further includes a first lens block BK1, a second lens block BK2, and an aperture stop ape.

In the first lens block BK1, a first lens L1 (lens L[LS1o]) contiguous with the object-side substrate surface of the first lens substrate LS1 and a second lens L2 (lens L[LS1m]) contiguous with the image-side substrate surface of the first lens substrate LS1 are configured as noted below. The aperture stop ape is formed at the boundary surface between the lens substrate pieces LSP1o LSP1m in the first lens substrate LS1.

The 1st lens L1 is a plano-convex lens convex to the object side (its object-side lens surface being an aspherical surface); and The 2nd lens L2 is a plano-concave lens concave to the image side (its image-side lens surface being an aspherical surface).

In the second lens block BK2, a third lens L3 (lens L[LS2o]) contiguous with the object-side substrate surface of a second lens substrate LS2 and a fourth lens L4 (lens L[LS2m]) contiguous with the image-side substrate surface of the second lens substrate LS2 are configured as noted below.

The 3rd lens L3 is a plano-concave lens concave to the object side (its object-side lens surface being an aspherical surface); and The 4th lens L4 is a plano-concave lens concave to the image side (its image-side lens surface being an aspherical surface).

Example 16

In Example 16, the imaging lens LN includes a first lens substrate LS1 in which lens substrate pieces LSP1o and LSP1m are contiguous with each other. The imaging lens LN further includes a first lens block BK1, a second lens block BK2, and an aperture stop ape.

In the first lens block BK1, a first lens L1 (lens L[LS1o]) contiguous with the object-side substrate surface of the first lens substrate LS1 and a second lens L2 (lens L[LS1m]) contiguous with the image-side substrate surface of the first lens substrate LS1 are configured as noted below. The aperture stop ape is formed at the boundary surface between the lens substrate pieces LSP1*o* LSP1*m* in the first lens substrate LS1.

The 1st lens L1 is a plano-convex lens convex to the object side (its object-side lens surface being an aspherical surface); and The 2nd lens L2 is a plano-concave lens concave to the image side (its image-side lens surface being an aspherical surface).

In the second lens block BK2, a third lens L3 (lens L[LS2*o*]) contiguous with the object-side substrate surface of a second lens substrate LS2 and a fourth lens L4 (lens L[LS2*m*]) contiguous with the image-side substrate surface of the second lens substrate LS2 are configured as noted below.

The 3rd lens L3 is a plano-convex lens convex to the object side (its object-side lens surface being an aspherical surface); and The 4th lens L4 is a plano-concave lens concave to the image side (its image-side lens surface being an aspherical surface).

Example 17

In Example 17, the imaging lens LN includes a first lens substrate LS1 in which lens substrate pieces LSP1*o* and LSP1*m* are contiguous with each other. The imaging lens LN further includes a first lens block BK1, a second lens block BK2, a third lens block BK3, and an aperture stop ape.

In the first lens block BK1, a first lens L1 (lens L[LS1*o*]) contiguous with the object-side substrate surface of the first lens substrate LS1 and a second lens L2 (lens L[LS1*m*]) contiguous with the image-side substrate surface of the first lens substrate LS1 are configured as noted below. The aperture stop ape is formed at the boundary surface between the lens substrate pieces LSP1*o* LSP1*m* in the first lens substrate LS1.

The 1st lens L1 is a plano-convex lens convex to the object side (its object-side lens surface being an aspherical surface); and The 2nd lens L2 is a plano-concave lens concave to the image side (its image-side lens surface being an aspherical surface).

In the second lens block BK2, a third lens L3 (lens L[LS2*o*]) contiguous with the object-side substrate surface of a second lens substrate LS2 and a fourth lens L4 (lens L[LS2*m*]) contiguous with the image-side substrate surface of the second lens substrate LS2 are configured as noted below.

The 3rd lens L3 is a plano-concave lens concave to the object side (its object-side lens surface being an aspherical surface); and The 4th lens L4 is a plano-convex lens convex to the image side (its image-side lens surface being an aspherical surface).

In the third lens block BK3, a fifth lens L5 (lens L[LS3*o*]) contiguous with the object-side substrate surface of a third lens substrate LS3 and a sixth lens L6 (lens L[LS3*m*]) contiguous with the image-side substrate surface of the third lens substrate LS3 are configured as noted below.

The 5th lens L5 is a plano-concave lens concave to the object side (its object-side lens surface being an aspherical surface); and The 6th lens L6 is a plano-convex lens convex to the image side (its image-side lens surface being an aspherical surface).

Example 18

In Example 18, the imaging lens LN includes a first lens block BK, a second lens block BK2, and an aperture stop ape (in this imaging lens LN, however, the aperture stop ape is located differently than in the imaging lenses LN of the other examples).

In the first lens block BK1, a first lens L1 (lens L[LS1*o*]) contiguous with the object-side substrate surface of the first lens substrate LS1 and a second lens L2 (lens L[LS1*m*]) contiguous with the image-side substrate surface of the first lens substrate LS1 are configured as noted below. The aperture stop ape, unlike those in the other examples, is formed on the object-side lens surface of the first lens substrate LS1.

The 1st lens L1 is a plano-convex lens convex to the object side (its object-side lens surface being an aspherical surface); and The 2nd lens L2 is a plano-concave lens concave to the image side (its image-side lens surface being an aspherical surface).

In the second lens block BK2, a third lens L3 (lens L[LS2*o*]) contiguous with the object-side substrate surface of a second lens substrate LS2 and a fourth lens L4 (lens L[LS2*m*]) contiguous with the image-side substrate surface of the second lens substrate LS2 are configured as noted below.

The 3rd lens L3 is a plano-convex lens convex to the object side (its object-side lens surface being an aspherical surface that is convex at its vertex and that is concave in its part where it intersects the principal ray with the maximum image height); and The 4th lens L4 is a plano-concave lens concave to the image side (its image-side lens surface being an aspherical surface).

Comparison Example

Taken up as a comparison example is the imaging lens LN of Example 2 disclosed in JP-B-3929479 (Patent Document 2 mentioned earlier) as traced and scaled to the actual dimensions.

This imaging lens LN includes a first lens block BK1, a second lens block BK2, a plane-parallel plate PT1, and an aperture stop ape (the plane-parallel plate PT1 is the cover glass of the image sensor SR).

In the first lens block BK1, a first lens L1 (lens L[LS1*o*]) contiguous with the object-side substrate surface of the first lens substrate LS1 and a second lens L2 (lens L[LS1*m*]) contiguous with the image-side substrate surface of the first lens substrate LS1 are configured as noted below. The aperture stop ape is disposed to the object side of the first lens L1.

The 1st lens L1 is a plano-convex lens convex to the object side (its object-side lens surface being an aspherical surface); and The 2nd lens L2 is a plano-concave lens concave to the image side (its image-side lens surface being an aspherical surface).

In the second lens block BK2, a third lens L3 (lens L[LS2*o*]) contiguous with the object-side substrate surface of a second lens substrate LS2 and a fourth lens L4 (lens L[LS2*m*]) contiguous with the image-side substrate surface of the second lens substrate LS2 are configured as noted below.

The 3rd lens L3 is a plano-convex lens convex to the object side (its object-side lens surface being an aspherical surface); and The 4th lens L4 is a plano-concave lens concave to the image side (its image-side lens surface being an aspherical surface).

[Lens Data of the Imaging Lens]

Next, with respect to the imaging lenses LN of Examples (EX) 1 to 18 and the comparison example (CEX), their respective general data, construction data, and aspherical surface data will be presented in tables.

The symbols used to present the general data are as follows:

f represents the focal length (in the unit of mm);

Fno represents the f-number;

BF represents the back-focal length (given as an equivalent length in air, which applies also to the back-focal length included in the optical total length, i.e. the total length of the imaging lens LN);

Y' represents the image height (in the unit of mm; with distortion disregarded);

ω represents the half angle of view (in the unit of degrees; with distortion taken into consideration); and TL represents the total length of the imaging lens LN (in the unit of mm).

With respect to a lens L contiguous with the object-side substrate surface of a lens substrate LS, its focal length is calculated on the assumption that air is present on the object side of the lens L and that the medium of the lens substrate LS is present on the image side of the lens L. With respect to a lens L contiguous with the image-side substrate surface of a lens substrate LS, its focal length is calculated on the assumption that the medium of the lens substrate LS is present on the object side of the lens L and that air is present on the image side of the lens L.

With respect to the object-side lens surface of an uncemented lens L, its focal length is calculated on the assumption that air is present on the object side of the lens L and that the medium of the lens substrate LS is present on the image side of the lens L. Needless to say, with respect to the image-side lens surface of an uncemented lens L, its focal length is calculated on the assumption that the medium of the lens substrate LS is present on the object side of the lens L and that air is present on the image side of the lens L.

The symbols used to present the construction data are as follows:

si represents a lens surface or substrate surface, with the suffixed number representing its place in order as counted from the object side to the image side;

i is a number suffixed as in "si" to represent the place in order as counted from the object side to the image side;

* indicates an aspherical surface;

ape represents an aperture stop;

r represents a radius of curvature (in the unit of mm) of a lens surface or substrate surface;

d represents an axial distance (in the unit of mm);

Nd represents the index of refraction of a medium for d-line (with a wavelength of 587.56 nm); and vd represents the Abbe number of a medium for d-line.

Aspherical surface data are defined by formula (AS) below employing the local rectangular coordinate system (x, y, z) having its origin at the vertex of an aspherical surface. Presented for each relevant surface (si) are the values of K and A to I below (wherever A to I are zero, they are omitted); for all these values, "E-n" stands for "×10$^{-n}$".

$$z = (c \cdot \rho^2)/[1 + \sqrt{1-(1+K) \cdot c^2 \cdot \rho^2}] + A \cdot \rho^4 + B \cdot \rho^6 + C \cdot \rho^8 + D \cdot \rho^{10} + E \cdot \rho^{12} + F \cdot \rho^{14} + G \cdot \rho^{16} + H \cdot \rho^{18} + I \cdot \rho^{20} \quad \text{(AS)}$$

where

ρ represents the height in a direction perpendicular to the z-axis (the optical axis AX) ($\rho^2 = x^2 + y^2$);

z represents the amount of sag in the optical axis AX direction at the height ρ (relative to the vertex);

c represents the curvature (the reciprocal of the radius of curvature r) at the vertex;

K represents the conic constant; and

A to I represent the aspherical surface coefficients of orders 4, 6, 8, 10, 12, 14, 16, 18, and 20 respectively.

Example 1

TABLE 1

| EXAMPLE 1 | | | | | | | | |
|---|---|---|---|---|---|---|---|---|
| f[mm] | | 2.955 | | Fno | | 2.8 | BF[mm] | 0.9280 |
| Y'[mm] | | 1.750 | | ω[°] | | 30.63 | TL[mm] | 3.177 |
| si | | i | r[mm] | i | d[mm] | i | Nd | vd | Element |
| s1 | * | 1 | 0.911 | | | | | | L1 | BK1 |
| | | | | 1 | 0.290 | 1 | 1.5071 | 54.00 | |
| s2 | ape | 2 | ∞ | | | | | | |
| | | | | 2 | 0.390 | 2 | 1.4875 | 70.44 | LS1 |
| s3 | | 3 | ∞ | | | | | | |
| | | | | 3 | 0.110 | 3 | 1.5737 | 29.00 | L2 |
| s4 | * | 4 | 1.564 | | | | | | |
| | | | | 4 | 0.684 | | | | |
| s5 | * | 5 | 3.611 | | | | | | L3 | BK2 |
| | | | | 5 | 0.115 | 4 | 1.5071 | 54.00 | |
| s6 | | 6 | ∞ | | | | | | |
| | | | | 6 | 0.304 | 5 | 1.4875 | 70.44 | LS2 |
| s7 | | 7 | ∞ | | | | | | |
| | | | | 7 | 0.355 | 6 | 1.5071 | 54.00 | L4 |
| s8 | * | 8 | 5.353 | | | | | | |
| | | | | 8 | 0.928 | | | | |
| s9 | | 9 | ∞ | | | | | | SR |

TABLE 2

EXAMPLE 1
Aspherical Surface Data

| si | s1 | s4 | s5 | s8 |
|---|---|---|---|---|
| K | 6.08E−03 | 5.15E+00 | −4.71E+01 | 4.12E−01 |
| A | −4.68E−03 | 7.41E−02 | −7.85E−02 | −6.53E−02 |
| B | 9.08E−02 | 1.47E−01 | −4.45E−02 | −2.39E−02 |
| C | −9.80E−02 | 7.91E−02 | −2.47E−02 | −8.17E−03 |

TABLE 2-continued

EXAMPLE 1
Aspherical Surface Data

| si | s1 | s4 | s5 | s8 |
|---|---|---|---|---|
| D | −5.25E−01 | 1.48E−01 | −3.66E−06 | 2.68E−03 |
| E | −6.08E−01 | −1.24E+00 | 1.20E−02 | −1.28E−03 |
| F | 5.71E+00 | −1.42E+00 | 1.39E−02 | −5.39E−04 |

Example 2

TABLE 3

EXAMPLE 2

| f[mm] | 2.918 | Fno | 2.8 | BF[mm] | 0.8086 |
|---|---|---|---|---|---|
| Y'[mm] | 1.730 | ω[°] | 30.96 | TL[mm] | 3.177 |

| si | | i | r[mm] | i | d[mm] | i | Nd | νd | Element | |
|---|---|---|---|---|---|---|---|---|---|---|
| s1 | * | 1 | 0.893 | | | | | | L1 | BK1 |
| | | | | 1 | 0.361 | 1 | 1.5305 | 55.72 | | |
| s2 | ape | 2 | ∞ | | | | | | | |
| | | | | 2 | 0.302 | 2 | 1.4997 | 62.16 | LS1 | |
| s3 | | 3 | ∞ | | | | | | | |
| | | | | 3 | 0.159 | 3 | 1.5834 | 30.23 | L2 | |
| s4 | * | 4 | 1.459 | | | | | | | |
| | | | | 4 | 0.508 | | | | | |
| s5 | * | 5 | 9.342 | | | | | | L3 | BK2 |
| | | | | 5 | 0.187 | 4 | 1.5305 | 55.72 | | |
| s6 | | 6 | ∞ | | | | | | | |
| | | | | 6 | 0.411 | 5 | 1.4997 | 62.16 | LS2 | |
| s7 | | 7 | ∞ | | | | | | | |
| | | | | 7 | 0.441 | 6 | 1.5305 | 55.72 | L4 | |
| s8 | * | 8 | 17.669 | | | | | | | |
| | | | | 8 | 0.809 | | | | | |
| s9 | | 9 | ∞ | | | | | | SR | |

TABLE 4

EXAMPLE 2
Aspherical Surface Data

| si | s1 | s4 | s5 | s8 |
|---|---|---|---|---|
| K | −1.09E−02 | 4.09E+00 | −3.70E+02 | 9.93E+01 |
| A | −5.00E−03 | 1.01E−01 | −1.60E−01 | −5.49E−02 |
| B | 9.04E−02 | 2.25E−01 | −1.94E−02 | −4.07E−02 |
| C | −1.75E−01 | 1.25E−03 | −2.97E−02 | −8.86E−03 |
| D | −3.06E−01 | 3.27E+00 | −6.92E−02 | 1.03E−03 |
| E | −1.32E−01 | −3.52E+00 | −9.81E−02 | 1.44E−03 |
| F | 5.97E+00 | 2.75E−01 | 3.33E−02 | −9.40E−05 |
| G | −7.17E+00 | −8.80E−01 | 3.63E−01 | −1.15E−03 |
| H | 5.00E+00 | −4.84E+01 | 0.00E+00 | 0.00E+00 |
| I | −6.89E−03 | −2.70E+01 | 0.00E+00 | 0.00E+00 |

Example 3

TABLE 5

EXAMPLE 3

| f[mm] | 2.895 | Fno | 2.8 | BF[mm] | 0.8105 |
|---|---|---|---|---|---|
| Y'[mm] | 1.750 | ω[°] | 31.15 | TL[mm] | 3.177 |

| si | | i | r[mm] | i | d[mm] | i | Nd | νd | Element | |
|---|---|---|---|---|---|---|---|---|---|---|
| s1 | * | 1 | 0.938 | | | | | | L1 | BK1 |
| | | | | 1 | 0.310 | 1 | 1.5071 | 54.00 | | |
| s2 | ape | 2 | ∞ | | | | | | | |
| | | | | 2 | 0.379 | 2 | 1.4875 | 70.42 | LS1 | |
| s3 | | 3 | ∞ | | | | | | | |
| | | | | 3 | 0.100 | 3 | 1.5737 | 29.00 | L2 | |

TABLE 5-continued

| | | | | EXAMPLE 3 | | | | | |
|---|---|---|---|---|---|---|---|---|---|
| s4 | * | 4 | 1.740 | | | | | | |
| | | | | 4 | 0.734 | | | | |
| s5 | * | 5 | 3.356 | | | | | | L3 BK2 |
| | | | | 5 | 0.124 | 4 | 1.5071 | 54.00 | |
| s6 | | 6 | ∞ | | | | | | |
| | | | | 6 | 0.303 | 5 | 1.4875 | 70.42 | LS2 |
| s7 | | 7 | ∞ | | | | | | |
| | | | | 7 | 0.416 | 6 | 1.5071 | 54.00 | L4 |
| s8 | * | 8 | 4.230 | | | | | | |
| | | | | 8 | 0.810 | | | | |
| s9 | | 9 | ∞ | | | | | | SR |

TABLE 6

EXAMPLE 3
Aspherical Surface Data

| si | s1 | s4 | s5 | s8 |
|---|---|---|---|---|
| K | 3.23E−03 | 5.82E+00 | −4.41E+01 | −5.87E+01 |
| A | −5.96E−03 | 1.04E−01 | −6.96E−02 | −3.94E−02 |
| B | 9.10E−02 | 1.63E−01 | −2.97E−02 | −7.25E−03 |
| C | −3.15E−02 | −3.99E−02 | −9.84E−03 | −1.25E−02 |
| D | −3.97E−01 | 1.97E−01 | 4.86E−03 | 1.82E−03 |
| E | −4.04E−01 | 2.73E−01 | 7.38E−03 | −6.82E−04 |
| F | 3.91E+00 | −7.07E−01 | 2.52E−03 | 1.41E−04 |

Example 4

TABLE 7

| | | | | EXAMPLE 4 | | | | | |
|---|---|---|---|---|---|---|---|---|---|
| f[mm] | | 2.979 | | Fno | | 2.8 | | BF[mm] | 0.7526 |
| Y'[mm] | | 1.750 | | ω[°] | | 30.43 | | TL[mm] | 3.448 |
| | si | i | r[mm] | i | d[mm] | i | Nd | vd | Element |
| s1 | * | 1 | 0.934 | | | | | | L1 BK1 |
| | | | | 1 | 0.362 | 1 | 1.4875 | 70.45 | |
| s2 | ape | 2 | ∞ | | | | | | |
| | | | | 2 | 0.427 | 2 | 1.6886 | 47.43 | LS1 |
| s3 | | 3 | ∞ | | | | | | |
| | | | | 3 | 0.074 | 3 | 1.6889 | 31.16 | L2 |
| s4 | * | 4 | 2.194 | | | | | | |
| | | | | 4 | 0.726 | | | | |
| s5 | * | 5 | 4.356 | | | | | | L3 BK2 |
| | | | | 5 | 0.124 | 4 | 1.5305 | 55.72 | |
| s6 | | 6 | ∞ | | | | | | |
| | | | | 6 | 0.362 | 5 | 1.6886 | 47.43 | LS2 |
| s7 | | 7 | ∞ | | | | | | |
| | | | | 7 | 0.619 | 6 | 1.5305 | 55.72 | L4 |
| s8 | * | 8 | 6.134 | | | | | | |
| | | | | 8 | 0.753 | | | | |
| s9 | | 9 | ∞ | | | | | | SR |

TABLE 8

EXAMPLE 4
Aspherical Surface Data

| si | s1 | s4 | s5 | s8 |
|---|---|---|---|---|
| K | 1.78E−02 | 6.32E+00 | −4.52E+01 | −9.45E+00 |
| A | −2.99E−03 | 1.17E−01 | −7.05E−02 | −3.51E−02 |
| B | 1.01E−01 | 2.15E−01 | −2.74E−02 | −7.32E−03 |
| C | −6.96E−03 | 1.70E−01 | −9.45E−03 | −1.25E−02 |
| D | −3.67E−01 | 1.01E+00 | 2.67E−03 | 1.77E−03 |
| E | −4.39E−01 | 9.13E−01 | 6.76E−03 | −6.39E−04 |
| F | 3.39E+00 | −3.45E+00 | 2.96E−03 | 2.11E−04 |

Example 5

TABLE 9

| EXAMPLE 5 | | | | | | | | |
|---|---|---|---|---|---|---|---|---|
| f[mm] | | 2.964 | Fno | | 2.8 | BF[mm] | | 0.4625 |
| Y'[mm] | | 1.750 | ω[°] | | 30.56 | TL[mm] | | 3.179 |
| si | | i | r[mm] | i | d[mm] | i | Nd | νd | Element |
| s1 | * | 1 | 0.808 | | | | | | L1 BK1 |
| | | | | 1 | 0.489 | 1 | 1.5071 | 54.00 | |
| s2 | ape | 2 | ∞ | | | | | | |
| | | | | 2 | 0.300 | 2 | 1.6492 | 29.92 | LS1 |
| s3 | | 3 | ∞ | | | | | | |
| | | | | 3 | 0.080 | 3 | 1.5737 | 29.00 | L2 |
| s4 | * | 4 | 2.301 | | | | | | |
| | | | | 4 | 0.373 | | | | |
| s5 | * | 5 | −1.948 | | | | | | L3 BK2 |
| | | | | 5 | 0.100 | 4 | 1.5071 | 54.00 | |
| s6 | | 6 | ∞ | | | | | | |
| | | | | 6 | 0.695 | 5 | 1.6492 | 29.92 | LS2 |
| s7 | | 7 | ∞ | | | | | | |
| | | | | 7 | 0.680 | 6 | 1.5071 | 54.00 | L4 |
| s8 | * | 8 | 18.783 | | | | | | |
| | | | | 8 | 0.463 | | | | |
| s9 | | 9 | ∞ | | | | | | SR |

TABLE 10

| EXAMPLE 5 Aspherical Surface Data | | | | |
|---|---|---|---|---|
| si | s1 | s4 | s5 | s8 |
| K | −1.20E−01 | 1.63E+01 | 1.04E+01 | −3.60E+04 |
| A | 1.30E−02 | 3.20E−02 | −4.11E−01 | −3.72E−02 |
| B | 2.66E−02 | 2.71E−01 | 3.07E−01 | −1.36E−01 |
| C | 1.51E−01 | −9.96E−01 | −4.63E+00 | 5.58E−02 |
| D | −1.54E−01 | 1.63E+00 | 9.15E+00 | 2.95E−03 |
| E | −2.05E−01 | −2.38E+00 | −4.59E+00 | −1.45E−02 |

TABLE 10-continued

| EXAMPLE 5 Aspherical Surface Data | | | | |
|---|---|---|---|---|
| si | s1 | s4 | s5 | s8 |
| F | 2.63E+00 | 7.12E+01 | −7.14E+01 | −4.84E−03 |
| G | −3.72E+00 | −3.52E+00 | −2.51E+01 | 4.32E−03 |
| H | 3.33E+00 | −4.13E+01 | −6.52E+01 | 2.28E−03 |
| I | 2.59E+00 | −5.28E+02 | −1.88E+02 | −1.37E−03 |

Example 6

TABLE 11

| EXAMPLE 6 | | | | | | | | |
|---|---|---|---|---|---|---|---|---|
| f[mm] | | 2.954 | Fno | | 2.8 | BF[mm] | | 0.5282 |
| Y'[mm] | | 1.750 | ω[°] | | 30.64 | TL[mm] | | 3.280 |
| si | | i | r[mm] | i | d[mm] | i | Nd | νd | Element |
| s1 | * | 1 | 0.758 | | | | | | L1 BK1 |
| | | | | 1 | 0.360 | 1 | 1.5071 | 54.00 | |
| s2 | ape | 2 | ∞ | | | | | | |
| | | | | 2 | 0.303 | 2 | 1.8408 | 40.83 | LS1 |
| s3 | | 3 | ∞ | | | | | | |
| | | | | 3 | 0.114 | 3 | 1.6100 | 26.00 | L2 |
| s4 | * | 4 | 2.606 | | | | | | |
| | | | | 4 | 0.281 | | | | |
| s5 | * | 5 | −1.751 | | | | | | L3 BK2 |
| | | | | 5 | 0.095 | 4 | 1.6100 | 26.00 | |
| s6 | | 6 | ∞ | | | | | | |
| | | | | 6 | 0.360 | 5 | 1.8408 | 40.83 | LS2 |
| s7 | | 7 | ∞ | | | | | | |
| | | | | 7 | 0.198 | 6 | 1.6100 | 26.00 | L4 |
| s8 | * | 8 | −33.387 | | | | | | |
| | | | | 8 | 0.110 | | | | |
| s9 | * | 9 | 7.682 | | | | | | L5 BK3 |
| | | | | 9 | 0.110 | 7 | 1.5305 | 55.72 | |
| s10 | | 10 | ∞ | | | | | | |
| | | | | 10 | 0.312 | 8 | 1.8408 | 40.83 | LS3 |
| s11 | | 11 | ∞ | | | | | | |
| | | | | 11 | 0.510 | 9 | 1.5305 | 55.72 | L6 |
| s12 | * | 12 | 5.749 | | | | | | |
| | | | | 12 | 0.528 | | | | |
| s13 | | 13 | ∞ | | | | | | SR |

TABLE 12

EXAMPLE 6
Aspherical Surface Data

| | si | | | | | |
|---|---|---|---|---|---|---|
| | s1 | s4 | s5 | s8 | s9 | s12 |
| K | 1.52E−02 | 2.72E+01 | 1.11E+01 | 0.00E+00 | −5.44E+02 | −1.31E+02 |
| A | −8.73E−03 | 3.43E−02 | −1.82E−01 | −7.36E−02 | −1.09E−01 | −1.39E−01 |
| B | 1.07E−01 | −4.99E−01 | −1.14E+00 | −2.57E−02 | −2.61E−03 | 2.93E−02 |
| C | −1.83E−01 | 1.14E+00 | 2.31E+00 | −1.62E−02 | −8.62E−03 | −2.37E−02 |
| D | 6.94E−01 | −9.83E−01 | −1.22E+01 | −2.96E−02 | −1.58E−02 | −1.76E−02 |
| E | −2.14E+00 | −1.15E+01 | 3.69E+00 | 0.00E+00 | −1.89E−02 | 8.83E−03 |
| F | 8.57E+00 | −1.45E+01 | 2.58E+01 | 0.00E+00 | −1.65E−02 | 5.73E−03 |
| G | 0.00E+00 | −2.16E+02 | −3.77E+00 | 0.00E+00 | −1.02E−02 | −3.87E−03 |
| H | 0.00E+00 | 8.29E+02 | −1.62E+03 | 0.00E+00 | 6.72E−04 | 5.37E−05 |
| I | 0.00E+00 | 0.00E+00 | −2.05E+03 | 0.00E+00 | 1.60E−02 | 1.47E−04 |

Example 7

TABLE 13

EXAMPLE 7

| f[mm] | 2.927 | Fno | 2.8 | BF[mm] | 0.6582 |
| Y'[mm] | 1.750 | ω[°] | 30.88 | TL[mm] | 3.176 |

| si | | i | r[mm] | i | d[mm] | i | Nd | vd | Element | |
|---|---|---|---|---|---|---|---|---|---|---|
| s1 | * | 1 | 0.798 | | | | | | L1 | BK1 |
| | | | | 1 | 0.339 | 1 | 1.5071 | 54.00 | | |
| s2 | ape | 2 | ∞ | | | | | | | |
| | | | | 2 | 0.308 | 2 | 1.5508 | 43.35 | LS1 | |
| s3 | | 3 | ∞ | | | | | | | |
| | | | | 3 | 0.109 | 3 | 1.5737 | 29.00 | L2 | |
| s4 | * | 4 | 2.618 | | | | | | | |
| | | | | 4 | 0.207 | | | | | |
| s5 | * | 5 | −1.816 | | | | | | L3 | BK2 |
| | | | | 5 | 0.099 | 4 | 1.5737 | 29.00 | | |
| s6 | | 6 | ∞ | | | | | | | |
| | | | | 6 | 0.375 | 5 | 1.5508 | 43.35 | LS2 | |
| s7 | | 7 | ∞ | | | | | | | |
| | | | | 7 | 0.100 | | | | | |
| s8 | * | 8 | 3.325 | | | | | | L4 | BK3 |
| | | | | 8 | 0.104 | 6 | 1.5071 | 54.00 | | |
| s9 | | 9 | ∞ | | | | | | | |
| | | | | 9 | 0.304 | 7 | 1.5531 | 43.28 | LS3 | |
| s10 | | 10 | ∞ | | | | | | | |
| | | | | 10 | 0.572 | 8 | 1.5071 | 54.00 | L5 | |
| s11 | * | 11 | 3.856 | | | | | | | |
| | | | | 11 | 0.658 | | | | | |
| s12 | | 12 | ∞ | | | | | | SR | |

TABLE 14

EXAMPLE 7
Aspherical Surface Data

| | si | | | | |
|---|---|---|---|---|---|
| | s1 | s4 | s5 | s8 | s11 |
| K | 1.95E−02 | 2.43E+01 | 1.09E+01 | −1.36E+02 | −1.06E+02 |
| A | −7.50E−04 | 1.22E−01 | 2.12E−01 | −1.18E−01 | −1.22E−01 |
| B | 1.22E−01 | −4.91E−01 | −1.32E+00 | −4.71E−02 | 1.34E−02 |
| C | −1.64E−01 | 1.15E+00 | 1.69E+00 | 1.00E−03 | −1.88E−02 |
| D | 8.90E−01 | 2.30E−02 | −3.12E+00 | −3.52E−02 | −1.51E−02 |
| E | −2.19E+00 | −8.87E+00 | 2.70E+00 | −6.31E−03 | 7.97E−03 |
| F | 4.90E+00 | −3.57E+00 | 2.82E+01 | −2.61E−04 | 4.14E−03 |
| G | 0.00E+00 | −1.85E+02 | 4.19E+01 | 1.40E−02 | −3.86E−03 |
| H | 0.00E+00 | 8.43E+02 | −1.28E+03 | 3.75E−02 | 2.95E−04 |
| I | 0.00E+00 | 0.00E+00 | 5.02E+00 | 2.89E−02 | 7.25E−05 |

Example 8

TABLE 15

| \multicolumn{9}{c}{EXAMPLE 8} |
|---|---|---|---|---|---|---|---|---|
| f[mm] | 2.894 | | Fno | | 3.5 | | BF[mm] | 0.9650 |
| Y'[mm] | 1.750 | | ω[°] | | 31.06 | | TL[mm] | 3.190 |
| si | | i | r[mm] | i | d[mm] | i | Nd | νd | Element |
| s1 | * | 1 | 0.879 | | | | | | L1 BK1 |
| | | | | 1 | 0.256 | 1 | 1.5071 | 54.00 | |
| s2 | ape | 2 | ∞ | | | | | | |
| | | | | 2 | 0.309 | 2 | 1.4874 | 70.44 | LS1 |
| s3 | | 3 | ∞ | | | | | | |
| | | | | 3 | 0.074 | 3 | 1.5071 | 54.00 | L2 |
| s4 | * | 4 | 1.416 | | | | | | |
| | | | | 4 | 0.784 | | | | |
| s5 | * | 5 | 3.214 | | | | | | L3 BK2 |
| | | | | 5 | 0.098 | 4 | 1.5071 | 54.00 | |
| s6 | | 6 | ∞ | | | | | | |
| | | | | 6 | 0.500 | 5 | 1.8337 | 23.49 | LS2 |
| s7 | | 7 | ∞ | | | | | | |
| | | | | 7 | 0.206 | 6 | 1.5071 | 54.00 | L4 |
| s8 | * | 8 | 4.295 | | | | | | |
| | | | | 8 | 0.953 | | | | |
| s9 | | 9 | ∞ | | | | | | SR |

TABLE 16

| \multicolumn{5}{c}{EXAMPLE 8 Aspherical Surface Data} |
|---|---|---|---|---|
| si | s1 | s4 | s5 | s8 |
| K | 3.48E−02 | 2.87E+00 | −5.52E+00 | 3.91E+00 |
| A | 3.23E−03 | 1.91E−01 | −2.06E−01 | −9.39E−02 |
| B | 1.38E−01 | −8.83E−02 | 1.79E−02 | −3.38E−02 |
| C | 5.16E−02 | 3.15E+00 | 1.26E−03 | 9.85E−03 |
| D | −2.95E+00 | −4.04E+00 | −5.12E−02 | 9.67E−05 |
| E | 3.49E−01 | −6.85E+00 | −3.94E−02 | −3.65E−03 |
| F | 4.45E+01 | −7.51E−01 | 5.47E−02 | 5.10E−04 |

Example 9

TABLE 17

| \multicolumn{9}{c}{EXAMPLE 9} |
|---|---|---|---|---|---|---|---|---|
| f[mm] | 2.874 | | Fno | | 2.8 | | BF[mm] | 0.3700 |
| Y'[mm] | 1.750 | | ω[°] | | 31.82 | | TL[mm] | 3.180 |
| si | | i | r[mm] | i | d[mm] | i | Nd | νd | Element |
| s1 | * | 1 | 0.907 | | | | | | L1 BK1 |
| | | | | 1 | 0.202 | 1 | 1.5071 | 54.00 | |
| s2 | ape | 2 | ∞ | | | | | | |
| | | | | 2 | 0.455 | 2 | 1.4874 | 70.44 | LS1 |
| s3 | | 3 | ∞ | | | | | | |
| | | | | 3 | 0.080 | 3 | 1.5071 | 54.00 | L2 |
| s4 | * | 4 | 2.328 | | | | | | |
| | | | | 4 | 0.250 | | | | |
| s5 | * | 5 | −1.384 | | | | | | L3 BK2 |
| | | | | 5 | 0.053 | 3 | 1.5071 | 54.00 | |
| s6 | | 6 | ∞ | | | | | | |
| | | | | 6 | 0.300 | 4 | 1.4874 | 70.44 | LS2 |
| s7 | | 7 | ∞ | | | | | | |
| | | | | 7 | 0.250 | 5 | 1.5071 | 54.00 | L4 |
| s8 | * | 8 | −0.905 | | | | | | |
| | | | | 8 | 0.594 | | | | |
| s9 | * | 9 | −0.902 | | | | | | L5 BK3 |
| | | | | 9 | 0.080 | 6 | 1.5071 | 54.00 | |
| s10 | | 10 | ∞ | | | | | | |
| | | | | 10 | 0.300 | 7 | 1.4874 | 70.44 | LS3 |
| s11 | | 11 | ∞ | | | | | | |
| | | | | 11 | 0.250 | 8 | 1.5071 | 54.00 | L6 |
| s12 | * | 12 | −5.158 | | | | | | |
| | | | | 12 | 0.355 | | | | |
| s13 | | 13 | ∞ | | | | | | SR |

TABLE 18

EXAMPLE 9
Aspherical Surface Data

| si | s1 | s4 | s5 | s8 | s9 | s12 |
|----|-----|-----|-----|-----|-----|-----|
| K | 2.88E−01 | 2.82E+00 | 4.87E+00 | −5.63E−03 | −1.40E+00 | −5.44E+00 |
| A | −4.53E−02 | 1.22E−01 | −5.36E−02 | 2.24E−01 | 2.14E−01 | −1.15E−02 |
| B | 2.12E−02 | 1.14E−01 | 2.60E−01 | 1.77E−01 | 1.81E−03 | −1.07E−02 |
| C | −1.43E−01 | 3.05E−01 | 1.53E+00 | 5.46E−01 | −1.27E−02 | 4.78E−03 |

Example 10

TABLE 19

EXAMPLE 10

| f[mm] | 2.750 | Fno | 2.8 | BF[mm] | 0.1081 |
| Y'[mm] | 1.750 | ω[°] | 32.32 | TL[mm] | 3.198 |

| si | | i | r[mm] | i | d[mm] | i | Nd | vd | Element | |
|----|---|---|-------|---|-------|---|------|-------|---------|---|
| s1 | * | 1 | 0.923 | | | | | | L1 | BK1 |
| | | | | 1 | 0.330 | 1 | 1.5071 | 54.00 | | |
| s2 | ape | 2 | ∞ | | | | | | | |
| | | | | 2 | 0.300 | 2 | 1.5300 | 48.91 | LS1 | |
| s3 | | 3 | ∞ | | | | | | | |
| | | | | 3 | 0.080 | 3 | 1.5740 | 29.00 | L2 | |
| s4 | * | 4 | 5.000 | | | | | | | |
| | | | | 4 | 0.336 | | | | | |
| s5 | * | 5 | −3.144 | | | | | | L3 | BK2 |
| | | | | 5 | 0.075 | 4 | 1.5740 | 29.00 | | |
| s6 | | 6 | ∞ | | | | | | | |
| | | | | 6 | 0.359 | 5 | 1.5300 | 48.91 | LS2 | |
| s7 | | 7 | ∞ | | | | | | | |
| | | | | 7 | 0.100 | 6 | 1.5740 | 29.00 | L4 | |
| s8 | * | 8 | −4.805 | | | | | | | |
| | | | | 8 | 0.050 | | | | | |
| s9 | | 9 | ∞ | | | | | | LS3 | BK3 |
| | | | | 9 | 0.678 | 7 | 1.5300 | 48.91 | | |
| s10 | | 10 | ∞ | | | | | | | |
| | | | | 10 | 0.132 | 8 | 1.5740 | 29.00 | L5 | |
| s11 | * | 11 | −277.220 | | | | | | | |
| | | | | 11 | 0.200 | | | | | |
| s12 | * | 12 | −1.681 | | | | | | L6 | BK4 |
| | | | | 12 | 0.050 | 9 | 1.5740 | 29.00 | | |
| s13 | | 13 | ∞ | | | | | | | |
| | | | | 13 | 0.300 | 10 | 1.5300 | 48.91 | LS4 | |
| s14 | | 14 | ∞ | | | | | | | |
| | | | | 14 | 0.100 | 11 | 1.5740 | 29.00 | L7 | |
| s15 | * | 15 | 15.376 | | | | | | | |
| | | | | 15 | 0.108 | | | | | |
| s16 | | 16 | ∞ | | | | | | SR | |

TABLE 20

EXAMPLE 10
Aspherical Surface Data

| si | s1 | s4 | s5 | s8 | s11 | s12 | s15 |
|----|-----|-----|-----|-----|------|------|------|
| K | 2.77E−01 | 2.04E+01 | −9.39E+01 | 2.08E+01 | −1.00E+03 | −1.03E+01 | −1.00E+03 |
| A | −3.94E−02 | 2.87E−02 | −5.69E−01 | 1.62E−01 | 1.29E−01 | 8.52E−02 | 2.22E−01 |
| B | −2.96E−01 | −4.79E−01 | 9.32E−01 | 5.78E−02 | −1.38E−01 | −1.79E−02 | −3.20E−01 |
| C | 1.48E+00 | 3.30E+00 | −5.77E+00 | −6.96E−02 | 4.81E−02 | 7.43E−03 | 1.52E−01 |
| D | −3.81E+00 | −1.41E+01 | 5.95E+00 | −3.63E−02 | 7.38E−03 | −3.75E−05 | −1.80E−02 |
| E | −4.17E+00 | 3.20E+00 | 1.13E+01 | 2.85E−02 | −8.22E−03 | 3.18E−04 | −5.09E−03 |
| F | 2.60E+01 | 5.49E+01 | −5.99E+01 | 1.61E−02 | −1.40E−03 | −5.95E−05 | 4.89E−04 |
| G | −2.50E+01 | 1.37E+01 | −2.95E+01 | −7.64E−03 | 1.20E−03 | 0.00E+00 | 2.65E−04 |
| H | 9.60E+00 | −3.02E+01 | −7.94E+01 | −1.87E−02 | 2.21E−04 | 0.00E+00 | 3.59E−05 |
| I | 2.94E+00 | −3.27E+02 | −2.39E+02 | 5.60E−02 | −1.17E−04 | 0.00E+00 | −1.86E−05 |

Example 11

TABLE 21

EXAMPLE 11

| f[mm] | 1.590 | Fno | 2.8 | BF[mm] | 1.1036 |
| Y'[mm] | 0.880 | ω[°] | 28.96 | TL[mm] | 2.204 |

| si | | i | r[mm] | i | d[mm] | i | Nd | vd | Element | |
|----|----|---|-------|---|-------|---|------|------|------|-----|
| s1 | *  | 1 | 0.802 |   |       |   |      |      | L1   | BK1 |
|    |    |   |       | 1 | 0.050 | 1 | 1.5071 | 54.00 |    |     |
| s2 | ape| 2 | ∞     |   |       |   |      |      |      |     |
|    |    |   |       | 2 | 0.670 | 2 | 1.6077 | 56.20 | LS1 |     |
| s3 |    | 3 | ∞     |   |       |   |      |      |      |     |
|    |    |   |       | 3 | 0.050 | 3 | 1.5071 | 54.00 | L2  |     |
| s4 | *  | 4 | 100.000 | |     |   |      |      |      |     |
|    |    |   |       | 4 | 0.050 |   |      |      |      |     |
| s5 |    | 5 | ∞     |   |       |   |      |      |      |     |
|    |    |   |       | 5 | 0.880 | 4 | 1.5163 | 64.10 | PT1 |     |
| s6 |    | 6 | ∞     |   |       |   |      |      |      |     |
|    |    |   |       | 6 | 0.471 |   |      |      |      |     |
| s7 |    | 7 | ∞     |   |       |   |      |      | SR   |     |

TABLE 22

EXAMPLE 11
Aspherical Surface Data

| si | s1 | s4 |
|----|------|------|
| K  | −1.53E+00 | −1.00E+00 |
| A  | −6.59E−01 | 1.83E+00 |
| B  | 5.00E+01 | −1.42E+01 |

TABLE 22-continued

EXAMPLE 11
Aspherical Surface Data

| si | s1 | s4 |
|----|------|------|
| C  | −9.55E+02 | 1.12E+02 |
| D  | 6.20E+03 | −3.39E+02 |

Example 12

TABLE 23

EXAMPLE 12

| f[mm] | 1.317 | Fno | 2.8 | BF[mm] | 1.3175 |
| Y'[mm] | 0.880 | ω[°] | 33.75 | TL[mm] | 2.103 |

| si | | i | r[mm] | i | d[mm] | i | Nd | vd | Element | |
|----|----|---|-------|---|-------|---|------|------|------|-----|
| s1 | ape| 1 | ∞     |   |       |   |      |      | LS1  | BK1 |
|    |    |   |       | 1 | 0.434 | 1 | 1.5168 | 64.00 |    |     |
| s2 |    | 2 | ∞     |   |       |   |      |      | L1   |     |
|    |    |   |       | 2 | 0.216 | 2 | 1.5200 | 54.00 |    |     |
| s3 | *  | 3 | −0.672 | |      |   |      |      |      |     |
|    |    |   |       | 3 | 0.150 |   |      |      |      |     |
| s4 |    | 4 | ∞     |   |       |   |      |      | PT1  |     |
|    |    |   |       | 4 | 0.400 | 3 | 1.5168 | 64.00 |    |     |
| s5 |    | 5 | ∞     |   |       |   |      |      |      |     |
|    |    |   |       | 5 | 0.903 |   |      |      |      |     |
| s6 |    | 6 | ∞     |   |       |   |      |      | SR   |     |

TABLE 24

EXAMPLE 12
Aspherical Surface Data

| si | s3 |
|----|------|
| K  | 3.35E−01 |
| A  | 1.28E+00 |
| B  | −1.10E+01 |
| C  | 5.77E+01 |
| D  | −9.18E+01 |
| E  | 2.76E+01 |

Example 13

TABLE 25

| EXAMPLE 13 | | | | | | | | |
|---|---|---|---|---|---|---|---|---|
| f[mm] | 2.998 | | Fno | 3.5 | | BF[mm] | 0.9140 | |
| Y'[mm] | 1.750 | | ω[°] | 30.78 | | TL[mm] | 3.210 | |

| si | | i | r[mm] | i | d[mm] | i | Nd | vd | Element | |
|---|---|---|---|---|---|---|---|---|---|---|
| s1 | * | 1 | 0.865 | | | | | | L1 | BK1 |
| | | | | 1 | 0.269 | 1 | 1.5071 | 54.00 | | |
| s2 | | 2 | ∞ | | | | | | | |
| | | | | 2 | 0.152 | 2 | 1.4874 | 70.44 | LSP1o | LS1 |
| s3 | ape | 3 | ∞ | | | | | | | |
| | | | | 3 | 0.213 | 3 | 1.4996 | 62.20 | LSP1m | |
| s4 | | 4 | ∞ | | | | | | | |
| | | | | 4 | 0.138 | 4 | 1.5071 | 54.00 | L2 | |
| s5 | * | 5 | 1.337 | | | | | | | |
| | | | | 5 | 0.591 | | | | | |
| s6 | * | 6 | 14.221 | | | | | | L3 | BK2 |
| | | | | 6 | 0.066 | 5 | 1.5071 | 54.00 | | |
| s7 | | 7 | ∞ | | | | | | | |
| | | | | 7 | 0.499 | 6 | 1.5950 | 35.53 | LS2 | |
| s8 | | 8 | ∞ | | | | | | | |
| | | | | 8 | 0.371 | 7 | 1.5071 | 54.00 | L4 | |
| s9 | * | 9 | 18.481 | | | | | | | |
| | | | | 9 | 0.899 | | | | | |
| s10 | | 10 | ∞ | | | | | | SR | |

TABLE 26

| EXAMPLE 13 Aspherical Surface Data | | | | |
|---|---|---|---|---|
| si | s1 | s5 | s6 | s9 |
| K | 3.63E−03 | 3.01E+00 | −1.18E+02 | 9.94E+01 |
| A | 6.26E−03 | 1.77E−01 | −2.02E−01 | −6.20E−02 |
| B | −1.04E−01 | 2.15E−01 | 1.60E−02 | −5.65E−02 |
| C | 5.62E−01 | 6.22E−01 | −2.20E−02 | 1.45E−02 |

TABLE 26-continued

| EXAMPLE 13 Aspherical Surface Data | | | | |
|---|---|---|---|---|
| si | s1 | s5 | s6 | s9 |
| D | 3.93E−01 | 1.07E+00 | −7.63E−02 | 2.53E−04 |
| E | −9.48E+00 | −6.80E+00 | −1.35E−02 | −4.64E−03 |
| F | 2.10E+01 | −6.54E−01 | 2.06E−01 | −2.95E−04 |

Example 14

TABLE 27

| EXAMPLE 14 | | | | | | | | |
|---|---|---|---|---|---|---|---|---|
| f[mm] | 2.809 | | Fno | 2.8 | | BF[mm] | 0.6900 | |
| Y'[mm] | 1.750 | | ω[°] | 31.25 | | TL[mm] | 3.200 | |

| si | | i | r[mm] | i | d[mm] | i | Nd | vd | Element | |
|---|---|---|---|---|---|---|---|---|---|---|
| s1 | * | 1 | 0.838 | | | | | | L1 | BK1 |
| | | | | 1 | 0.289 | 1 | 1.5071 | 54.00 | | |
| s2 | | 2 | ∞ | | | | | | | |
| | | | | 2 | 0.296 | 2 | 1.6952 | 53.81 | LSP1o | LS1 |
| s3 | ape | 3 | ∞ | | | | | | | |
| | | | | 3 | 0.254 | 3 | 1.6952 | 53.81 | LSP1m | |
| s4 | | 4 | ∞ | | | | | | | |
| | | | | 4 | 0.070 | 4 | 1.5737 | 29.00 | L2 | |
| s5 | * | 5 | 1.935 | | | | | | | |
| | | | | 5 | 0.235 | | | | | |
| s6 | * | 6 | −2.568 | | | | | | L3 | BK2 |
| | | | | 6 | 0.170 | 5 | 1.5737 | 29.00 | | |
| s7 | | 7 | ∞ | | | | | | | |
| | | | | 7 | 0.780 | 6 | 1.4874 | 70.44 | LS2 | |
| s8 | | 8 | ∞ | | | | | | | |
| | | | | 8 | 0.419 | 7 | 1.5737 | 29.00 | L4 | |
| s9 | * | 9 | −5.977 | | | | | | | |
| | | | | 9 | 0.683 | | | | | |
| s10 | | 10 | ∞ | | | | | | SR | |

TABLE 28

| EXAMPLE 14 Aspherical Surface Data | | | | |
|---|---|---|---|---|
| si | s1 | s5 | s6 | s9 |
| K | 1.91E−01 | 4.31E+00 | 1.77E+01 | −1.64E+02 |
| A | −4.93E−02 | 2.38E−01 | −2.65E−01 | −1.27E−01 |
| B | 4.30E−02 | −1.01E+00 | −3.91E−01 | 5.68E−02 |
| C | −2.25E−01 | 6.62E+00 | −1.50E+00 | −2.95E−02 |

Example 15

TABLE 29

| EXAMPLE 15 | | | | | | | |
|---|---|---|---|---|---|---|---|
| f[mm] | 2.962 | | Fno | 2.8 | | BF[mm] | 0.4200 |
| Y'[mm] | 1.750 | | ω[°] | 29.58 | | TL[mm] | 3.210 |

| si | | i | r[mm] | i | d[mm] | i | Nd | νd | Element | |
|---|---|---|---|---|---|---|---|---|---|---|
| s1 | * | 1 | 0.920 | | | | | | L1 | BK1 |
| | | | | 1 | 0.412 | 1 | 1.5071 | 54.00 | | |
| s2 | | 2 | ∞ | | | | | | | |
| | | | | 2 | 0.470 | 2 | 1.6952 | 53.81 | LSP1o | LS1 |
| s3 | ape | 3 | ∞ | | | | | | | |
| | | | | 3 | 0.080 | 3 | 1.6952 | 53.81 | LSP1m | |
| s4 | | 4 | ∞ | | | | | | | |
| | | | | 4 | 0.070 | 4 | 1.5737 | 29.00 | L2 | |
| s5 | * | 5 | 2.490 | | | | | | | |
| | | | | 5 | 0.425 | | | | | |
| s6 | * | 6 | −2.645 | | | | | | L3 | BK2 |
| | | | | 6 | 0.215 | 5 | 1.5737 | 29.00 | | |
| s7 | | 7 | ∞ | | | | | | | |
| | | | | 7 | 0.500 | 6 | 1.4874 | 70.44 | LS2 | |
| s8 | | 8 | ∞ | | | | | | | |
| | | | | 8 | 0.617 | 7 | 1.5737 | 29.00 | L4 | |
| s9 | * | 9 | 7.023 | | | | | | | |
| | | | | 9 | 0.411 | | | | | |
| s10 | | 10 | ∞ | | | | | | SR | |

TABLE 30

| EXAMPLE 15 Aspherical Surface Data | | | | |
|---|---|---|---|---|
| si | s1 | s5 | s6 | s9 |
| K | 4.11E−02 | 1.28E+00 | 1.60E+01 | −1.00E+05 |
| A | −2.47E−02 | 1.69E−01 | −3.98E−01 | −4.53E−02 |
| B | 1.42E−03 | −6.17E−03 | 7.31E−01 | −2.98E−02 |
| C | −4.23E−02 | 1.55E+00 | −2.56E+00 | −5.48E−03 |

Example 16

TABLE 31

| EXAMPLE 16 | | | | | | | |
|---|---|---|---|---|---|---|---|
| f[mm] | 2.932 | | Fno | 2.8 | | BF[mm] | 0.7200 |
| Y'[mm] | 1.750 | | ω[°] | 29.47 | | TL[mm] | 3.390 |

| si | | i | r[mm] | i | d[mm] | i | Nd | νd | Element | |
|---|---|---|---|---|---|---|---|---|---|---|
| s1 | * | 1 | 1.132 | | | | | | L1 | BK1 |
| | | | | 1 | 0.200 | 1 | 1.5800 | 45.50 | | |
| s2 | | 2 | ∞ | | | | | | | |
| | | | | 2 | 0.273 | 2 | 1.4740 | 65.40 | LSP1o | LS1 |
| s3 | ape | 3 | ∞ | | | | | | | |
| | | | | 3 | 0.461 | 3 | 1.4740 | 65.40 | LSP1m | |
| s4 | | 4 | ∞ | | | | | | | |
| | | | | 4 | 0.020 | 4 | 1.4700 | 54.80 | L2 | |
| s5 | * | 5 | 1.306 | | | | | | | |
| | | | | 5 | 0.835 | | | | | |
| s6 | * | 6 | 3.298 | | | | | | L3 | BK2 |
| | | | | 6 | 0.200 | 5 | 1.5800 | 45.50 | | |
| s7 | | 7 | ∞ | | | | | | | |
| | | | | 7 | 0.500 | 6 | 1.4740 | 65.40 | LS2 | |

TABLE 31-continued

| | | | EXAMPLE 16 | | | | | |
|---|---|---|---|---|---|---|---|---|
| s8 | | 8 | ∞ | | | | | |
| | | | | 8 | 0.180 | 7 | 1.5800 | 45.50 | L4 |
| s9 | * | 9 | 18.311 | | | | | |
| | | | | 9 | 0.719 | | | |
| s10 | | 10 | ∞ | | | | | SR |

TABLE 32

EXAMPLE 16
Aspherical Surface Data

| si | s1 | s5 | s6 | s9 |
|---|---|---|---|---|
| K | 1.69E−01 | −1.06E+00 | 6.25E−01 | −4.10E+03 |
| A | −3.94E−02 | 2.27E−01 | −1.05E−02 | 8.02E−02 |

TABLE 32-continued

EXAMPLE 16
Aspherical Surface Data

| si | s1 | s5 | s6 | s9 |
|---|---|---|---|---|
| B | 5.09E−02 | 2.19E−01 | −3.11E−02 | −6.36E−02 |
| C | −9.03E−02 | −4.14E−01 | 9.96E−03 | 6.91E−03 |

Example 17

TABLE 33

| | | | EXAMPLE 17 | | | | | |
|---|---|---|---|---|---|---|---|---|
| f[mm] | | 2.897 | | Fno | | 2.8 | BF[mm] | 0.3700 |
| Y'[mm] | | 1.750 | | ω[°] | | 31.81 | TL[mm] | 3.180 |

| si | | i | r[mm] | i | d[mm] | i | Nd | νd | Element | |
|---|---|---|---|---|---|---|---|---|---|---|
| s1 | * | 1 | 0.907 | | | | | | L1 | BK1 |
| | | | | 1 | 0.202 | 1 | 1.5071 | 54.00 | | |
| s2 | | 2 | ∞ | | | | | | | |
| | | | | 2 | 0.135 | 2 | 1.4874 | 70.44 | LSP1o | LS1 |
| s3 | ape | 3 | ∞ | | | | | | | |
| | | | | 3 | 0.320 | 3 | 1.4874 | 70.44 | LSP1m | |
| s4 | | 4 | ∞ | | | | | | | |
| | | | | 4 | 0.080 | 4 | 1.5071 | 54.00 | L2 | |
| s5 | * | 5 | 2.328 | | | | | | | |
| | | | | 5 | 0.250 | | | | | |
| s6 | * | 6 | −1.384 | | | | | | L3 | BK2 |
| | | | | 6 | 0.053 | 5 | 1.5071 | 54.00 | | |
| s7 | | 7 | ∞ | | | | | | | |
| | | | | 7 | 0.300 | 6 | 1.4874 | 70.44 | LS2 | |
| s8 | | 8 | ∞ | | | | | | | |
| | | | | 8 | 0.250 | 7 | 1.5071 | 54.00 | L4 | |
| s9 | * | 9 | −0.905 | | | | | | | |
| | | | | 9 | 0.594 | | | | | |
| s10 | * | 10 | −0.902 | | | | | | L5 | BK3 |
| | | | | 10 | 0.080 | 8 | 1.5071 | 54.00 | | |
| s11 | | 11 | ∞ | | | | | | | |
| | | | | 11 | 0.300 | 9 | 1.4874 | 70.44 | LS3 | |
| s12 | | 12 | ∞ | | | | | | | |
| | | | | 12 | 0.250 | 10 | 1.5071 | 54.00 | L6 | |
| s13 | * | 13 | −5.158 | | | | | | | |
| | | | | 13 | 0.355 | | | | | |
| s14 | | 14 | ∞ | | | | | | SR | |

TABLE 34

EXAMPLE 17
Aspherical Surface Data

| si | s1 | s5 | s6 | s9 | s10 | s13 |
|---|---|---|---|---|---|---|
| K | 2.88E−01 | 2.82E+00 | 4.87E+00 | −5.63E−03 | −1.40E+00 | −5.44E+00 |
| A | −4.53E−02 | 1.22E−01 | −5.36E−02 | 2.24E−01 | 2.14E−01 | −1.15E−02 |
| B | 2.12E−02 | 1.14E−01 | 2.60E−01 | 1.77E−01 | 1.81E−03 | −1.07E−02 |
| C | −1.43E−01 | 3.05E−01 | 1.53E+00 | 5.46E−01 | −1.27E−02 | 4.78E−03 |

Example 18

TABLE 35

| EXAMPLE 18 | | | | | | | | |
|---|---|---|---|---|---|---|---|---|
| f[mm] | 3.045 | | Fno | 4.0 | | BF[mm] | 1.0420 | |
| Y'[mm] | 1.750 | | ω[°] | 30.34 | | TL[mm] | 3.220 | |
| si | | i | r[mm] | i | d[mm] | i | Nd | vd | Element |
| s1 | * | 1 | 0.834 | | | | | | L1 BK1 |
| | | | | 1 | 0.244 | 1 | 1.5071 | 54.00 | |
| s2 | | 2 | ∞ | | | | | | |
| | | | | 2 | 0.238 | 2 | 1.4874 | 70.44 | LS1 |
| s3 | ape | 3 | ∞ | | | | | | |
| | | | | 3 | 0.143 | 3 | 1.5071 | 54.00 | L2 |
| s4 | * | 4 | 1.229 | | | | | | |
| | | | | 4 | 0.811 | | | | |
| s5 | * | 5 | 3.594 | | | | | | L3 BK2 |
| | | | | 5 | 0.078 | 4 | 1.5071 | 54.00 | |
| s6 | | 6 | ∞ | | | | | | |
| | | | | 6 | 0.420 | 5 | 1.8337 | 23.49 | LS2 |
| s7 | | 7 | ∞ | | | | | | |
| | | | | 7 | 0.239 | 6 | 1.5071 | 54.00 | L4 |
| s8 | * | 8 | 4.416 | | | | | | |
| | | | | 8 | 1.029 | | | | |
| s9 | | 9 | ∞ | | | | | | SR |

TABLE 36

| EXAMPLE 18 Aspherical Surface Data | | | | |
|---|---|---|---|---|
| si | s1 | s4 | s5 | s8 |
| K | 2.63E−02 | 2.86E+00 | −2.15E+01 | 1.54E+00 |
| A | 9.37E−03 | 1.93E−01 | −1.91E−01 | −1.33E−01 |
| B | −7.85E−02 | −2.09E−01 | 3.95E−02 | −9.36E−03 |
| C | 1.20E+00 | 8.89E+00 | −6.10E−03 | 9.85E−03 |

TABLE 36-continued

| EXAMPLE 18 Aspherical Surface Data | | | | |
|---|---|---|---|---|
| si | s1 | s4 | s5 | s8 |
| D | −2.71E+00 | −4.65E+01 | −1.67E−02 | −1.77E−03 |
| E | −4.69E+00 | −1.40E+01 | 8.08E−04 | −5.53E−03 |
| F | 3.03E+01 | −5.64E+01 | 1.48E−02 | 1.82E−03 |

Comparison Example

TABLE 37

| COMPARISON EXAMPLE | | | | | | | | |
|---|---|---|---|---|---|---|---|---|
| f[mm] | 2.796 | | Fno | 2.9 | | BF[mm] | 1.3300 | |
| Y'[mm] | 1.750 | | ω[°] | 31.67 | | TL[mm] | 3.020 | |
| si | | i | ri[mm] | i | di[mm] | i | Ni | vi | Element |
| s1 | ape | 1 | ∞ | | | | | | ape |
| | | | | 1 | 0.000 | | | | |
| s2 | * | 2 | 0.859 | | | | | | L1 BK1 |
| | | | | 2 | 0.324 | 1 | 1.5300 | 35.00 | |
| s3 | | 3 | ∞ | | | | | | |
| | | | | 3 | 0.288 | 2 | 1.5168 | 61.00 | LS1 |
| s4 | | 4 | ∞ | | | | | | |
| | | | | 4 | 0.036 | 3 | 1.5168 | 62.00 | L2 |
| s5 | * | 5 | 1.165 | | | | | | |
| | | | | 5 | 0.383 | | | | |
| s6 | * | 6 | 3.935 | | | | | | L3 BK2 |
| | | | | 6 | 0.115 | 4 | 1.5300 | 35.00 | |
| s7 | | 7 | ∞ | | | | | | |
| | | | | 7 | 0.288 | 5 | 1.5168 | 61.00 | LS2 |
| s8 | | 8 | ∞ | | | | | | |
| | | | | 8 | 0.252 | 6 | 1.5300 | 35.00 | L4 |
| s9 | * | 9 | 22.176 | | | | | | |
| | | | | 9 | 0.425 | | | | |
| s10 | | 10 | ∞ | | | | | | |
| | | | | 10 | 0.432 | 7 | 1.5168 | 61.00 | PT1 |
| s11 | | 11 | ∞ | | | | | | |
| | | | | 11 | 0.603 | | | | |
| s12 | | 12 | ∞ | | | | | | SR |

TABLE 38

COMPARISON EXAMPLE
Aspherical Surface Data

| si | s2 | s5 | s6 | s9 |
|---|---|---|---|---|
| K | −2.04E−01 | −1.22E+01 | −1.65E+01 | −1.01E+05 |
| A | 1.50E−02 | 1.01E+00 | −1.00E−01 | 6.95E−02 |
| B | −5.92E−02 | −8.08E−01 | −3.43E−01 | −3.01E−01 |
| C | 9.46E−01 | −1.55E+00 | −1.84E−01 | 1.94E−01 |
| D | −8.99E−01 | 1.44E+01 | 5.97E−01 | −7.86E−02 |

[Aberrations in the Imaging Lens]

The aberrations in the imaging lens LN in Examples (EX) 1 to 18 and in the comparison example (CEX) are shown in FIGS. 20A-20C to 38A-38C respectively. These aberration diagrams show longitudinal spherical aberration, astigmatism (astigmatic field curves), and distortion.

The spherical aberration diagrams show the amount of spherical aberration for d-line (with an wavelength of 587.56 nm), the amount of spherical aberration for C-line (with an wavelength of 656.28 nm), and the amount of spherical aberration for g-line (with an wavelength of 453.84 nm), as expressed in terms of deviations from the paraxial image surface along the optical axis AX (in the unit of mm). In the spherical aberration diagrams, the vertical axis represents the value of the height of incidence on the pupil as normalized with respect to its maximum height (i.e. the relative pupil height). What types of line are used to represent d-, c-, and g-lines is indicated in each diagram.

The astigmatism diagrams show the tangential image surface for d-line and the sagittal image surface for d-line, as expressed in terms of deviations from the paraxial image surface along the optical axis AX (in the unit of mm). The line marked "T" corresponds to the tangential image surface, and the line marked "S" corresponds to the sagittal image surface. In the astigmatism diagrams, the vertical axis represents the image height (IMG HT) (in the unit of mm).

In the distortion diagrams, the horizontal axis represents the distortion (in the unit of %) for d-line, and the vertical axis represents the image height (in the unit of mm). The image height corresponds to the maximum image height Y' (half the diagonal length of the sensing surface SS of the image sensor SR) on the imaging surface.

[Details of the Imaging Lens]

The construction of the imaging lens LN will now be described in more detail below.

The imaging lens LN includes a lens block (wafer scale lens) BK. The lens block BK is, as described previously, mass-produced inexpensively. To allow a wider choice of materials in its production, for example to allow the choice of easy-to-process or inexpensive materials, the lens block BK includes a lens L and a lens substrate LS made of different materials.

On the other hand, even such a lens block BK needs to have optical performance comparable with that of a conventional, normal lens system (normal lens) formed of glass or resin. Generally, in a case where attention is paid to telecentricity to the image surface in a normal lens, it is preferable that an aperture stop be located at the most object-side position.

Inconveniently, however, when an aperture stop is located at the most object-side position, then, with respect to the aperture stop, no optical symmetry is established between a lens surface located to the object side and a lens surface located to the image side thereof (for example, if an aperture stop is located near the middle of the optical total length of a normal lens and in addition if, with respect to the aperture stop, a lens surface located to the object side thereof is convex to the object side and a lens surface located to the image side thereof is convex to the image surface, symmetry can be said to be established).

In cases where no such symmetry is established, normal lenses suffer from degraded aberration performance (in short, aberrations are difficult to correct near the aperture stop on either side of it). As a solution to this, for example, JP-A-2006-91638 and JP-A-2006-98504 disclose a normal lens in which the most object-side lens is a meniscus lens convex to the object side and the object-side lens surface of this meniscus lens is given a comparatively small radius of curvature.

In this normal lens, despite its being a wide-angle lens system, even when an interlens aperture stop is adopted, the aperture stop is located to the object side. As a result, this normal lens is telecentric to the image surface and simultaneously secures optical symmetry between the object side and the image side with respect to the aperture stop position.

In the case of a lens block BK, however, especially in the case of a lens block BK including a lens substrate LS in the form of a plane-parallel plate, due to processing-related restrictions, the lens substrate LS needs to have a certain thickness and cannot be made sufficiently thin. Thus a lens block BK including a lens substrate LS cannot be formed into a meniscus shape with a thickness smaller than that of the lens substrate LS.

Accordingly, in such a lens block BK, locating an aperture stop ape further to the object side of an object-side lens L (for example, the first lens L1) with respect to the lens substrate LS, or locating an aperture stop ape further to the image side of an image-side lens L (for example, the first lens L2) with respect to the lens substrate LS, results in the lens block BK having degraded optical performance than a normal lens.

For example, one example of the degraded optical performance resulting from an aperture stop ape being located to the object side of the first lens L1 is astigmatism. Astigmatism arises from the ratio between the angle of incidence on a lens surface (with respect to a normal to it) and the angle of emergence from it varying with image height. What is particular about astigmatism is that it deteriorates as astigmatic difference increases mainly at periphery (off the optical axis) according to formula (AFC) below (it should be noted that formula (AFC) is a general formula for comparatively thick lenses).

$$(d/2n) \cdot (1 - \cos^2 U / \cos^2 U') \cdot (\cos U - \cos U') \quad \text{(AFC)}$$

where
  d represents the thickness of the lens;
  n represents the index of refraction of the lens;
  U represents the angle of incidence on the lens; and
  U' represents the angle of emergence from the lens.

Locating the aperture stop ape to the object side of the first lens L1 not only results in degraded optical performance as described above, but also results in higher sensitivity to the off-axial eccentric error of the imaging lens LN. The sensitivity to the off-axial eccentric error is one of the different types of sensitivity of the imaging lens LN to the manufacturing errors, and denotes the amount of one-sided blur occurring on the imaging surface when the imaging lens LN has shift eccentricity.

Such increased sensitivity to the off-axial eccentric error is attributable to a comparatively long distance between the center of curvature of a lens L to an aperture stop ape. Generally, a comparatively short distance between the center of curvature of a lens L to an aperture stop ape permits the light passing through the aperture stop ape to be incident on the lens surface comparatively perpendicularly; this leads to reduced ray trajectory deviations attributable to eccentricity, leaving the optical performance little affected.

By contrast, a comparatively long distance between the center of curvature of a lens L to an aperture stop ape makes it difficult for the light passing through the aperture stop ape to be incident on the lens surface perpendicularly; this leads to increased ray trajectory deviations attributable to eccentricity, affecting the optical performance.

On the other hand, locating an aperture stop ape to the image side of the second lens L2 leads to degraded telecentricity to the image surface. That is, disposing an aperture stop to the image side while maintaining compactness leads to degraded performance.

For example, consider an imaging lens LN whose optical total length is approximately equal to its focal length and whose focal length is approximately twice the image height. In this imaging lens LN, when an aperture stop ape is disposed at the center of the optical system, the rays with the maximum angle of view (the maximum image height), when traveling from the position of the aperture stop ape to the image surface, are incident on the sensing surface of the image sensor SR at an angle of incidence larger than the angle of view.

This results in an increased angle of incidence on the image surface. Moreover, this angle of incidence is larger than the limit angle of incidence on the lens array in front of the sensing surface of the image sensor SR; this causes rays to be vignetted, leading to insufficient illuminance at periphery.

In light of the foregoing, locating an aperture stop ape inside the first lens block BK1 (particularly preferably inside the first lens substrate LS1) helps realize an imaging lens LN that is telecentric to the image surface and that in addition has satisfactory aberration correction performance. One condition to be fulfilled to realize such an imaging lens LN is conditional formula (A1) below. Conditional formula (A1) defines the location of an aperture stop ape.

$$0 \leq DT[LS1o\text{-}ape]/d[LS1] \leq 1 \quad (A1)$$

where
  DT[LS1o–ape] represents the distance from the object-side substrate surface of the first lens substrate LS1 to the aperture stop surface (here a distance from the object-side substrate surface of the first lens substrate LS1 to the image side is assumed to be "positive" and one to the object side is assumed to be "negative"); and
  d[LS1] represents the thickness of the first lens substrate LS1 along the optical axis.

If the value of conditional formula (A1) is less than the lower limit, the aperture stop ape is located to the object side of the object-side substrate surface of the first lens substrate LS1, resulting in a comparatively long distance between the center of curvature of the lens L[LS1o] and the aperture stop ape. This makes the sensitivity of the imaging lens LN to the off-axial eccentric error higher, and thus makes the surface accuracy required on the lens L extremely high. This makes the manufacture of the imaging lens LN difficult.

By contrast, if the value of conditional formula (A1) is more than the upper limit, the aperture stop ape is located to the image side of the image-side substrate surface of the first lens substrate LS1. That is, the aperture stop ape is then located excessively close to the image side. This leads to lower telecentricity to the image surface.

Thus, when the value of conditional formula (A1) falls within the range from the lower limit to the upper limit, the imaging lens LN is manufactured comparatively easily and inexpensively, and the manufactured imaging lens LN has high performance (for example, high aberration correction performance) despite being compact.

One example that fulfills conditional formula (A1) is when the value of conditional formula (A1) equals zero (equals the lower limit). In this case, the aperture stop ape is formed on the object-side substrate surface of the first lens substrate LS1. With this design, the aperture stop ape is located comparatively to the object side, leading to improved telecentricity to the image surface.

To follow is a more detailed description of conditional formula (A1). An imaging lens LN fulfilling conditional formula (A1), without inclusion of a diffractive surface, shortens the optical total length relative to the image height and corrects aberrations satisfactorily. Even when the imaging lens LN includes two or more lens blocks BK, these lens blocks BK include lens substrates LS with reduced sensitivity to manufacturing errors. Thus, even such an imaging lens LN including two lens blocks BK can be manufactured easily and inexpensively, and in addition is compact and has high performance.

When such an imaging lens LN is incorporated in an imaging device LU, the imaging device LU can be manufactured inexpensively, and in addition is compact and has high performance. Needless to say, the same applies when such an imaging device LU is incorporated in a portable terminal CU. Specifically, then a portable terminal CU is realized that is slim, lightweight, and compact but that nevertheless is inexpensive and has high performance and high functionality.

These benefits in respect of the imaging lens LN are obtained even by fulfilling conditional formula (A1a) below.

$$0 < DT[LS1o\text{-}ape]/d[LS1] \leq 1 \quad (A1a)$$

Next, conditions and other features for striking a good balance among the various benefits described above and for achieving high-grade optical performance etc. will be described below.

For example, an imaging lens LN including an aperture stop ape fulfilling conditional formula (A1) may include at least one lens block BK. Inclusion of one lens block BK alone makes the imaging lens LN compact; inclusion of a plurality of lens blocks BK gives the imaging lens LN high aberration correction performance.

Moreover, as shown in FIG. 40B, the imaging lens LN is manufactured by joining together lens block units UT, which each have a number of molded lenses L arranged on a lens substrate LS, and also a substrate B2, which can serve as a sensor cover, with spacer members B1 in between, and then cutting them apart along the spacer members B1.

Thus, when the lens substrates LS are plane-parallel plates, in the manufacturing process of the imaging lens LN, not only is the processing of the lens substrates LS easy or unnecessary, but also the lenses L, formed on the substrate surfaces, are stable. Thus, a lens substrate LS in the form of a plane-parallel plate helps alleviate the burden involved in the manufacture of the imaging lens LN.

Furthermore, when the lens substrates LS are plane-parallel plates, the boundary surface between a substrate surface and a lens L has no optical power. Thus, for example, the surface accuracy on a substrate surface of a lens substrate LS little affects the focus position of the imaging lens LN on the image surface. This gives the imaging lens LN high performance.

Moreover, it is preferable that the aperture stop ape be a light-shielding film. Such an aperture stop ape in the form of a film can be formed, for example, on a substrate surface (the object-side or image-side substrate surface) of the first lens substrate LS1 by application or vacuum evaporation.

In addition, forming the aperture stop ape by application or vacuum evaporation makes it comparatively thin. It is particularly preferable that conditional formula (A2) below be fulfilled.

$$d[ape]<25 \tag{A2}$$

where
d[ape] represents the thickness of the aperture stop in the optical axis direction (in the unit of µm).

That is, it is preferable that the thickness of the aperture stop ape in the optical axis direction be less than 25 µm (it is more preferable that the thickness of the aperture stop ape in the optical axis direction be less than 10 µm, i.e. d[ape]≦10 µm). With this design, reflection near the edge of the aperture stop ape is less likely. Thus no stray light attributable to reflection there is produced in the imaging lens LN. In the imaging lens LN of any of the practical examples, the aperture stop ape has a thickness fulfilling conditional formula (A2).

Moreover, in the first lens block BK1, the lens L[LS1o] is contiguous with the object-side substrate surface of the first lens substrate LS1. It is preferable that the object-side lens surface of this lens L[LS1o] be convex to the object side.

With this design, the center of curvature of the lens L[LS1o] is located to the image side of the object-side lens surface of the lens L[LS1o], and is thus closer to the first lens block B1. And, in an imaging lens LN fulfilling conditional formula (A1), the aperture stop ape is located somewhere between the object-side and image-side substrate surfaces of the first lens substrate LS1. Thus the distance between the center of curvature and the aperture stop ape is comparatively short (in addition, it is easy to secure optical symmetry between the object side and the image side with respect to the aperture stop position). This reduces the sensitivity of the imaging lens LN to the off-axial eccentric error, and also reduces the lens surface accuracy required. This makes the manufacture of the imaging lens LN easy.

Moreover, in the first lens block BK1, the lens L[LS1m] is contiguous with the image-side substrate surface of the first lens substrate LS1. It is preferable that the image-side lens surface of this lens L[LS1m] be concave to the image side.

Generally, in a single-focal-length imaging lens LN including two lens blocks BK, for example, when the object-side lens surface of lens L[LS1o] is convex to the object side, this surface convex to the object side has a strong optical power. Then, when the image-side lens surface of the lens L[LS1m], located to the image side of the lens L[LS1o], is concave to the image side, aberrations (for example, spherical aberration) are corrected efficiently.

Incidentally, when the object-side lens surface of the lens L[LS1o] is convex to the object side and the image-side lens surface of the lens L[LS1m] is concave to the image side, symmetry with respect to the aperture stop ape is difficult to establish. Even then, when the focal length of the lens L[LS1m] is longer than the focal length of the lens L[LS1o] (i.e. when the curvature of the image-side lens surface of the lens L[LS1m] is comparatively gentle), the optical power of the image-side lens surface of the lens L[LS1m] cannot be said to be excessively strong. Thus the imaging lens LN is less susceptible to the effect of non-establishment of optical symmetry (in short, aberrations of various kinds are corrected to a certain or larger degree).

Furthermore, despite inclusion of such a lens L[LS1m], the imaging lens LN, including the first lens block BK1 in which an aperture stop ape is located on the object-side substrate surface of the first lens substrate LS1, has low sensitivity to the off-axial eccentric error. Thus, the imaging lens LN can be manufactured easily and inexpensively, and in addition is compact and has high performance.

When the focal length of the entire imaging lens LN (the entire system) is approximately equal to the total length of the imaging lens LN, the imaging lens LN can be said to be compact. For example, when the ratio of the composite focal length f of the optical system to the optical total length TL is in the range of "0.6<f/TL<1.2", the imaging lens LN can be said to be compact (here, the optical total length denotes the distance from the most object-side surface in the imaging lens LN to the sensing surface of the image sensor). Put otherwise, if the value of f/TL is 0.6 or less, the imaging lens LN cannot be compact; if the value of f/TL is 1.2 or more, degraded telecentricity and degraded aberration correction performance result.

One example of a condition to be fulfilled to manufacture such a compact imaging lens LN, in particular to manufacture a imaging lens LN with an angle of view in the range defined by conditional formula (A3) below, is conditional formula (A4) below. Conditional formula (A4) defines the ratio of the distance from the vertex of the object-side lens surface of the lens L[LS1o] to the aperture stop ape to the radius of curvature of the object-side lens surface of the lens L[LS1o].

$$1.4<f[all]/Y'<1.9 \tag{A3}$$

where
f[all] represents the focal length of the entire imaging lens LN; and
Y' represents the maximum image height (half the diagonal length of the sensing surface of the image sensor SR).

$$0.18 \leq (d[L[LS1o]] + DT[LS1o-ape])/r[L[LS1o]o] \leq 1.2 \tag{A4}$$

where
d[L[LS1o]] represents the thickness of the lens L[LS1o] along the optical axis;
DT[LS1o-ape] represents the distance from the object-side substrate surface of the first lens substrate LS1 to the aperture stop surface; and
r[L[LS1o]o] represents the paraxial radius of curvature of the object-side lens surface of the lens L[LS1o].

If the value of conditional formula (A4) is less than the lower limit, for example, the center of curvature of the lens L[LS1o] is comparatively long, and the center of curvature is far away from the object-side surface of the lens L[LS1o]. Thus the distance between the center of curvature of the lens L[LS1o] and the aperture stop ape is comparatively long, and the imaging lens LN is highly sensitive to the off-axial eccentric error. This makes the manufacture of the imaging lens LN difficult.

By contrast, if the value of conditional formula (A4) is more than the upper limit, for example, the aperture stop ape is comparatively far away from the object-side surface of the lens L[LS1o]. Thus the aperture stop ape is located excessively close to the image side, and lower telecentricity results.

Thus, when the value of conditional formula (A4) falls within the range from the lower limit to the upper limit, as when conditional formula (A1) is fulfilled, the imaging lens LN is manufactured easily and inexpensively, and in addition is compact and has high performance.

These benefits in respect of the imaging lens LN are obtained even by fulfilling conditional formula (A4a) or (A4b) below. To follow is a detailed description in this regard. It is preferable that the value of the conditional formula be close to 1; in practice, however, if the value is in one of the ranges defined below, the manufacture is not unduly difficult. If the upper limit of the conditional formula is disregarded, the resin lens portion is so thick that it is difficult to harden it; an unevenly hardened medium develops a refractive index distribution, producing stray light and leading to degraded imaging performance. If the lower limit of the conditional formula is disregarded, the lens portion is so thin that it is difficult to give the lens portion an optical power, leading to degraded aberration performance (curvature of field).

$$0.25 \leq (d[L[LS1o]] + DT[LS1o-ape])/r[L[LS1o]o] \leq 1.2 \quad \text{(A4a)}$$

$$0.2 \leq (d[L[LS1o]] + DT[LS1o-ape])/r[L[LS1o]o] \leq 0.8 \quad \text{(A4b)}$$

Moreover, the benefits in respect of the imaging lens LN which are obtained when conditional formula (A4), (A4a), or (A4b) is fulfilled are obtained also in the range defined by conditional formula (A3a) or (A3b) below instead.

$$1.4 < f[\text{all}]/Y' < 2.1 \quad \text{(A3a)}$$

$$1.8 < f[\text{all}]/Y' < 2.1 \quad \text{(A3b)}$$

Moreover, in the imaging lens LN, it is preferable that conditional formula (A5) below be fulfilled. Conditional formula (5A) defines the thickness of the first lens substrate LS in terms of the optical total length.

$$0.03 \leq d[LS1]/ \leq 0.33 \quad \text{(A5)}$$

where
d[LS1] represents the thickness of the first lens substrate LS1 along the optical axis; and
TL represents the distance from the most object-side surface in the imaging lens LN to the imaging surface along the optical axis.

If the value of conditional formula (A5) is less than the lower limit, the first lens substrate LS1 is so thin that the first lens block BK1 is difficult to manufacture. Moreover, in a case where the first lens substrate LS1 is formed thin by grinding a commercially available glass plate, the cost of the amount of material so ground is wasted. Moreover, the too thin first lens substrate LS1 may necessitate increasing the thicknesses of the lenses L[LS1o] and L[LS1m] with expensive resin, leading to an increased cost of the first lens block BK1 (and hence of the imaging lens LN).

By contrast, if the value of conditional formula (A5) is more than the upper limit, the first lens substrate LS1 is too thick, and hence the first lens block BK1 is too thick. The excessive thicknesses here lead to increased astigmatic difference.

Moreover, in a three-or-less-element, compact optical system, it is preferable that the most object-side lens is a meniscus lens convex to the object side as disclosed in JP-A-2006-91638 and JP-A-2006-98504. If the first lens substrate LS1 is too thick as mentioned above, however, the first lens block BK1 has a shape far from a thin meniscus shape. This imposes restrictions on the design, in connection with aberration correction, of the imaging lens LN (in short, such an imaging lens LN has low aberration correction performance). In addition, an imaging lens LN including such a first lens block BK1 is unsuitable as a wide-angle lens system.

Thus, when the value of conditional formula (A5) falls within the range from the lower limit to the upper limit, the imaging lens LN is manufactured inexpensively, and in addition is compact and has high performance. It is particularly preferable that, within the conditional range defined by conditional formula (A5), the conditional range defined by conditional formula (A5a) or (A5b) below be fulfilled.

$$0.065 \leq d[LS1]/TL \leq 0.19 \quad \text{(A5a)}$$

$$0.09 \leq d[LS1]/TL \leq 0.19 \quad \text{(A5b)}$$

With this design, to a greater degree the imaging lens LN is manufactured inexpensively, and in addition is compact and has high performance. Moreover, using a commercially available glass plate as the first lens substrate LS1 makes the manufacture of the imaging lens LN easy (in short, it is preferable that the lens surface be formed of glass).

In a case where the first lens substrate LS1 is formed by cementing together separate lens substrate pieces LSP (LSP1o and LSP1m), the thickness of the lens substrate pieces LSP cemented together is the thickness of the first lens substrate LS1.

When the lens substrate pieces LSP are flat-plate-shaped glass pieces, the first lens substrate LS1 is formed by cementing together two flat-plate-shaped glass pieces. And, with such a first lens substrate LS1, the aperture stop ape may be located at the cemented surface between the lens substrate pieces LSP (it is preferable that the thickness of this aperture stop ape be less than 25 μm, and particularly preferably less than 10 μm).

For example, by printing an aperture stop ape on one surface, which will become the cemented surface, of a lens substrate piece LSP, and then bonding on that printed surface one surface of another lens substrate piece LSP, it is possible to easily form the aperture stop ape inside a lens substrate LS. And, when such a lens substrate LS is used as the first lens substrate LS1, the value of conditional formula (A1) falls within the range between the lower and upper limits. Thus the imaging lens LN is manufactured easily and inexpensively, and in addition is compact and has high performance The position of the aperture stop ape affects the effective diameters of lenses L. In this connection, conditional formula (A6) below is an example of a condition defining the effective diameters of lenses L. Conditional formula (A6) defines the ratio of the effective diameter on the object-side lens surface of the lens L[LS1o] to the effective diameter on the image-side lens surface of the lens L[LS1m].

$$Cs[L[LS1o]o]/Cs[L[LS1m]m] \leq 1.3 \quad \text{(A6)}$$

where
Cs[L[LS1o]o] represents the effective diameter on the object-side lens surface of the lens L[LS1o]; and
Cs[L[LS1m]m] represents the effective diameter on the image-side lens surface of the lens L[LS1m].

If the value of conditional formula (A6) is more than the upper limit, for example, Cs[L[LS1o]o] is greater than Cs[L[LS1m]m], and thus the aperture stop ape is comparatively close to the object side. Accordingly, the distance between the center of curvature of the lens L[LS1o] and the aperture stop ape is comparatively long, and thus the imaging lens LN is highly sensitive to the off-axial eccentric error. Hence, when the value of conditional formula (A6) is less than the upper limit, the imaging lens LN is manufactured easily and inexpensively.

It can be said that an imaging lens LN fulfilling conditional formula (A6a) below is preferable to an imaging lens LN fulfilling conditional formula (A6).

$$Cs[L[LS1o]o]/Cs[L[LS1m]m] \leq 1 \quad \text{(A6a)}$$

As the position of the aperture stop ape varies, so does the distance between the optical axis and the principal ray with the maximum image height (the diagonal image height on the imaging surface, also called the parts-in-ten image height) which passes through a lens surface of a lens L. Conditional formula (A7) is an example of a condition defining such distances.

Conditional formula (A7) defines the ratio of the distance appearing, when the principal ray with the maximum image height passes through the object-side lens surface of the lens L[LS1o], between the optical axis and the principal ray to the distance appearing, when the principal ray with the maximum image height passes through the image-side surface of the lens L[LS1m], between the optical axis and the principal ray.

Such a distance, if it appears on the upper side of the optical axis AX in a drawing showing the imaging lens LN, is given a "positive" sign and if it appears on the lower side, is given a "negative" sign. Moreover, the side where the image sensor SR is disposed is referred to as the image side, and the side opposite to the image side (i.e. the side where the lens L[LS1o] is located) is referred to as the object side.

$$-13 \leq HY[L[LS1m]m]/HY[L[LS1o]o] \leq -0.08 \quad (A7)$$

where

HY[L[LS1m]m] represents the distance between the optical axis and the principal ray with the maximum image height which passes through the image-side lens surface of the lens L[LS1m]; and HY[L[LS1o]o] represents the distance between the optical axis and the principal ray with the maximum image height which passes through the object-side lens surface of the lens L[LS1o].

If the value of conditional formula (A7) is less than the lower limit, for example, HY[L[LS1m]m] is greater than HY[L[LS1o]o], and thus the aperture stop ape is comparatively close to the object side. Accordingly, the distance between the center of curvature of the lens L[LS1o] and the aperture stop ape is comparatively long, and thus the imaging lens LN is highly sensitive to the off-axial eccentric error. Hence, when the value of conditional formula (A7) is less than the upper limit, as when conditional formula (A6) is fulfilled, the imaging lens LN is manufactured easily and inexpensively.

It is particularly preferable that, within the conditional range defined by conditional formula (A7), the conditional range defined by conditional formula (A7a) below be fulfilled. This is because the aperture stop is then located closer to the image side, leading to improved aberration performance. As a result, the imaging lens LN is less difficult to manufacture.

$$-1 < HY[L[LS1m]m]/HY[L[LS1o]o] \quad (A7a)$$

The second lens block BK2 is located to the image side of the first lens block BK1, and the second lens block BK2 includes the second lens substrate LS2. Moreover, in the second lens block BK2, it is preferable that the lens L[LS2o] is contiguous with the object-side substrate surface of the second lens substrate LS2, and that the lens L[LS2m] is contiguous with the image-side substrate surface of the second lens substrate LS2.

In such an imaging lens LN including a second lens block BK2, when off-axial light is incident on the object-side surface of the second lens block BK2 (i.e. the object-side lens surface of the lens L[LS2o]), if the angle of incidence is too large, the thickness of the second lens substrate LS2 produces increased astigmatic difference. To restrain this increase in astigmatic difference, it is preferable that the part of the object-side lens surface of the lens L[LS2o] around where off-axial light (in particular, the principal ray with the maximum image height) reaches it be given an appropriate surface shape.

Accordingly, in the second lens block BK2 in the imaging lens LN, it is preferable that the object-side lens surface of the lens L[LS2o] be an aspherical surface such that the lens surface is convex at its vertex and is concave in its part where it intersects the principal ray with the maximum image height (it should however be noted that the image-side lens surface of the lens L[LS2o] is planar and that the object-side lens surface of the lens L[LS2m] is planar).

In this second lens block BK2, the object-side substrate surface of the second lens substrate LS2 is contiguous with the image-side lens surface of the lens L[LS2o], and the image-side substrate surface of the second lens substrate LS2 joints to the object-side lens surface of the lens L[LS2m].

With this design, the off-axial light that has passed through the first lens block BK1 reaches the part of the object-side lens surface of the lens L[LS2o] concentric with the corresponding position relative to the aperture center of the aperture stop ape. Since this part is concave, the off-axial light is incident on the object-side lens surface of the lens L[LS2o] at a comparatively small angle. In particular, when the object-side lens surface of the lens L[LS2o] is aspherical, to a greater degree the off-axial light can be incident at a comparatively small angle.

As a result, the astigmatism in the imaging lens LN is corrected. In a case where astigmatism is corrected in this way, of the light reaching the object-side lens surface of the lens L[LS2o], axial light is made to converge and off-axial light is made to diverge.

Moreover, in the second lens block BK in the imaging lens LN, it is preferable that the object-side lens surface of the lens L[LS2o] is concave to the object side (it should however be noted that the image-side lens surface of the lens L[LS2o] is planar and that the object-side lens surface of the lens L[LS2m] is planar).

Also in this second lens block BK2, the object-side substrate surface of the second lens substrate LS2 is contiguous with the image-side lens surface of the lens L[LS2o], and the image-side substrate surface of the second lens substrate LS2 joints to the object-side lens surface of the lens L[LS2m].

Even in this imaging lens LN, the off-axial light that has passed through the first lens block BK1 reaches the part of the object-side lens surface of the lens L[LS2o] concentric with the corresponding position relative to the aperture center of the aperture stop ape. Since this part is concave, the off-axial light is incident on the object-side lens surface of the lens L[LS2o] at a comparatively small angle, and thus the astigmatism in the imaging lens LN is corrected. In particular, when the object-side lens surface of the lens L[LS2o] is aspherical, to a greater degree the off-axial light can be incident at a comparatively small angle.

Again in this second lens block BK2, the object-side substrate surface of the second lens substrate LS2 is contiguous with the image-side lens surface of the lens L[LS2o], and the image-side substrate surface of the second lens substrate LS2 joints to the object-side lens surface of the lens L[LS2m].

This imaging lens LN produces comparatively large astigmatism attributable to off-axial rays, and is therefore unsuitable as a wide-angle optical system. Since the object-side lens surface of the lens L[LS2o] is convex to the object side, however, even with a comparatively small amount of sag on the aspherical surface, light is focused on the sensing surface of the image sensor SR. Moreover, the comparatively small amount of sag makes the manufacture of the imaging lens LN easy.

Even with this imaging lens LN, so long as conditional formula (A3b) above, namely "1.8<f[all]/Y'<2.1", is fulfilled, aberrations of various kinds are corrected satisfactorily.

In an imaging lens LN including a first to a third lens block BK1 to BK3, the third lens block BK3 includes a third lens substrate LS3. In this third lens substrate LS3, it is preferable that a lens L[LS3o] is contiguous with the object-side substrate surface of the third lens substrate LS3, and that a lens L[LS3m] is contiguous with the image-side substrate surface of the third lens substrate LS3.

Furthermore, in such an imaging lens LN including a third lens block BK3, when off-axial light is incident on the object-side surface of the third lens block BK3 (i.e. the object-side lens surface of the lens L[LS3o]), if the angle of incidence is too large, the thickness of the third lens substrate LS3 produces increased astigmatic difference (in short, as in the second lens block BK2, increased astigmatic difference is produced).

Accordingly, in an imaging lens LN including a third lens block BK3, it is preferable that the object-side lens surface of the lens L[LS3o] be concave to the object side (it should be noted that the image-side lens surface of the lens L[LS3o] is planar and that the object-side lens surface of the lens L[LS3m] is planar).

The object-side substrate surface of the third lens substrate LS3 is contiguous with the image-side lens surface of the lens L[LS3o], and the image-side substrate surface of the third lens substrate LS3 is contiguous with the object-side lens surface of the lens L[LS3m].

In such an imaging lens LN, the off-axial light that has passed through the second lens block BK2 reaches the part of the object-side lens surface of the lens L[LS3o] concentric with the corresponding position relative to the aperture center of the aperture stop ape. Since this part is concave, the off-axial light is incident on the object-side lens surface of the lens L[LS3o] at a comparatively small angle, and thus the astigmatism in the imaging lens LN is corrected. In particular, when the object-side lens surface of the lens L[LS3o] is aspherical, to a greater degree the off-axial light can be incident at a comparatively small angle.

Such an imaging lens LN including three lens blocks BK tends to have an increased total length, and makes it difficult to secure telecentricity to the image surface. Thus, in the third lens block BK3 in such an imaging lens LN, it is preferable that at least one of the object-side lens surface of the lens L[LS3o] and the image-side lens surface of the lens L[LS3m] be aspherical (it should however be noted that the image-side lens surface of the lens L[LS3o] and the object-side lens surface of the lens L[LS3m] are both planar).

In this third lens block BK3, the object-side substrate surface of the third lens substrate LS3 is contiguous with the image-side lens surface of the lens L[LS3o], and the image-side substrate surface of the third lens substrate LS3 is contiguous with the object-side lens surface of the lens L[LS3m].

With this design, when the light that has passed through the first and second lens blocks BK1 and BK2 then passes through the third lens block BK3, the object-side lens surface of the lens L[LS3o] is the light entrance surface, and the image-side lens surface of the lens L[LS3m] is the light exit surface. When at least one of these entrance and exit surfaces is aspherical, the light passing through the third lens block BK3 is so directed as to be telecentric to the image side. In particular, with aspherical surfaces at the entrance and exit surfaces, the light is directed such that the angle of incidence of the principal ray with the maximum image height with respect to the image surface is to a greater degree telecentric to the image surface.

It is preferable that the aspherical surface be a lens surface that makes contact with air. This is because the boundary between a lens material and air provides the highest index of refraction and forming an aspherical surface there makes it most effective.

Moreover, from the viewpoint of chromatic aberration correction, in a lens block BK, it is preferable that a lens and a lens substrate have different indices of refraction.

Below are shown, for each of the practical examples (EX1 to EX18) and the comparison example (CEX), the results of conditional formulae (A1 to A7), the sensitivity to manufacturing errors (EMS), and the sensitivity to the off-axial eccentric error (OMS).

The sensitivity to manufacturing errors (EMS) is an RMS value calculated according to the formula below. The sensitivity to the off-axial eccentric error (OMS) is the ratio relative to the sensitivity to manufacturing errors in Example 18 taken as "1.00".

$$EMS=[\{(\alpha^2+\beta^2)/1.75\}/Fno]\times 2.8$$

where $\alpha$ represents the variation of the meridional image surface which occurs when a lens surface (object-side lens surface) shifts eccentrically 5 μm relative to the optical axis AX;

$\beta$ represents the variation of the meridional image surface which occurs when a lens block BK shifts 15 μm relative to the optical axis AX;

1.75 is the pixel pitch size of the image sensor SR (in the unit of μm);

Fno represents the f-number of the imaging lens LN of each example; and 2.8 is the f-number used for normalization.

In the table, the symbol "x" signifies that no value corresponding to the relevant conditional formula can be calculated. Since Examples 1 to 18 all fulfill conditional formula (A2), no corresponding values are given. Moreover, in the table, an underscored value signifies that the relevant condition is not fulfilled.

TABLE 39

| | 0 ≦ DT[LS1o-ape]/d[LS1] ≦ 1 ... (A1) | | | | | | | | | |
|---|---|---|---|---|---|---|---|---|---|---|
| A1 | EX1 | EX2 | EX3 | EX4 | EX5 | EX6 | EX7 | EX8 | EX9 | EX10 |
| | 0.00 | 0.00 | 0.00 | 0.00 | 0.00 | 0.00 | 0.00 | 0.00 | 0.00 | 0.00 |
| | EX11 | EX12 | EX13 | EX14 | EX15 | EX16 | EX17 | EX18 | CEX | |
| | 0.00 | 0.00 | 0.42 | 0.54 | 0.85 | 0.37 | 0.30 | 1.00 | x | |
| EMS | EX1 | EX2 | EX3 | EX4 | EX5 | EX6 | EX7 | EX8 | EX9 | EX10 |
| | 9.74 | 7.88 | 8.83 | 6.86 | 6.73 | 9.46 | 8.70 | 6.34 | 10.29 | 6.78 |
| | EX11 | EX12 | EX13 | EX14 | EX15 | EX16 | EX17 | EX18 | CEX | |
| | 2.57 | 0.63 | 5.42 | 7.96 | 3.53 | 7.88 | 8.67 | 3.45 | 17.78 | |
| OMS | EX1 | EX2 | EX3 | EX4 | EX5 | EX6 | EX7 | EX8 | EX9 | EX10 |
| | 2.82 | 2.28 | 2.56 | 1.99 | 1.95 | 2.74 | 2.52 | 1.84 | 2.98 | 1.97 |
| | EX11 | EX12 | EX13 | EX14 | EX15 | EX16 | EX17 | EX18 | CEX | |
| | 0.74 | 0.18 | 1.57 | 2.31 | 1.02 | 2.28 | 2.51 | 1.00 | 5.15 | |

TABLE 39-continued

| | | | | $1.4 < f[all]/Y' < 1.9 \ldots$ (A3) | | | | | | |
|---|---|---|---|---|---|---|---|---|---|---|
| A3 | EX1 | EX2 | EX3 | EX4 | EX5 | EX6 | EX7 | EX8 | EX9 | EX10 |
| | 1.68 | 1.66 | 1.65 | 1.70 | 1.69 | 1.69 | 1.67 | 1.65 | 1.64 | 1.58 |
| | EX11 | EX12 | EX13 | EX14 | EX15 | EX16 | EX17 | EX18 | CEX | |
| | 1.80 | 1.50 | 1.71 | 1.61 | 1.69 | 1.68 | 1.66 | 1.74 | 1.60 | |
| | | | | $0.18 \leq (d[L[LS1o]] + DT[LS1o\text{-}ape])/r[L[LS1o]o] \leq 1.2 \ldots$ (A4) | | | | | | |
| A4 | EX1 | EX2 | EX3 | EX4 | EX5 | EX6 | EX7 | EX8 | EX9 | EX10 |
| | 0.32 | 0.40 | 0.33 | 0.39 | 0.60 | 0.48 | 0.43 | 0.45 | 0.22 | 0.36 |
| | EX11 | EX12 | EX13 | EX14 | EX15 | EX16 | EX17 | EX18 | CEX | |
| | 0.06 | 0.00 | 0.49 | 0.70 | 0.96 | 0.42 | 0.37 | 0.58 | x | |
| | | | | $0.03 \leq d[LS1]/TL \leq 0.33 \ldots$ (A5) | | | | | | |
| A5 | EX1 | EX2 | EX3 | EX4 | EX5 | EX6 | EX7 | EX8 | EX9 | EX10 |
| | 0.12 | 0.10 | 0.12 | 0.12 | 0.09 | 0.09 | 0.10 | 0.10 | 0.14 | 0.09 |
| | EX11 | EX12 | EX13 | EX14 | EX15 | EX16 | EX17 | EX18 | CEX | |
| | 0.30 | 0.21 | 0.11 | 0.17 | 0.17 | 0.22 | 0.14 | 0.07 | 0.09 | |
| | | | | $Cs[L[LS1o]o]/Cs[L[LS1m]m] \leq 1.3 \ldots$ (A6) | | | | | | |
| A6 | EX1 | EX2 | EX3 | EX4 | EX5 | EX6 | EX7 | EX8 | EX9 | EX10 |
| | 1.07 | 1.14 | 1.05 | 1.08 | 1.26 | 1.22 | 1.29 | 0.97 | 1.00 | 1.09 |
| | EX11 | EX12 | EX13 | EX14 | EX15 | EX16 | EX17 | EX18 | CEX | |
| | 0.53 | x | 0.83 | 0.75 | 0.62 | 0.87 | 0.91 | 0.69 | x | |
| | | | | $-13 \leq HY[L[LS1m]m]/HY[L[LS1o]o] \leq -0.08 \ldots$ (A7) | | | | | | |
| A7 | EX1 | EX2 | EX3 | EX4 | EX5 | EX6 | EX7 | EX8 | EX9 | EX10 |
| | -1.82 | -1.37 | -1.63 | -1.25 | -0.76 | -1.01 | -1.25 | -1.59 | -2.79 | -1.17 |
| | EX11 | EX12 | EX13 | EX14 | EX15 | EX16 | EX17 | EX18 | CEX | |
| | -13.60 | ∞ | -0.89 | -0.54 | -0.19 | -1.13 | -1.26 | -0.32 | x | |

[Embodiment 2]

Embodiment 2 will now be described. Such members as function similarly to their counterparts in Embodiment 1 are identified by common reference signs and no description of them will be repeated. In this embodiment, the resin out of which the lenses L are formed will be discussed.

Resin excels in workability. Thus, forming the lenses L enumerated in connection with Embodiment 1 out of resin allows easy formation of aspherical lens surfaces by use of molds or the like.

Generally, however, if fine particles are mixed in transparent resin (such as polymethyl methacrylate), light is scattered inside the resin, and lower transmittance results. Thus resin containing fine particles can be said to be unsuitable as an optical material.

Moreover, the index of refraction of resin varies with temperature. For example, let us calculate, according to the Lorenz-Lorenz formula (LL) below, the temperature dependence of the index of refraction of polymethyl methacrylate (PMMA), that is, its temperature-dependent refractive-index variation (dn/dt).

$$\frac{dn}{dt} = \frac{(n^2+2) \times (n^2-1)}{6n} \times \left\{ (-3\alpha) + \frac{1}{[R]} \times \frac{\partial [R]}{\partial t} \right\} \quad (LL)$$

where
n represents the index of refraction of the resin;
t represents temperature;
$\alpha$ represents the coefficient of linear expansion (with PMMA, $\alpha = 7 \times 10^{-5}$); and
[R] represents molecular refraction.

Then, with PMMA, the refractive-index variation is found to be $-1.2 \times 10^{-4}/°$ C. This value approximately agrees with actual measurements. Thus, forming the lenses L out of resin (plastic) alone results in their refractive-index variation being dependent on temperature. If, in addition, fine particles are mixed in such resin out of which the lenses are formed, the lenses L then not only scatters light but also change their indices of refraction with temperature.

In recent years, however, it has increasingly been recognized that resin containing properly designed fine particles can be used as an optical material. This is because, in resin containing fine particles (a mixed resin), if the particle diameter of the fine particles is smaller than the wavelength of transmitted light, no scattering of light occurs.

In addition, when the fine particles are inorganic ones, their index of refraction increases as temperature increases. Thus, in a mixed resin, as temperature rises, the index of refraction of the resin decreases and simultaneously the index of refraction of the inorganic fine particles increases. In this way, their respective temperature dependence (the decrease in the index of refraction of one and the increase in the index of refraction of the other) is canceled out, with the result that the index of refraction of the mixed resin varies less with temperature (for example, in the lenses L, the variation of their index of refraction is reduced to as small as the effect of the variation of the surface shape on the positions of the paraxial image points).

Incidentally, as one example of a mixed resin as described above, JP-A-2007-126636 discloses one having inorganic fine particles with a maximum length of 30 nm or less (an added material, such as niobium oxide ($Nb_2O_5$)) dispersed in resin (a base material).

In light of the foregoing, when the lenses L are formed out of resin having inorganic fine particles of 30 nm or less dispersed in it (a mixed resin), the imaging lens LN including those lenses L has high durability to temperature. Moreover, for example, by properly adjusting the ratio of resin to inorganic fine particles in the mixed resin, the length of the particle diameter of the inorganic fine particles (for example, 20 nm or less, further preferably 15 nm or less), the kind of resin used as the base material, and the kind of inorganic fine particles used as the added material, it is possible to give the lenses L high indices of refraction. Thus, when the lenses L are formed out of a mixed resin, the imaging lens LN including those lenses L is more compact, and the lenses L are less difficult to mold.

It is preferable that the resin mentioned above be a hardening resin. This is because a hardening resin allows easy manufacture of the lenses L including aspherical surfaces by use of molds or the like. Moreover, when the resin is adhesive (or when adhesive is mixed in the resin), the lenses L formed out of it can be cemented to the lens substrates LS easily. That is, the lens blocks including the lens substrates LS and lenses L directly bonded together is manufactured easily.

Furthermore, it is preferable that the resin mentioned above is heat-resistant. For example, a module (camera module) having the imaging lens LN and the image sensor SR integrated into a unit is fitted on a printed circuit board (circuit board) having solder paste printed on it, and is then heated (for reflow soldering); thereby the module is mounted on the printed circuit board. Such mounting is handled by automation. Thus, when the lenses L are formed out of a heat-resistant hardening resin, they withstand reflow soldering, and are therefore suitable for automation (needless to say, it is preferable that the lens substrates LS also be formed out of a material with high resistance to heat, for example glass).

Examples of hardening resins include thermosetting resins and ultraviolet (UV)-curing resins.

With a thermosetting resin, even when the lenses L are thick, they can be manufactured accurately. On the other hand, with an UV-curing resin, since it hardens in a comparatively short time, the lenses can be manufactured in a short time.

It should be understood that the embodiments specifically described above are not meant to limit the present invention, and that many variations and modifications within the spirit of the present invention.

The invention claimed is:

1. An imaging lens comprising:
   at least one lens block including
      a lens substrate that is a plane-parallel plate, and
      a lens contiguous with at least one of object-side and image-side substrate surfaces of the lens substrate, the lens exerting a positive or negative optical power; and
   an aperture stop restricting light amount,
   wherein said lens included in said lens block is formed of a material different from a material out of which said lens substrate is formed;
   wherein said lens block disposed at a most object-side position is a first lens block, the first lens block including,
      a first lens substrate, and
      a lens L[LS1o] contiguous with an object-side substrate surface of the first lens substrate, and
   wherein conditional formula (A1) below is fulfilled:

$$0 \leq DT[LS1o-ape]/d[LS1] \leq 1 \tag{A1}$$

where
   DT[LS1o–ape] represents a distance from the object-side substrate surface of the first lens substrate to an aperture stop surface; and
   d[LS1] represents a thickness of the first lens substrate along an optical axis,
   wherein the first lens block further includes, a lens L[LS1m] contiguous with an image-side substrate surface of the first lens substrate, and
   wherein conditional formula (A7) is fulfilled:

$$-13 \leq HY[L[LS1m]m]/HY[L[LS1o]o] \leq -0.08 \tag{A7}$$

where
   HY[L[LS1m]m] represents a distance between the optical axis and a principal ray with a maximum image height which passes through an image-side lens surface of the lens L[LS1m]; and
   HY[L[LS1o]o] represents a distance between the optical axis and a principal ray with the maximum image height which passes through an object-side lens surface of the lens L[LS1o].

2. An imaging lens comprising:
   at least one lens block including
      a lens substrate that is a plane-parallel plate, and
      a lens contiguous with at least one of object-side and image-side substrate surfaces of the lens substrate, the lens exerting a positive or negative optical power; and
   an aperture stop restricting light amount,
   wherein said lens included in said lens block is formed of a material different from a material out of which said lens substrate is formed;
   wherein said lens block disposed at a most object-side position is a first lens block, the first lens block including,
      a first lens substrate, and
      a lens L[LS1o] contiguous with an object-side substrate surface of the first lens substrate, and
   wherein conditional formula (A1) below is fulfilled:

$$0 \leq DT[LS1o-ape]/d[LS1] \leq 1 \tag{A1}$$

where
   DT[LS1o–ape] represents a distance from the object-side substrate surface of the first lens substrate to an aperture stop surface; and
   d[LS1] represents a thickness of the first lens substrate along an optical axis,
   wherein said lens block further comprises a second lens block located to an image side of the first lens block, the second lens block including,
   a second lens substrate,
   a lens L[LS2o] contiguous with an object-side substrate surface of the second lens substrate, and
   a lens L[LS2m] contiguous with an image-side substrate surface of the second lens substrate,
   wherein an object-side lens surface of the lens L[LS2o] is aspherical, being convex at a vertex thereof and concave in a part thereof intersecting a principal ray with a maximum image height, and
   wherein the object-side substrate surface of the second lens substrate is contiguous with an image-side lens surface of the lens L[LS2o], and the image-side substrate surface of the second lens substrate is contiguous with an object-side lens surface of the lens L[LS2m].

3. An imaging lens comprising:
   at least one lens block including
      a lens substrate that is a plane-parallel plate, and
      a lens contiguous with at least one of object-side and image-side substrate surfaces of the lens substrate, the lens exerting a positive or negative optical power; and
   an aperture stop restricting light amount,
   wherein said lens included in said lens block is formed of a material different from a material out of which said lens substrate is formed;
   wherein said lens block disposed at a most object-side position is a first lens block, the first lens block including,
      a first lens substrate, and
      a lens L[LS1o] contiguous with an object-side substrate surface of the first lens substrate, and
   wherein conditional formula (A1) below is fulfilled:

$$0 \leq DT[LS1o-ape]/d[LS1] \leq 1 \tag{A1}$$

where
   DT[LS1o–ape] represents a distance from the object-side substrate surface of the first lens substrate to an aperture stop surface; and d[LS1] represents a thickness of the first lens substrate along an optical axis, wherein said lens block further comprises a second lens block located to an image side of the first lens block, the second lens block including, a second lens substrate, a lens L[LS2o] contiguous with an object-side substrate surface of the second lens substrate, and a lens L[LS2m] contiguous with an image-side substrate surface of the second lens substrate, wherein an object-side lens surface of the lens L[LS2o] is concave to an object side, and wherein the object-side substrate surface of the second lens substrate is contiguous with an image-side lens surface of the lens L[LS2o], and the image-side substrate surface of the second lens substrate is contiguous with an object-side lens surface of the lens L[LS2m].

4. An imaging lens comprising:

at least one lens block including
   a lens substrate that is a plane-parallel plate, and
   a lens contiguous with at least one of object-side and image-side substrate surfaces of the lens substrate, the lens exerting a positive or negative optical power; and
an aperture stop restricting light amount,
wherein said lens included in said lens block is formed of a material different from a material out of which said lens substrate is formed;
wherein said lens block disposed at a most object-side position is a first lens block, the first lens block including,
   a first lens substrate, and
   a lens L[LS1o] contiguous with an object-side substrate surface of the first lens substrate, and
wherein conditional formula (A1) below is fulfilled:

$$0 \leq DT[LS1o-ape]/d[LS1] \leq 1 \qquad (A1)$$

where
   DT[LS1o–ape] represents a distance from the object-side substrate surface of the first lens substrate to an aperture stop surface; and
   d[LS1] represents a thickness of the first lens substrate along an optical axis,
wherein said lens block further comprises a second lens block located to an image side of the first lens block and a third lens block located to an image side of the second lens block, the third lens block including,
a third lens substrate,
a lens L[LS3o] contiguous with an object-side substrate surface of the third lens substrate, and
a lens L[LS3m] contiguous with an image-side substrate surface of the third lens substrate,
wherein an object-side lens surface of the lens L[LS3o] is concave to an object side, and
wherein the object-side substrate surface of the third lens substrate is contiguous with an image-side lens surface of the lens L[LS3o], and the image-side substrate surface of the third lens substrate is contiguous with an object-side lens surface of the lens L[LS3m].

5. An imaging lens comprising:

at least one lens block including
   a lens substrate that is a plane-parallel plate, and
   a lens contiguous with at least one of object-side and image-side substrate surfaces of the lens substrate, the lens exerting a positive or negative optical power; and
an aperture stop restricting light amount,
wherein said lens included in said lens block is formed of a material different from a material out of which said lens substrate is formed;
wherein said lens block disposed at a most object-side position is a first lens block, the first lens block including,
   a first lens substrate, and
   a lens L[LS1o] contiguous with an object-side substrate surface of the first lens substrate, and
wherein conditional formula (A1) below is fulfilled:

$$0 \leq DT[LS1o-ape]/d[LS1] \leq 1 \qquad (A1)$$

where
   DT[LS1o–ape] represents a distance from the object-side substrate surface of the first lens substrate to an aperture stop surface; and
   d[LS1] represents a thickness of the first lens substrate along an optical axis,
wherein said lens block further comprises a second lens block located to an image side of the first lens block and a third lens block located to an image side of the second lens block, the third lens block including,
a third lens substrate,
a lens L[LS3o] contiguous with an object-side substrate surface of the third lens substrate, and
a lens L[LS3m] contiguous with an image-side substrate surface of the third lens substrate,
wherein at least one of an object-side lens surface of the lens L[LS3o] and an image-side lens surface of the lens L[LS3m] is aspherical, and
wherein the object-side substrate surface of the third lens substrate is contiguous with an image-side lens surface of the lens L[LS3o], and the image-side substrate surface of the third lens substrate is contiguous with an object-side lens surface of the lens L[LS3m].

* * * * *